United States Patent [19]
Sakai et al.

[11] Patent Number: 6,054,974
[45] Date of Patent: Apr. 25, 2000

[54] IMAGE DISPLAY METHOD AND APPARATUS

[75] Inventors: Kenichiro Sakai; Hirotaka Chiba; Tsugio Noda, all of Kawasaki, Japan

[73] Assignee: Fujitsu Limited, Kawasaki, Japan

[21] Appl. No.: 08/766,146

[22] Filed: Dec. 12, 1996

[30] Foreign Application Priority Data

Jun. 28, 1996 [JP] Japan ................................. 8-168890

[51] Int. Cl.$^7$ ....................................................... G09G 3/36
[52] U.S. Cl. ............................................. 345/98; 345/100
[58] Field of Search .............................. 345/87, 97, 98, 345/99, 100, 103

[56] References Cited

U.S. PATENT DOCUMENTS 5,436,636  7/1995  Nonoshita et al. ...................... 345/98

FOREIGN PATENT DOCUMENTS

617399-A1  3/1994  European Pat. Off. ............... 345/100

*Primary Examiner*—Matthew Luu
*Attorney, Agent, or Firm*—Staas & Halsey LLP

[57] ABSTRACT

Each time line pixel data is read out from a memory in accordance with an order of display lines for a liquid crystal panel, it is compared with each line pixel data in the memory, thereby detecting a plurality of lines which can be simultaneously written. Subsequently, a writing display of a plurality of lines of the liquid crystal panel is executed by using the same line pixel data.

36 Claims, 48 Drawing Sheets

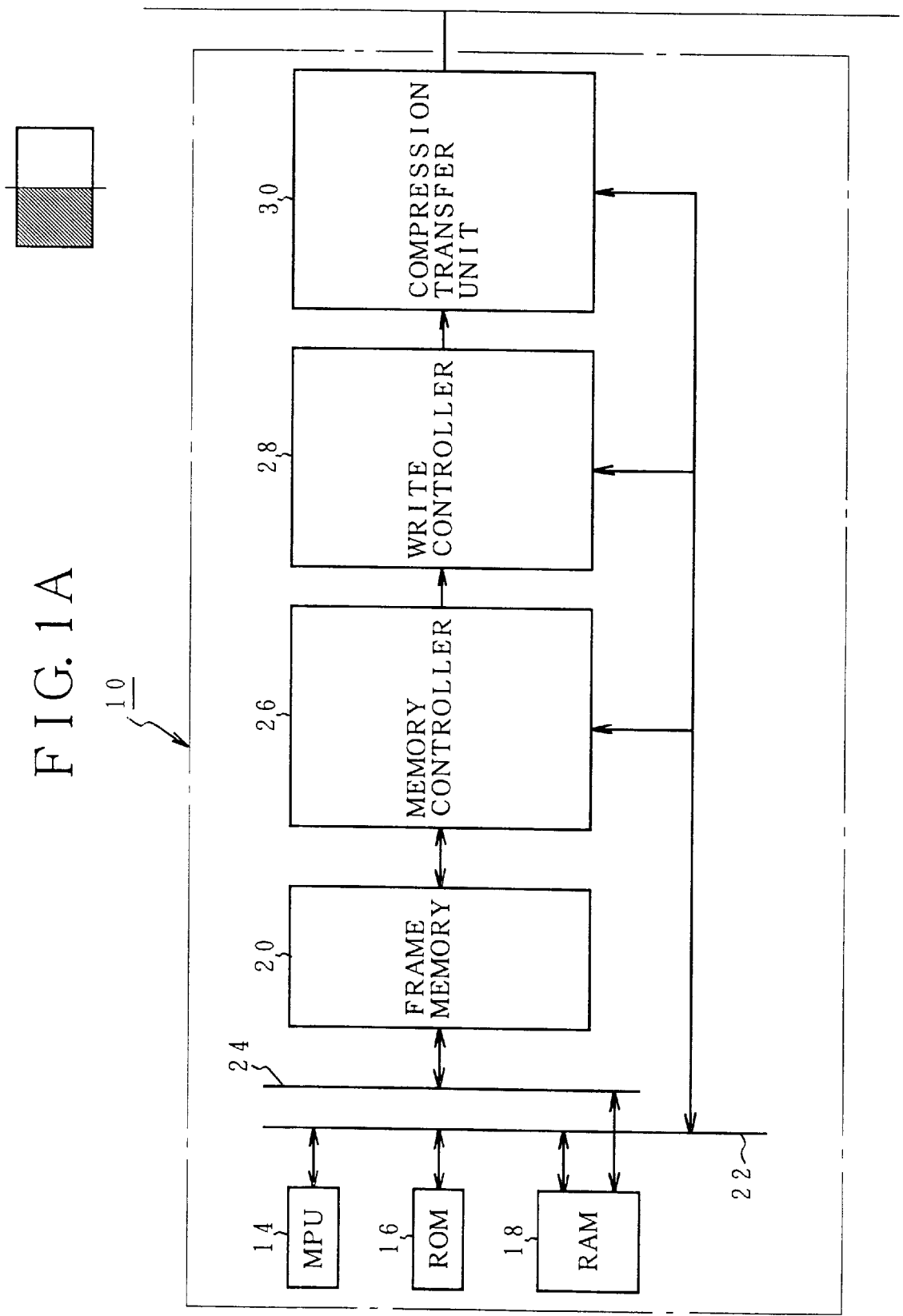

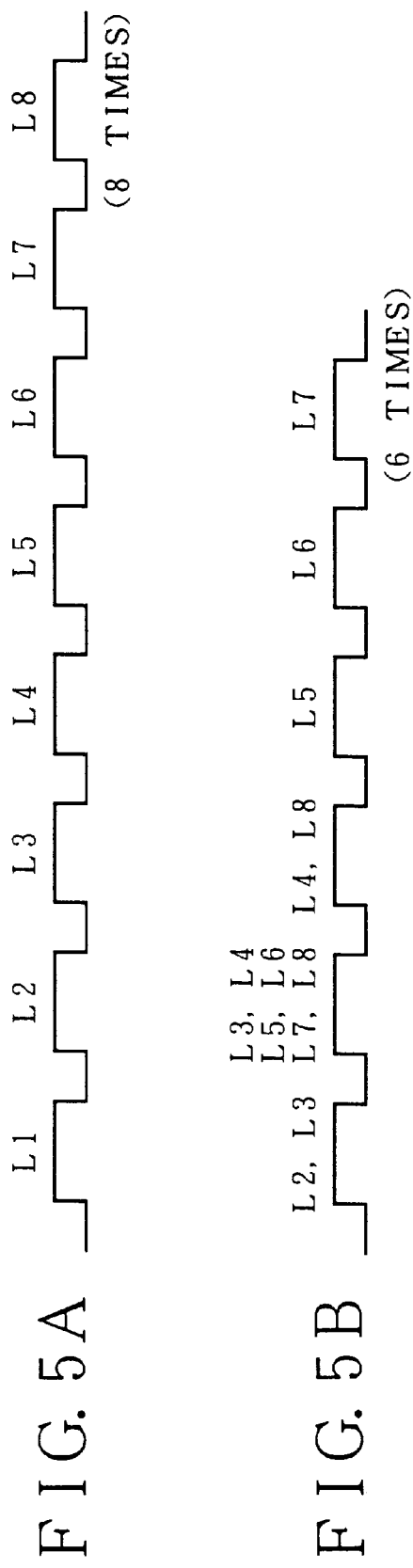

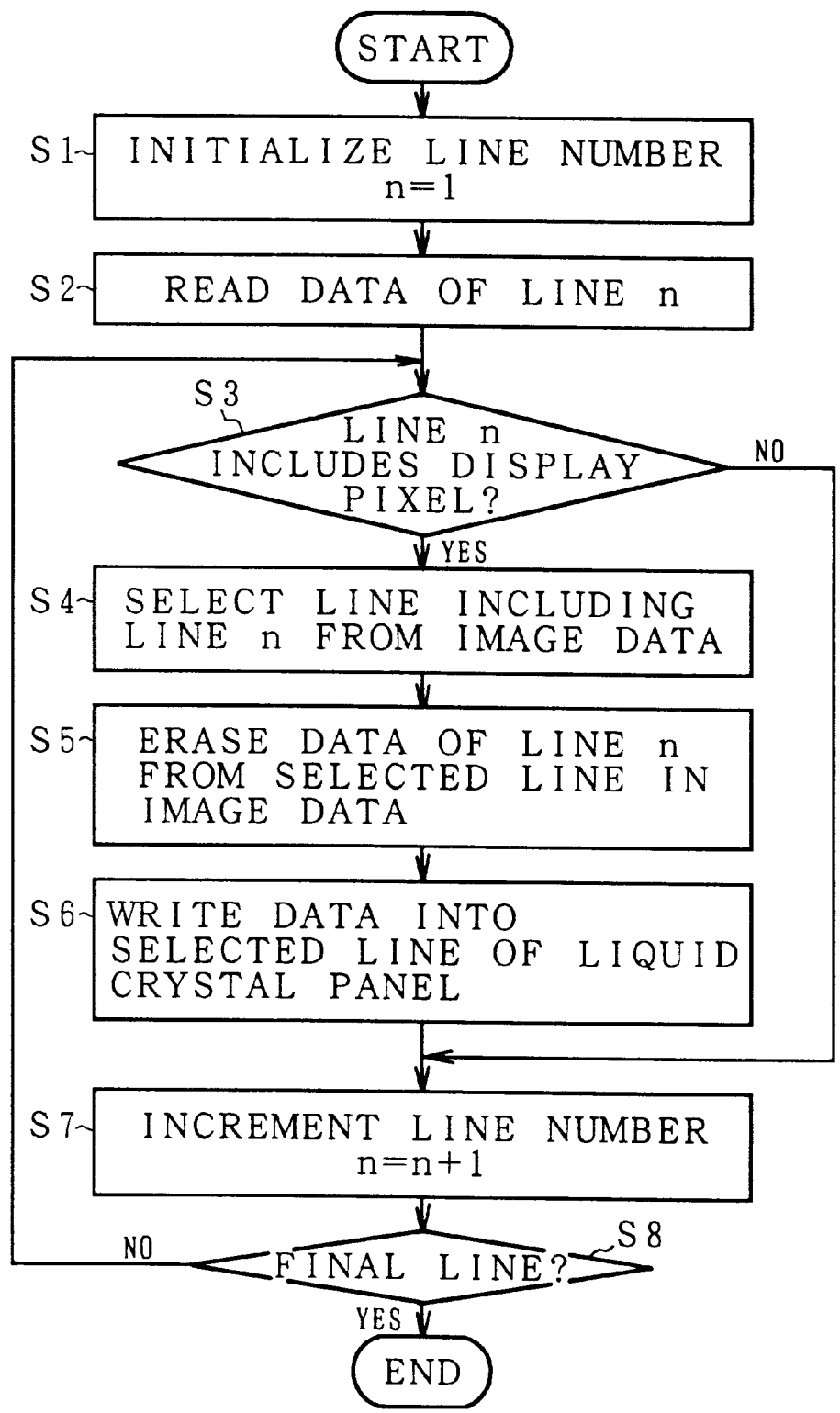

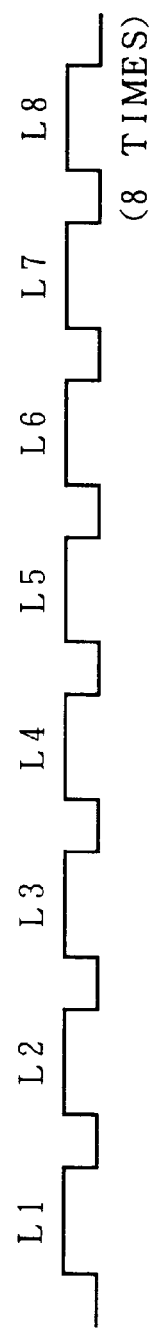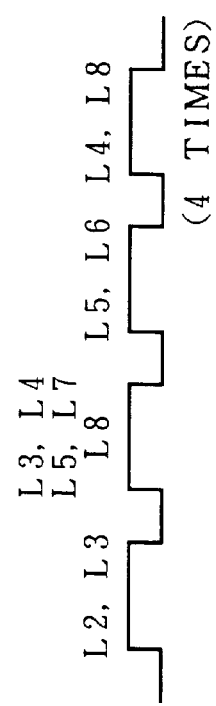

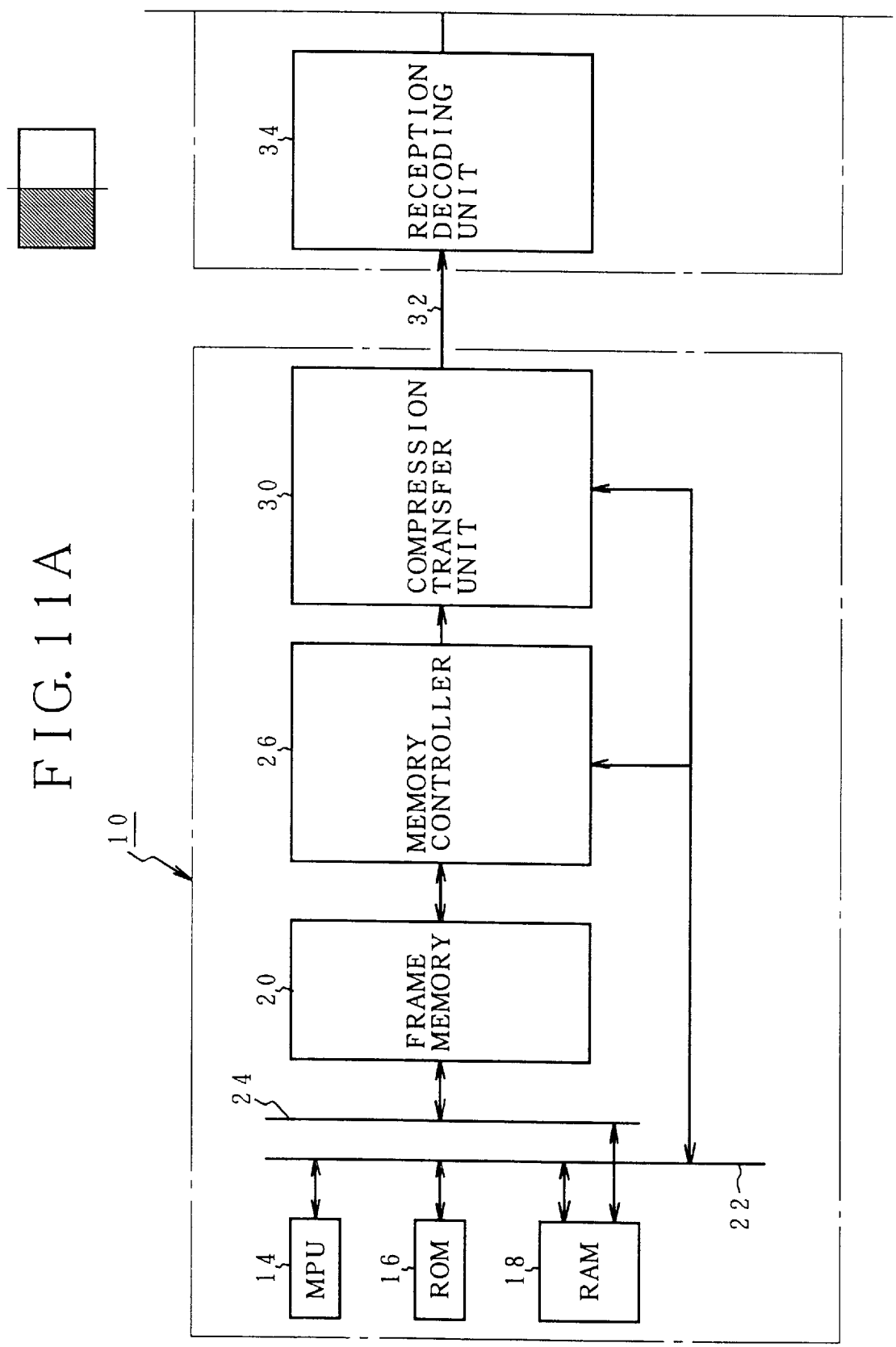

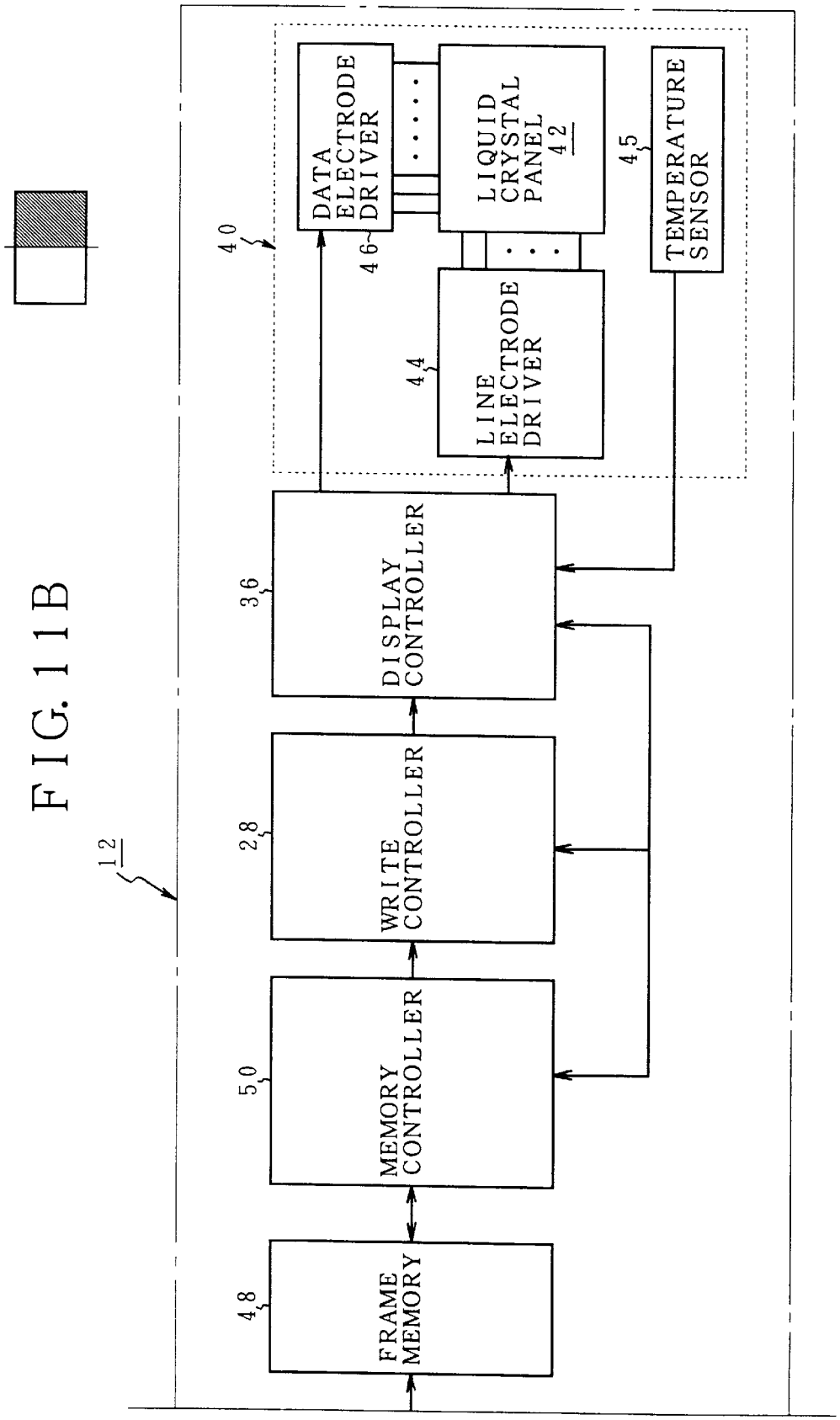

Figure 1:
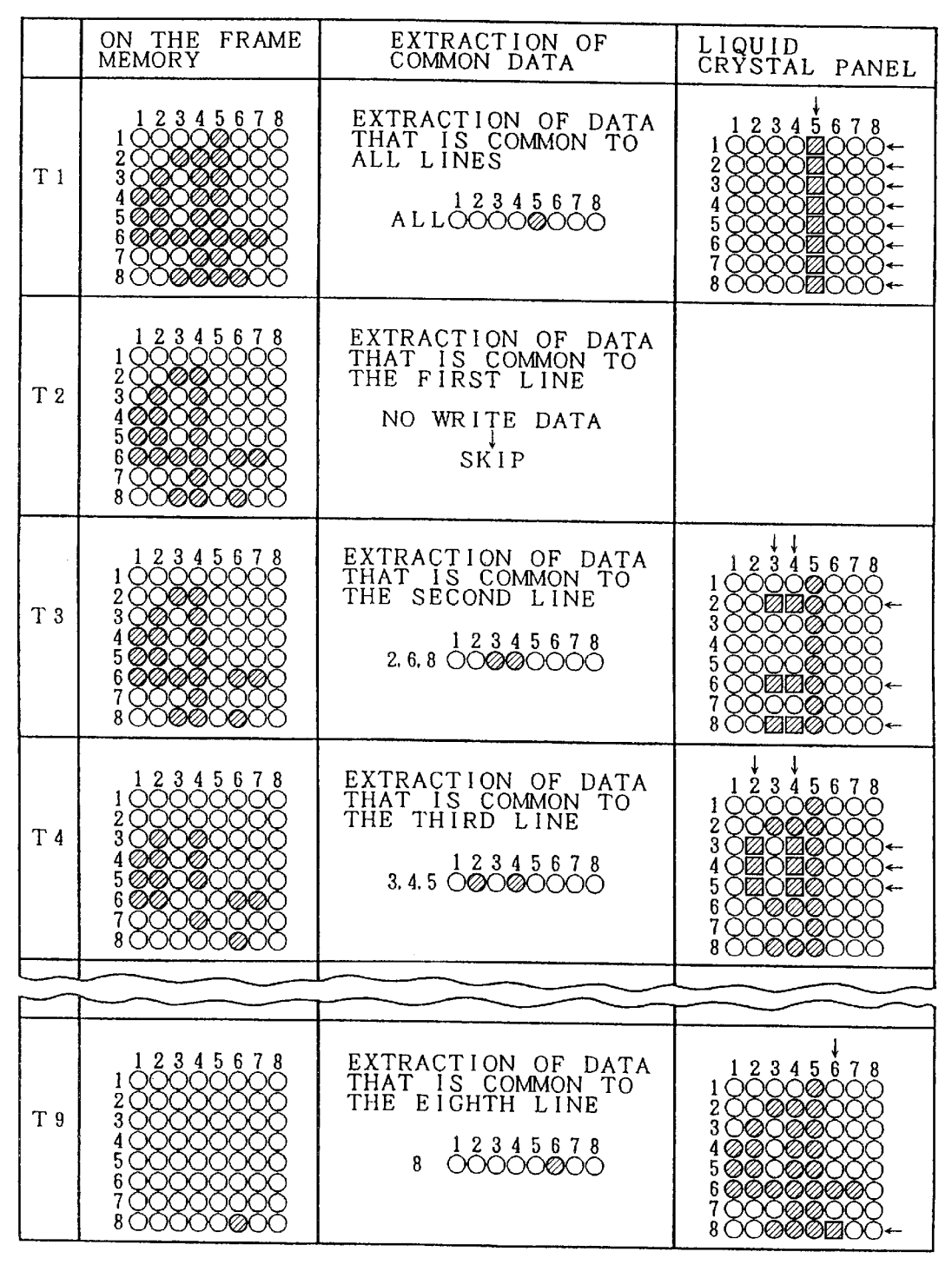

F I G. 1 4

| | ON THE FRAME MEMORY | EXTRACTION OF COMMON DATA | LIQUID CRYSTAL PANEL |
|---|---|---|---|
| T1 | (8×8 grid of circles) | EXTRACTION OF DATA THAT IS COMMON TO ALL LINES<br><br>ALL ○○○○⊘○○○ | (8×8 grid with column 5 highlighted) |
| T2 | (8×8 grid of circles) | EXTRACTION OF DATA THAT IS COMMON TO THE FIRST LINE<br><br>NO WRITE DATA<br>↓<br>SKIP | |
| T3 | (8×8 grid of circles) | EXTRACTION OF DATA THAT IS COMMON TO THE SECOND LINE<br><br>2,6,8 ○○⊘○⊘○○○ | (8×8 grid with columns 3,4 highlighted) |
| T4 | (8×8 grid of circles) | EXTRACTION OF DATA THAT IS COMMON TO THE THIRD LINE<br><br>3,4,5 ○⊘○○⊘○○○ | (8×8 grid with columns 2,5 highlighted) |
| T9 | (8×8 grid of circles) | EXTRACTION OF DATA THAT IS COMMON TO THE EIGHTH LINE<br><br>8 ○○○○○⊘○○ | (8×8 grid with column 6 highlighted) |

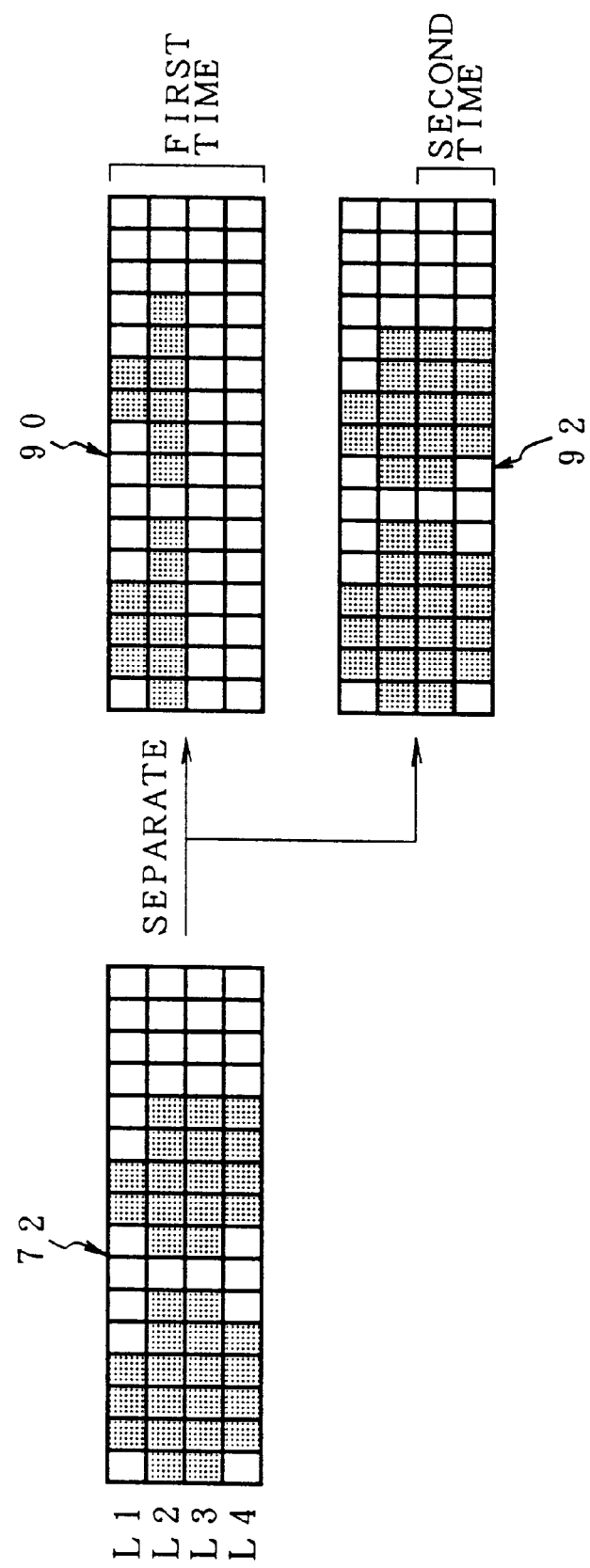

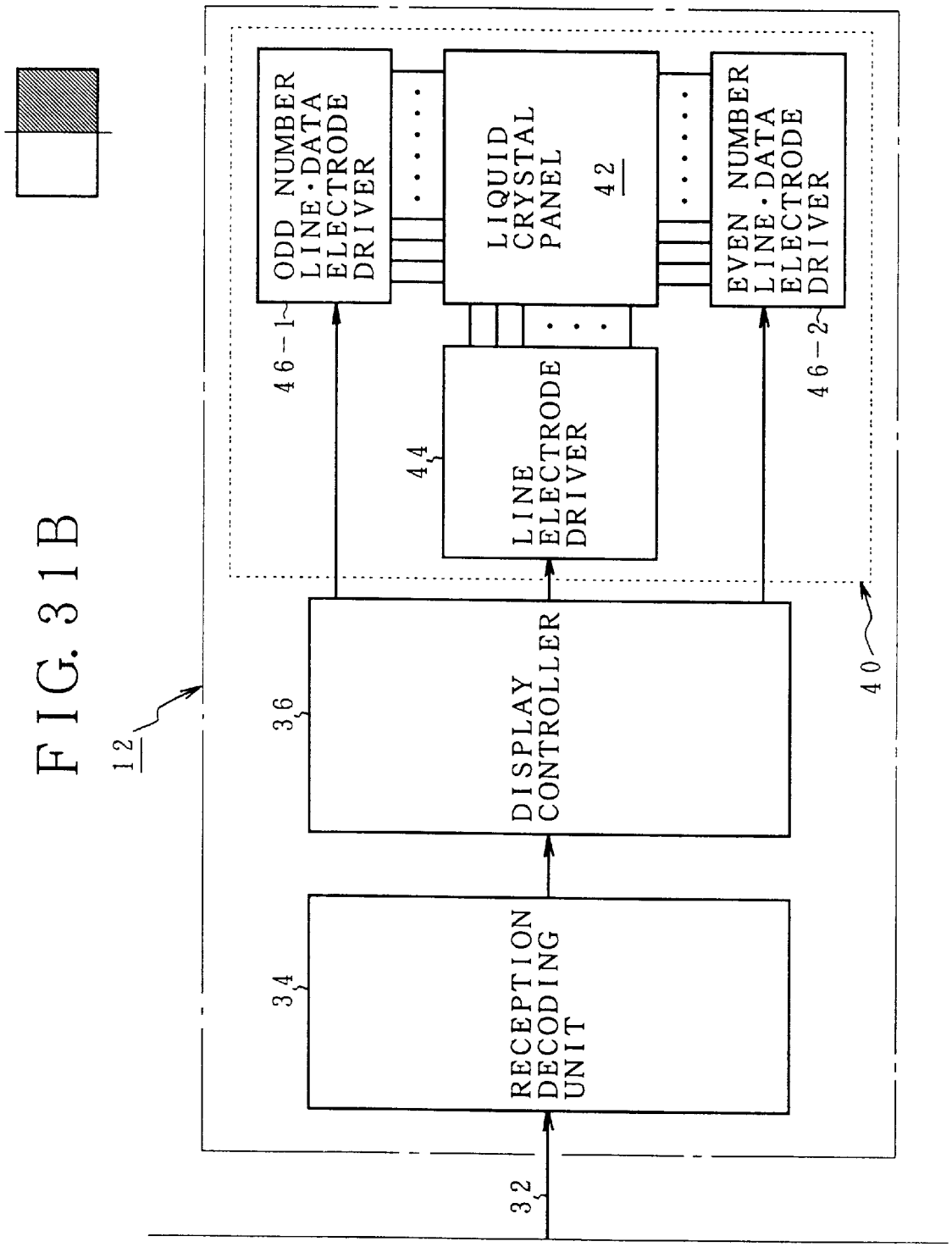

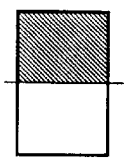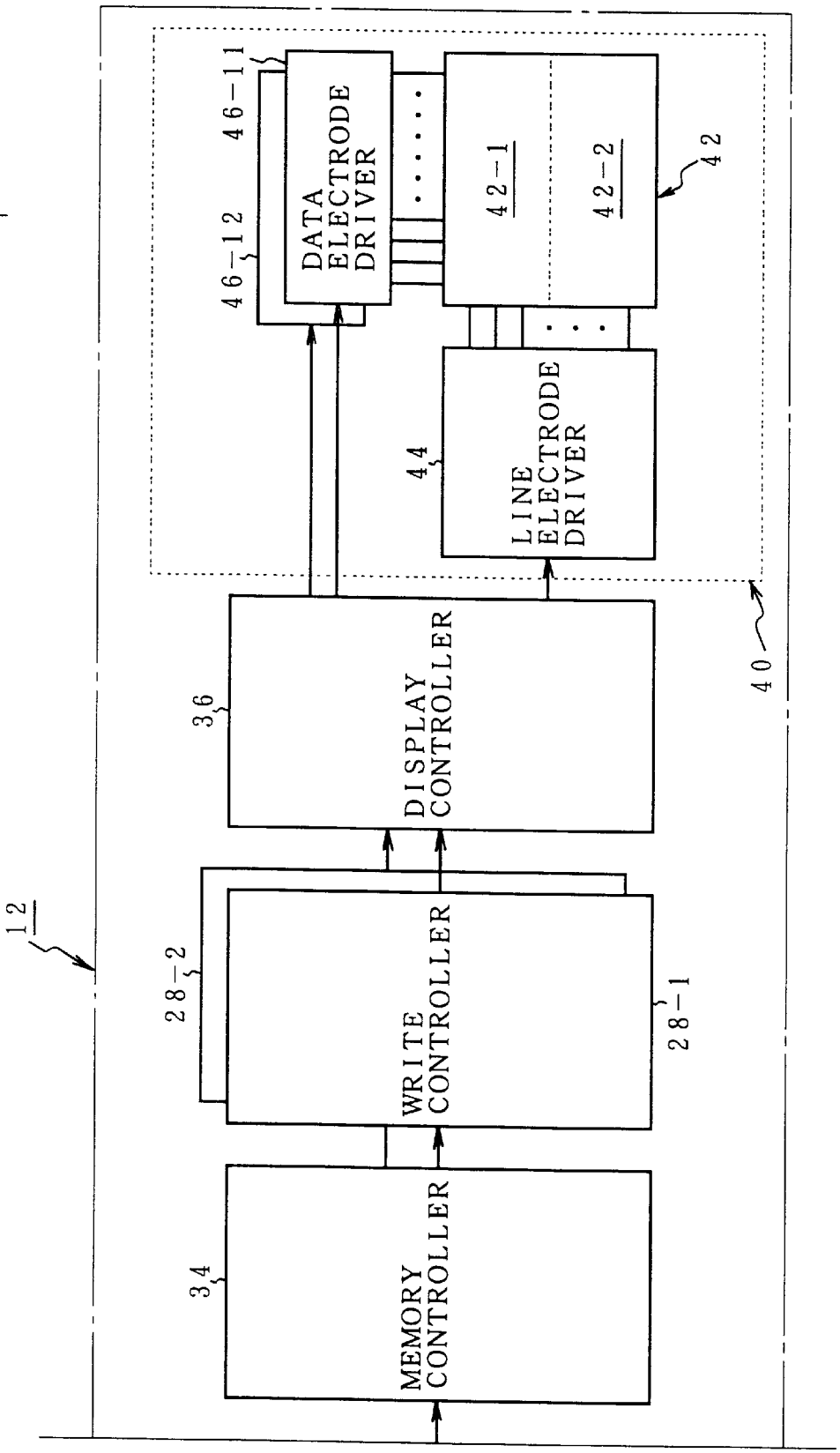
FIG. 32B

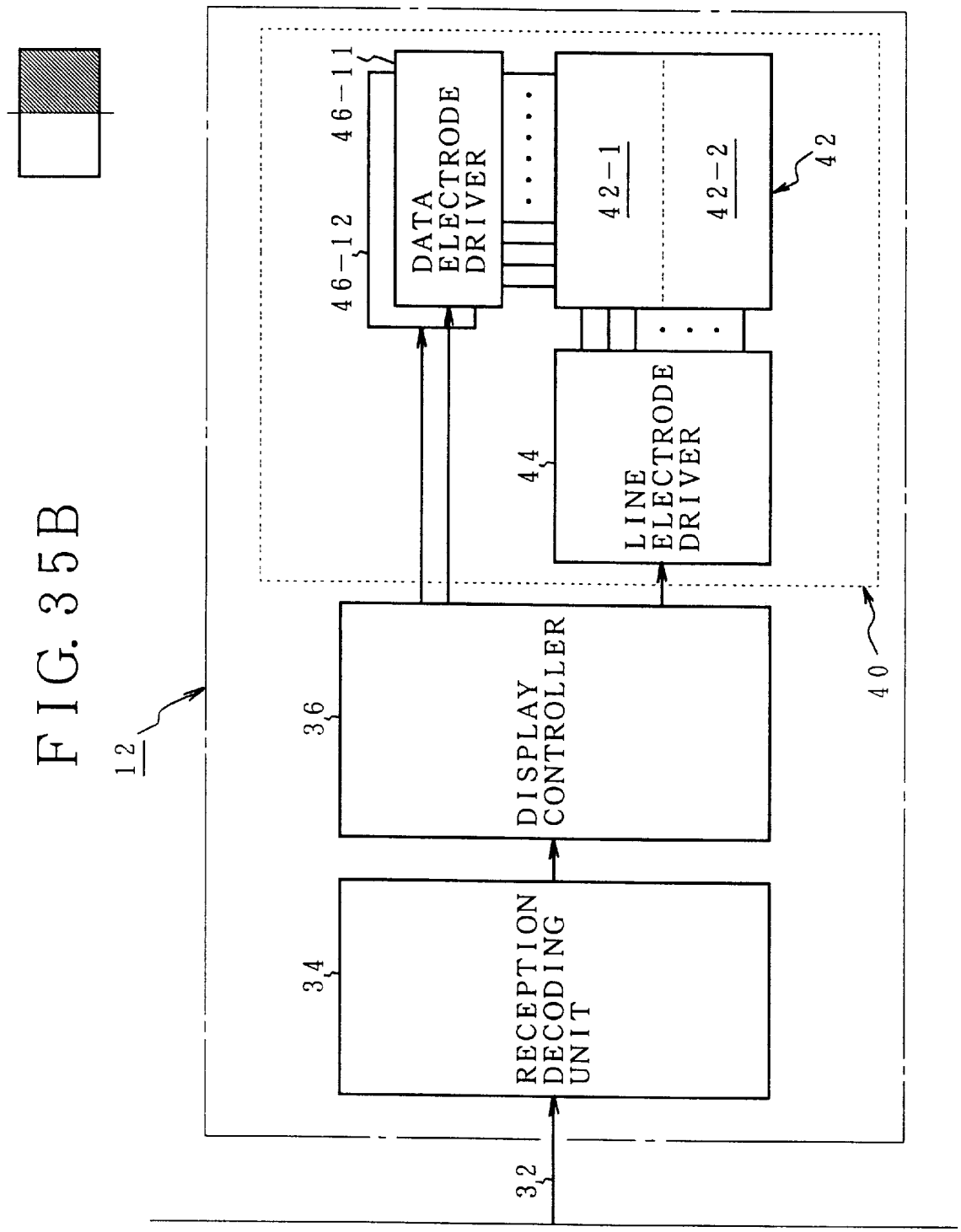

IMAGE DISPLAY METHOD AND APPARATUS

BACKGROUND OF THE INVENTION

The invention relates to an image display method and apparatus using a liquid crystal display unit which has a memory function and is matrix driven and, more particularly, to an image display method and apparatus displaying and driving a liquid crystal display unit of a phase transition type at a high speed.

In association with the recent progress of the realization of the office automation, a liquid crystal projector apparatus using a liquid crystal display (LCD) unit has been developed. By sending a CRT picture plane of a personal computer to the projector apparatus and projecting and displaying it, such a picture plane is used for presentation or the like. Hitherto, as a liquid crystal display unit, a TFT liquid crystal display unit of an active matrix driving type is known. Although such a display unit can also display a motion image by a high speed driving at a video rate, a pixel density is as low as, for example, up to (1280 lines×1024 pixels) at the A4 size. According to the TFT liquid crystal display unit, although a rewriting operation of a picture plane can be performed at a high speed, a transmittance of the light is low and the screen is dark. As compared with the liquid crystal display unit of the active matrix driving type such as a TFT liquid crystal or the like, a liquid crystal display unit of a simple matrix driving type has a simple structure and is suitable for realization of a large number of pixels and high precision. There is a liquid crystal display unit of a phase transition type as one of the liquid crystal display units of the simple matrix driving type. At present, the phase transition type LCD unit of the A4 size having (2500 lines×3500 pixels) or more has been put into practical use. The phase transition type LCD unit has a structure such that transparent line electrodes and data electrodes are arranged in a matrix form, and a liquid crystal material is sandwiched between the electrodes at an intersecting position of both of the line and data electrodes. To voltage drive the matrix-shaped electrodes, two driver circuits of a line electrode driver and a data electrode driver are used. In a display operation of the phase transition type LCD unit, a line electrode to be displayed is selected and a voltage is applied thereto by the line electrode driver. The data electrode driver applies a voltage according to a pixel to be displayed and a pixel not to be displayed in pixel data to be written. When no voltage is applied, the liquid crystal of each pixel on the selected line electrode becomes a cholesteric phase by which the incident light is scattered, so that "black" of a low light transmittance is displayed. On the contrary, when a voltage is applied, the liquid crystal changes to a nematic phase having a high light transmittance and transparent "white" is displayed. As mentioned above, a display is executed due to a difference between the light transmittances. By sequentially repeating similar processes with respect to all lines, the display of the whole screen is accomplished. The phase transition type LCD unit has a memory function and display data which has once been written is displayed as it is so long as a holding voltage is applied.

The details of the phase transition type LCD unit have been disclosed in, for example, Phase transition type projection display (Display and Imaging, Vol. 1, No. 1, pp. 61–69, 1992)

A5-M pixel overhead projection display utilizing a nematic-cholesteric phase-transition liquid crystal (Journal of the Society for Information Display, Vol. 1, No. 1, pp. 43–49, 1993)

According to the phase transition type LCD unit as mentioned above, although the resolution is high, the light transmittance is high and the screen is bright, there are problems such that the display speed is slow and the rewriting time of the picture plane is slower than that of the TFT LCD unit. Namely, it takes tens of milliseconds to rewrite from black (scattering state) to white (transparent state) and, contrarily, a writing time of a few milliseconds is required to rewrite from white (transparent state) to black (scattering state). For example, it takes about 20 seconds to display an image after the phase transition type LCD unit of (2500 lines×3500 pixels) was initialized. To solve the above problem such that the rewriting time of the picture plane of the phase transition type LCD unit is slow, in the conventional display control, data of a previous picture plane and data of a new picture plane are always compared and only a different portion is rewritten, thereby reducing the rewriting time (refer to JP-A-61-138991, JP-A-2-217893, JP-A-7-5845, etc.). In the conventional display control in which only the different portion between the new and previous picture planes is rewritten, there is an effect when a picture plane having continuous contents like a motion image is switched. In a liquid crystal projector for mainly displaying a still image, however, there are many cases where the contents of the picture plane are exactly different every time. Even if only the portion different from the previous picture plane is rewritten, a reduction of the rewriting time cannot be expected.

When switching the picture plane of the phase transition type LCD unit, for example, since 2500 lines are sequentially displayed for an enough time of about ten seconds, the picture plane is slowly rewritten from the top to the bottom and it takes a time until the contents of the next picture plane are grasped. Therefore, in case of retrieving desired contents while switching the picture plane, it is troublesome to recognize the retrieval picture plane and retrieval takes a too long.

Further, in the phase transition type LCD unit, when an interlace writing to realize a high speed writing operation which is used in a CRT or the like is performed, since a whole writing speed is slow, if the writing operations are sequentially performed in accordance with the order of the odd line and the even line, there is a problem such that the contrast of the display during the writing operation deteriorates. Since the time required for writing and required for erasing are not equal, as in the CRT, the interlace writing such that data is divided into blocks on a plural line unit basis and the interlace writing is executed in accordance with the order of the odd blocks and even blocks cannot also be performed. Therefore, with respect to the phase transition type LCD unit, the display time using the interlace writing cannot be made fast.

When the phase transition type LCD unit of the matrix driving type is used in a liquid crystal projector apparatus or the like, the liquid crystal projector apparatus is connected as an external display apparatus to a personal computer, and image data formed by the personal computer is sequentially selected from the top line and is transferred and displayed. In this case, if the display speed of the phase transition type LCD unit can be made fast, a problem occurs such that a data transfer speed cannot follow a display speed and the display speed is, consequently, limited by the data transfer speed.

SUMMARY OF THE INVENTION

According to the invention, an image display method and apparatus which can realize a high data transfer speed according to the realization of a high writing speed of a phase transition type liquid crystal display unit is provided.

First, according to each invention of the present application, a plurality of display pixels are arranged on each of a plurality of display lines which can be independently driven, and pixel data of one line is written to one or a plurality of display lines, thereby displaying. Specifically, a phase transition type liquid crystal display unit in which a liquid crystal is sandwiched at an intersecting position between a line electrode and a data electrode and which is driven in a simple matrix driving manner is used.

First Invention

With respect to a display unit using such a phase transition type LCD unit which is display driven by a writing operation of a line unit, an image display method of the first invention of the present application is characterized by having the following processing steps:

A display line setting step
(the order of display lines to be written and displayed is set).
A reading step
(line data is read out from an image data storing unit in accordance with the order set in the display line setting step).
A write line detecting step
(each time the line data is read out in the reading step, the line data and each line data in the image data storing unit are compared, thereby detecting the write display line for the display unit).
A display step
(the line data read out in the reading step is written and displayed to the display lines of one or a plurality of display units including the present processing line detected in the write line detecting step).

By such an image display method, the writing display operations of a plurality of lines are simultaneously executed by one writing operation and the writing display of all of the pixels can be completed before writing all lines. Particularly, with respect to image data such that display pixels are arranged in the direction perpendicular to the display line, the simultaneous writing operation by line data that is common to each line is efficiently executed and the writing display is completed in an extremely short time. For example, in a rectangular image such as a square image or a rectangular image, the writing display of all pixels is completed by only the writing process of the head line on which display pixels appear. According to the image display method of the invention, the display by the simultaneous writing of a plurality of lines is executed in accordance with the order of the display pixels existing commonly for the plurality of lines from the display pixels of a larger number. The image display method essentially has a hierarchical display function such that an image schematically appears at the writing initial stage and is switched to a detailed display with the elapse of time. Therefore, in a picture plane retrieval or the like, an outline of the image can be recognized at the writing initial stage and the retrieval by the switching of the picture plane can be also executed at a fairly high speed. For example, in the case of document image data, such as graph or table including ruled lines (vertical ruled lines) which perpendicularly cross the display line, the vertical ruled lines are displayed together at the writing initial stage, and a state in which the image includes the table or graph can be immediately recognized. A reading step here has a display pixel detecting step of detecting whether the read-out line data includes display pixels which need to be written in the display unit or not. When the read-out line data doesn't include the display pixels, the write line detecting step and display step are skipped and the next display line is read out. Thus, the line data including no display pixel is eliminated from the writing process and a display speed is improved by an amount corresponding to such eliminated line data. In the write line detecting step, the display line having the same data as the line data read out by the reading step is detected from the image data storing unit. Such a process corresponds to the AND of the display line which is at present a processing target, and the display pixel of the other line is obtained. By simultaneously writing the same line data to a plurality of lines, the display speed is improved. In the write line, detecting step, a display line a part of which includes the line data read out by the reading step, is detected from the image data storing unit. The other lines including the display pixels of the display line which is at present a processing target are detected, the line data of the processing target line is simultaneously written into the plurality of detected lines, thereby increasing the number of pixels to be written in one time as much as possible, thereby improving the display speed. In the display step, an additional writing to write data into only the pixels which are not written to the display unit is executed. In the display step, data can also be overwritten to the pixels which have already been written. In the write line detecting step, when all of the display pixels of the detected display lines have already been written, those detected lines are removed from the write line. Specifically speaking, each time the writing operation is executed, the display pixels which have already been written in the image data storing unit are erased and it is sufficient to repeat the display process with respect to the display pixels in which the writing operation is not yet finished. In the display line setting step, the display lines of the display unit are sequentially designated from the head, thereby allowing the line data to be read out by the reading step. It is also possible to read out the line data by sequentially designating the display lines from the smaller number of display pixels included in the line data. As the number of display pixels in the line data is small, the number of other line data including such line data is large, so that the number of display lines to be written in one time increases and a more efficient writing display can be expected. Further, the display area of the display unit is divided into areas each comprising a plurality of lines. Each process of the display line setting step, reading step, write line detecting step, and display step is executed on a divided area unit basis. In this case, each time the writing operation is executed once, the divided areas are sequentially switched and data is written into all areas. By dividing the processing area as mentioned above, the number of lines to be treated by the writing process of one time is reduced and a burden on processes can be reduced. Particularly, in case of realizing the writing process by hardware or firmware, since the apparatus has a circuit scale corresponding to the number of lines to be treated by the writing process of one time, it is desirable to reduce the number of lines by the area division.

According to the invention, an image display apparatus to display image data to a phase transition type liquid crystal display is provided. The display apparatus comprises: a display line setting unit setting the order of display lines to be written and displayed to the phase transition type liquid crystal display; a reading unit reading out line data from an image data storing unit in accordance with the order set by the display line setting unit; a write line detecting unit comparing the line data read out by the reading unit with each line data in the image data storing unit each time the line data is read out by the reading unit, thereby detecting a write display line for the phase transition type liquid crystal display; and a display unit writing and displaying the line data read out by the reading unit to one or a plurality of display lines of the phase transition type liquid crystal display detected by the display line detecting unit.

Second Invention

An image display method according to the second invention of the present application is characterized by having: detecting common line data representing all lines from image data of an image data storing unit, designating a plurality of lines of a display unit, and simultaneously writing; and reading out the line data from the image data storing unit in accordance with a preset order after the common line data was written, detecting one or a plurality of display lines to which the read-out line data is written, and additionally writing and displaying. According to the second invention, prior to the writing display of every line according to the first invention, for example, the common line data is detected by the AND of all of the line data and the common line data is simultaneously written to all of the lines, thereby enabling schematic image of a whole image to be displayed in a lump by the first writing operation of one time. Therefore, as compared with the first invention in which the display lines are sequentially designated and the common display pixels are displayed together by a plurality of lines as much as possible, the number of pixels of the whole picture plane which can be displayed at the writing initial stage remarkably increases and the display speed can be improved because of the decrease in number of writing times. Particularly, since the number of pixels to be displayed together is large at the writing initial stage, the schematic contents can be promptly grasped at the time of the retrieval of the picture plane. The screen can be efficiently switched to the picture plane to be retrieved. The additional writing display after the batch display using the common line data at the first time is executed substantially in the same manner as the image display method of the first invention.

Third Invention

According to the third invention of the present application, an image display method and apparatus executing a display operation of a phase transition type liquid crystal display unit at a high speed by enabling an interlace writing to be executed on a unit basis of one or a plurality of lines are provided. As an image display method of the display unit for this purpose, the third invention is characterized by having: forming single write data representing n lines with respect to each of (m) blocks obtained by dividing the display unit every (n) lines when (m) and (n) are arbitrary integers; simultaneously writing the write data formed in the first data forming step in a first writing time (one unit time of about 5 msec in which white is rewritten to black) into the (n) lines every block; forming additional write data to be additionally written every line of the display unit; and writing the additional write data formed in the second data forming step in a second writing time (ten and a few unit times of about 75 msec in which one unit time is repeated ten and a few times and white is rewritten to black) longer than the first writing time. Further, the image display method of the third invention designates the first writing time of one unit time and the second writing time of ten and a few unit times and a line number designating step of designating the number of lines (n) in which the write data is simultaneously written in the first data writing.

As mentioned above, the display unit is divided into (m) blocks on a (n) line unit basis, the single write data which is used for the simultaneous writing of (n) lines is first formed, and the simultaneous writing operation of (n) lines is executed by the write data. In such a writing of the first stage, in the phase transition type liquid crystal display unit, after the display unit was initialized, the simultaneous writing operations of (m) blocks are executed in one unit time of about 5 msec necessary to rewrite white to black, so that the whole outline of one picture plane is displayed. Therefore, even if the number of writing times is not reduced, the whole contents can be known at the writing initial stage. After that, the ordinary additional writing at the second stage which needs ten and a few unit times of 75 msec is executed on a line unit basis, so that the detailed display is executed. Thus, since the whole contents are known at the initial stage, the picture plane can be seen as if the user can feel a high speed display. The ordinary interlace writing relates to the case where the number of lines (n) is set to (n=2). For example, in the writing at the first stage, the write data of the odd lines is simultaneously written to the even lines. After that, the inherent write data is additionally sequentially written to the even lines. In this case, a situation such that the data is written to all lines by the writing at the first stage and a contrast deteriorates during the interlace as in the conventional apparatus doesn't occur. In the first data forming step, as representative write data of (n) lines to be first written, by forming such data by the AND of the write data of (n) lines, the data which is most common to all of the (n) lines can be simultaneously written. The representative write data of (n) lines is set to the data of the first head line in the write data of (n) lines. Since the data between the lines has a high correlation, the representative write data to be simultaneously written to (n) lines can be easily formed. In the first data forming step, when all of the formed write data is blank, by skipping the writing operation without supplying the write data to the first data writing step, the writing time can be further reduced. In the second data forming step, when the data to be additionally written is the same as the data which has already been written by the first data writing step, since the additional writing is unnecessary, the additional write data is not supplied to the second data writing step but the writing operation is skipped, thereby reducing the writing time. The second writing time for the additional writing in the phase transition type liquid crystal display unit changes depending on a temperature of the display unit. Therefore, the second writing time is changed in accordance with the temperature of the display unit. In the second data forming step and the second data writing step, the order in the additional writing operations of (n) lines is set to an arbitrary order such as ascending order, interlacing order, random order, or the like, thereby enabling the portion in which the additional writing is executed in the picture plane to be inconspicuous. An image display apparatus of the display unit which is displayed and driven by the writing operation of a line unit has: a first data forming unit for forming single write data representing (n) lines with respect to each of (m) blocks obtained by dividing the display unit every (n) lines; a first data writing unit simultaneously writing the write data formed by the first data forming unit to (n) lines every block in a first writing time; a second data forming unit for forming additional write data to be additionally writing every line of the display unit; and a second data writing unit sequentially writing the additional write data formed by the second data forming unit every line in a second writing time longer than the first writing time.

Fourth Invention

According to the fourth invention of the present application, there is provided an image display method of a display unit in which the display unit is constructed so as to have a plurality of display areas that can independently be driven and is display driven by a writing operation of a line unit of each display area.

The fourth invention is realized by applying the third invention to the display method of the first invention or the second invention with regard to each of the plurality of display areas which can be independently driven in the display unit. When applying the third invention to the first invention, the image display method is constructed by the following processing steps:

A write line detecting step (the line data is read out from the image data of the image data storing unit in accordance with a predetermined order every display area of the display unit and the line data is compared with each line data of the same display area in an image data storing unit, thereby detecting one or a plurality of write lines for the display unit).

A display step (the line data read out at present is written and displayed to the write line of every display area detected in the write line detecting step).

When applying the third invention to the second invention, the following processing steps are provided before the write line detecting step and the display step:

A common line data detecting step (the line data of a plurality of lines is read out from the image data in the image data storing unit every display area of the display unit and common line data included commonly in the plurality of lines and the write lines are detected).

A common line data display step (the corresponding common line data is simultaneously written and displayed to the write lines of every display area detected in the common line data detecting step).

According to the fourth invention as mentioned above, by dividing the display unit into a plurality of areas which can be independently driven and by executing the writing display in parallel, the display speed in the first invention can be further raised in accordance with the number of divided areas. In this case, there is a fear such that the data transfer speed of the image data doesn't follow the display speed of the display unit and the display speed is limited by the data transfer speed. In the fourth invention, therefore, in the write line detecting step and the common line data detecting step, the line data detected every display area and the detection information of the write lines are compressed and code data is outputted and, in the display step and the common line data display step, the line data of each display area and the write line detection information are decoded from the received code data and are simultaneously written into each display area. By the compression transfer of the image data, a data transfer speed exceeding the high display speed is realized, thereby assuring a high speed display performance.

According to the fourth invention, there is provided a display apparatus having the phase transition type liquid crystal display unit which has a plurality of display areas which can be independently driven and is displayed and driven by the writing operation of a line unit of each display area. The display apparatus has: an image data storing unit storing image data to be displayed; a write line detecting unit reading out line data from the image data in the image data storing unit every display area of the display unit in accordance with a predetermined order and comparing the line data with each line data of the same display area in the image data storing unit, thereby detecting one or a plurality of write lines for the display unit; and a display unit writing and displaying the line data which is read out at present to the write lines of every display area detected by the display line detecting unit. Further, the display apparatus has: a common line data detecting unit reading out the line data of a plurality of lines from the image data in the image data storing unit every display area of the display unit prior to the writing display of the write line detecting unit and display unit and detecting the common line data included commonly in the plurality of lines and the write lines of the common line data; and a common line data display unit simultaneously writing and displaying the corresponding common line data to the write lines of every display area detected by the common line data detecting unit.

The above and other objects, features, and advantages of the present invention will become more apparent from the following detailed description with reference to the drawings.

BRIEF DESCRIPTION OF THE DRAWINGS

FIGS. 1A and 1B are block diagrams of an embodiment of the invention;

FIGS. 5A and 5B are timing charts showing the number of times of the writing display operation in FIG. 3 in comparison with the conventional one;

FIG. 6 is a flowchart for a writing display process in FIG. 3;

FIGS. 9A and 9B are timing charts showing the number of times of the writing display operation in FIG. 7 in comparison with a conventional one;

FIGS. 11A and 11B are block diagrams of a modification of FIGS. 1A and 1B in which a write controller is provided on a projector side;

FIG. 14 is a correspondence explanatory diagrams for a frame memory, common data, and liquid crystal display panel in a hierarchical writing in FIGS. 13A to 13H;

FIG. 30 is an explanatory diagram for a simultaneous interlace writing in a mode 3 by the write controller in FIGS. 24A and 24B;

FIGS. 31A and 31B are block diagrams of a modification in which the write controller in FIGS. 24A and 24B is provided on the personal computer side;

FIGS. 32A and 32B are block diagrams of an embodiment of the invention in which a liquid crystal panel is divided into display areas which can be independently driven and parallel writing operations are executed;

FIGS. 35A and 35B are block diagrams of a modification in which a write controller in FIGS. 32A and 32B is provided on the personal computer side.

DETAILED DESCRIPTION OF THE PREFERRED EMBODIMENTS

[Common Write Control of Line Data]

Figure 1B:
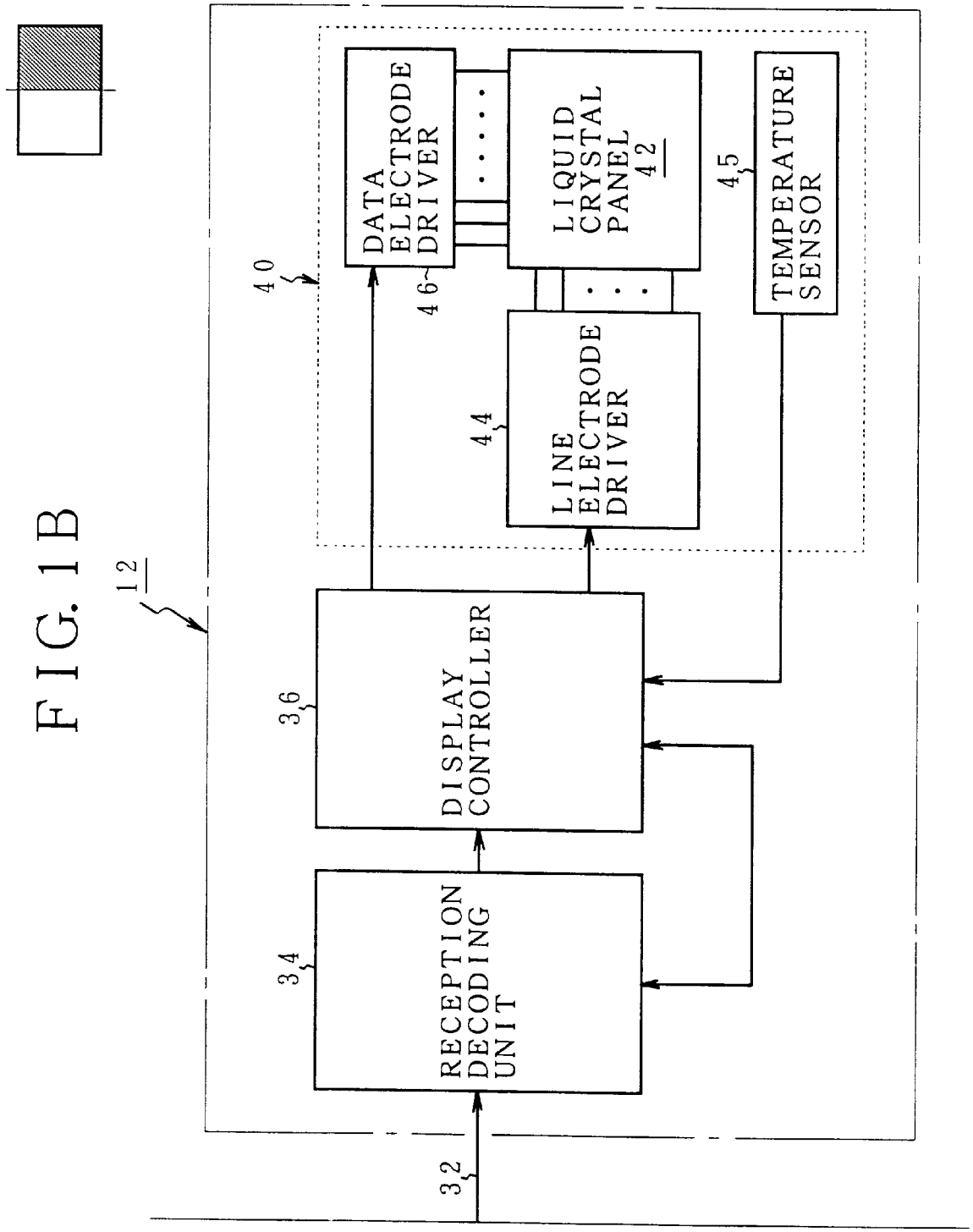

FIGS. 1A and 1B are block diagrams of an embodiment of a display apparatus according to the first invention of the present application. As an external display apparatus for a personal computer 10 as an upper apparatus, in the embodiment, a projector 12 is connected to the outside as a display apparatus of the invention. The personal computer 10 has an MPU 14. An ROM 16 and an RAM 18 are connected to the MPU 14 through a system bus 22. The RAM 18 and a frame memory 20 which functions as an image data storing unit to output the image data to the outside are connected to a data bus 24. Image data to be displayed on a display of the personal computer 10 itself and the projector 12 as a display apparatus connected to the outside has been developed in a dot image and stored in the frame memory 20. Subsequent to the frame memory 20, a memory controller 26 is provided and executes the writing and reading operations for the frame memory 20 by a command that is transmitted from the MPU 14 via the system bus 22. A write controller 28 is provided after the memory controller 26. The write controller 28 executes a simultaneous write control of a plurality of lines for a liquid crystal display (LCD) unit 40 in accordance with an image display method of the invention. Subsequent to the write controller 28, a compression transfer unit 30 is provided. The compression transfer unit 30 compresses line data for simultaneous writing which was formed by the write controller 28 and information indicative of its write lines and sends the compression data to a transmission cable 32. As a compression algorithm in the compression transfer unit 30, a proper compression algorithm such as MH (Modified Huffman) or MMR can be used. Or, a JPEG or the like which has been standardized as a compression system of a still image can be further used. First, a reception decoding unit 34 is provided for the projector 12. The reception decoding unit 34 decodes the compression data sent from the compression transfer unit 30 of the personal computer 10, reconstructs the original line data and the write line information into the image data, and supplies the reconstructed image data to a display controller 36 provided subsequently. The display controller 36 drives and controls the LCD unit 40. The LCD unit 40 is constructed by a liquid crystal panel 42, a line electrode driver 44, and a data electrode driver 46. A phase transition type liquid crystal panel is used as a structure of the liquid crystal panel 42. Although a temperature sensor 45 to detect an environmental temperature of the liquid crystal panel 42 is provided for the LCD unit 40, it is not used in the embodiment but is used in another embodiment, which will be clarified hereinlater.

Figure 2:
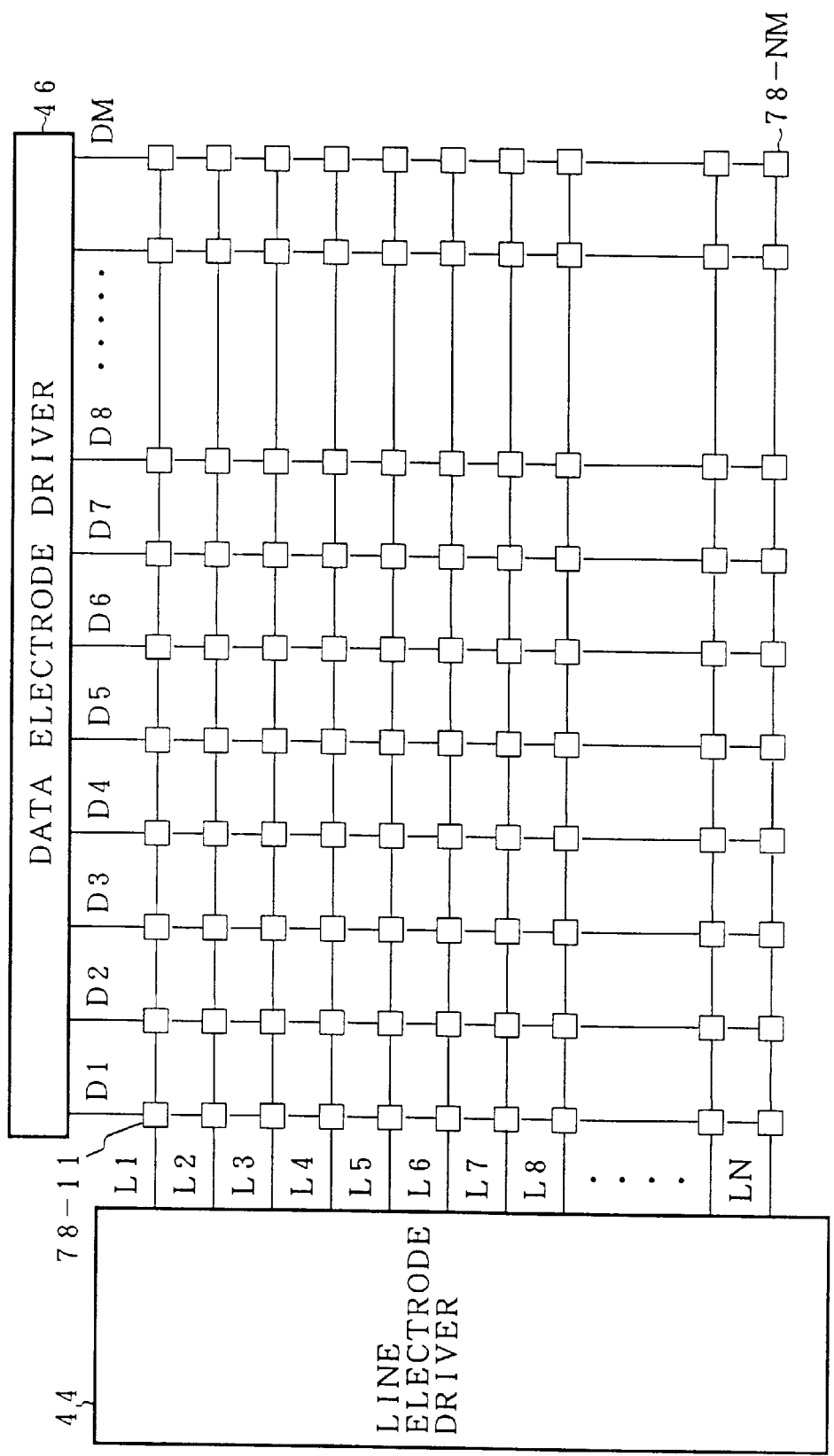
FIG. 2 is a schematic constructional diagram of a liquid crystal display unit in FIGS. 1A and 1B.

FIG. 2 is a diagram showing a schematic construction of the LCD unit 40 in FIGS. 1A and 1B. The phase transition type LCD unit 40 has a device structure of a matrix driving type of (M×N) pixels. Namely, transparent line electrodes L1, L2, L3, . . . , and $L_N$ connected to the line electrode driver 44 and data electrodes D1, D2, D3, . . . , and $D_M$ connected to the data electrode driver 46 are arranged in a matrix shape. A liquid crystal material is sandwiched between the electrodes at an intersecting position of both of the line electrode and the data electrode, thereby forming each of liquid crystal cells 78-11 to 78-NM serving as display pixels. In the display operation of the phase transition type liquid crystal panel 42, first, by designating line numbers for the line electrode driver 44, one or a plurality of lines are selected from the line electrodes L1 to $L_N$ and line voltages are applied to the selected lines. At the same time, line pixel data of one line, namely, M pixel data is given to the data electrode driver 46 and voltages corresponding to the line pixel data are applied to the data electrodes D1 to $D_M$. For example, when the pixel data to the data electrode driver 46 is equal to 1, the voltage is applied. When it is equal to 0, no voltage is applied. When no voltage is applied by the pixel data "0" on the data electrode driver 46 side, each liquid crystal cell on the line electrodes selected by the line electrode driver 44 becomes a cholesteric phase in which the incident light is scattered, so that black in which a light transmittance is low is displayed. On the contrary, when the voltage is applied from the data electrode driver 46 side in correspondence to the pixel data 1, each liquid crystal cell is changed to a nematic phase in which a light transmittance is high, so that transparent white is displayed. Therefore, a transmittance of the liquid crystal cell is changed in dependence on the presence or absence of the voltage applied according to "1" or "0" of the pixel data by the data electrode driver 46 for the liquid crystal cells of the line electrodes selected by the line electrode driver 44, thereby displaying an image by a dot image. Further, the phase transition type liquid crystal panel 42 has a memory function and the display data which has once been written to the liquid crystal cell can maintain the display state as it is by applying a holding voltage. As a writing operation time, moreover, it takes tens of milliseconds for the writing from black (bit 1) to white (bit 0) which is executed by cancelling the holding voltage. It takes a few milliseconds for the writing from white (bit 0) to black (bit 1) which is executed by applying a driving voltage. Ordinarily, before the image is written, all of the cells of the liquid crystal panel 42 are initialized to white (bit 0) and, after that, the writing of black (bit 1) by the pixel data is performed. As for the initialization writing to write all of the cells of the liquid crystal panel 42 to white (bit 0), it is sufficient to cancel the holding voltage of all of the data electrodes D1 to $D_M$ by the data electrode driver 46 to 0 volt in a state in which the voltage is applied to all of the line electrodes L1 to $L_N$ by the line electrode driver 44.

Figure 3:
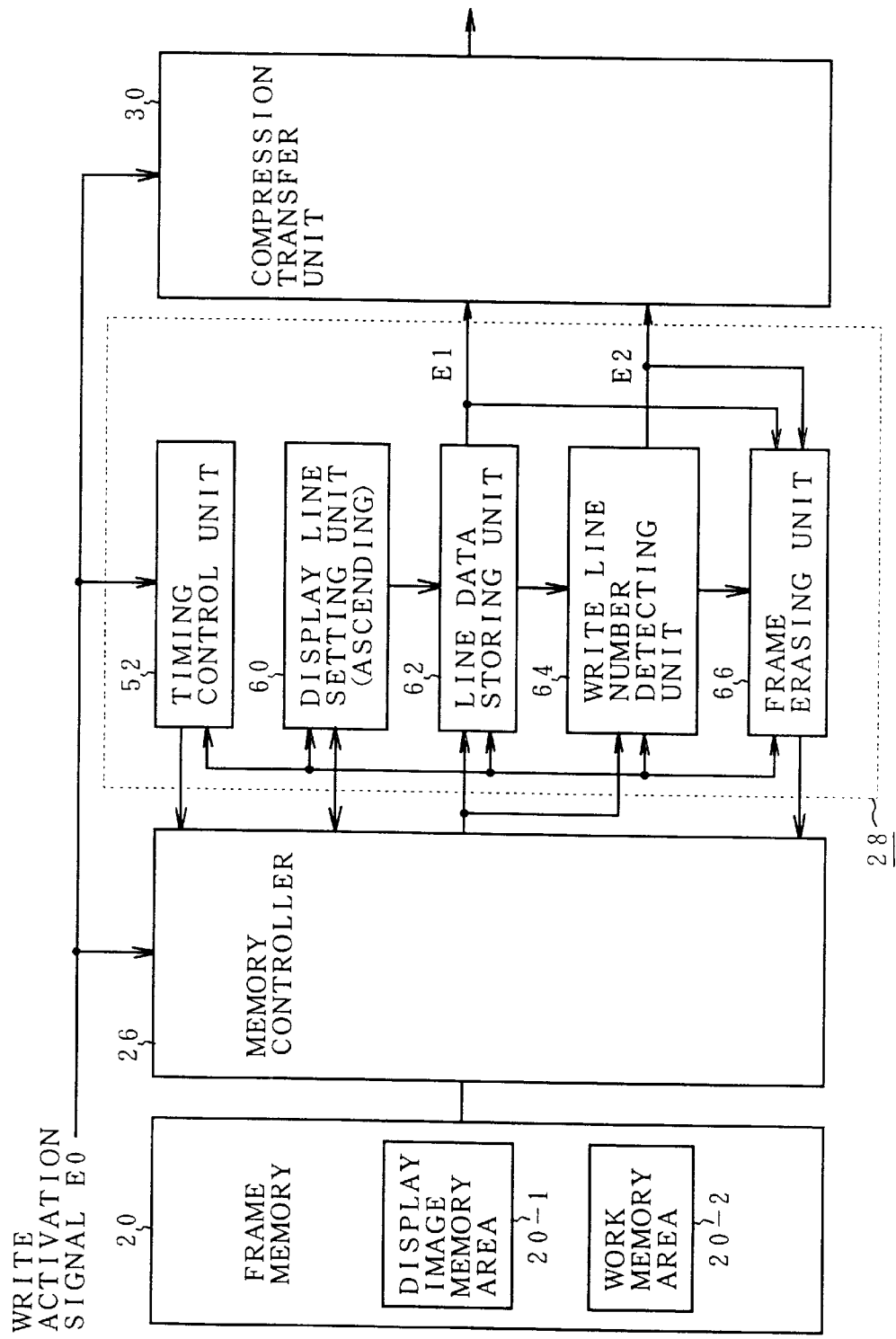
FIG. 3 is a functional block diagram of a write controller to which an image display control of the invention is applied.

FIG. 3 shows a functional block of the write controller 28 provided on the projector 12 side in FIGS. 1A and 1B. The writing display by the image display method according to the invention is performed to the phase transition type liquid crystal display unit 40. The write controller 28 is constructed by a timing control unit 52, a display line setting unit 60, a line data storing unit 62, a write line number detecting unit 64, and a frame erasing unit 66. The timing control unit 52 receives a write activation signal E0 from the personal computer 10 side as an upper apparatus and generates a timing signal to the write controller 28, memory controller 26, and further, compression transfer unit 30. When receiving the write activation signal E0, the write controller 28 first performs an initialization by the erasure of the whole plane of the LCD unit 40 and, after that, writes and displays the image data. Prior to starting the writing, the image data has been stored in a display image memory area 20-1 of the frame memory 20. Namely, the frame memory 20 has the display image memory area 20-1 and a work memory area 20-2. The image data is preserved as original image in the display image memory area 20-1. When the writing operation is performed, the image data is developed into the work memory area 20-2 and a process such as an erasure of the written pixel or the like is executed. The order of write lines for the LCD unit 40 has been preset in the display line setting unit 60 provided for the write controller 28. In the embodiment, the display line setting unit 60 sets the display lines in accordance with the order (ascending order) of the display lines. That is, the lines to sequentially write in accordance with the order of the line numbers L1 to $L_N$ of the line electrodes from the line electrode driver 44 in the LCD unit 40 in FIG. 2 are set. As for the information of the write lines in which the order was set by the display line setting unit 60, each time a timing control signal from the timing control unit 52 is received, the memory controller 26 is accessed and the line data of the image corresponding to the set write line is read out from the work memory area 20-2 in the frame memory 20 and stored into the line data storing unit 62. At the same time, the same line data is stored into the write line number detecting unit 64. The write line number detecting unit 64 compares the line data that is sequentially read out from the work memory area 20-2 with the line data of the display line which has been stored in the line data storing unit 62 and is a processing target at present, thereby detecting whether the line data read out to the write line number detecting unit 64 includes the pixel data of the display pixel, namely, black (bit 1) of the line data in the line data storing unit 62 or not. When the line data includes such pixel data, the relevant line is detected as a write line number at this time. Since the same line data is inputted to the write line number detecting unit 64 and compared even when the first line data that is a processing target at present is stored in the line data storing unit 62, the write line number detecting unit 64 detects the writing number even with respect to the display line which is a processing target at present.

When the line data of the write line which becomes a processing target at present is stored into the line data storing unit 62 and write line number detecting unit 64, if no display pixel is included in the line data, such a fact is notified to the timing control unit 52. The writing process is not performed with respect to such a line and the processing routine is skipped to the writing process of the next display line. When the write line number detecting unit 64 finishes the detection of the write line number including the line data which is a processing target at present of the line data storing unit 62, a line data signal E1 and a write line number signal E2 are supplied to the compression transfer unit 30. After the line data was converted to code data by a compression, the code data is transferred to the projector 12 in FIGS. 1A and 1B. The line data and the write line number are reconstructed by the reception decoding unit 34. The line data in the line data storing unit 62 is simultaneously written and displayed to the LCD unit 40. After completion of the compression transfer of the compression transfer unit 30, the frame erasing unit 66 erases the written pixels in the image data stored in the work memory area 20-2 of the frame memory 20 through the memory controller 26. Such processes are sequentially designated in accordance with the order of the display lines which are set by the display line setting unit 60. When no display pixel is left in the work memory area 20-2, the writing display is finished.

Figure 4A:
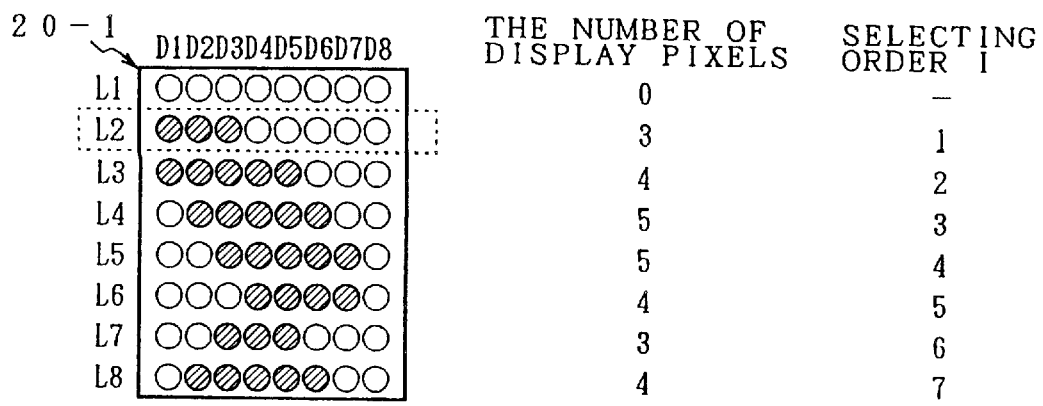
FIGS. 4A to 4G are explanatory diagrams of processing contents of a writing display in FIG. 3.
Figure 4B:
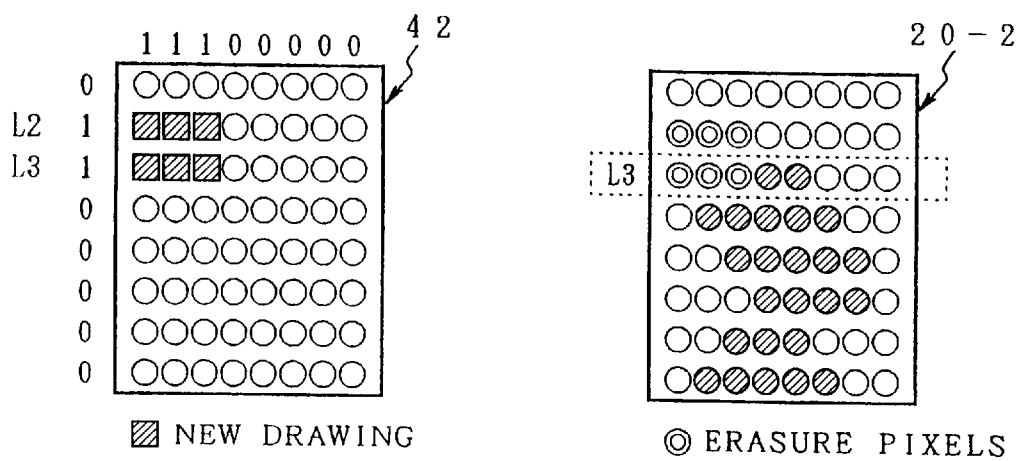
Figure 4C:
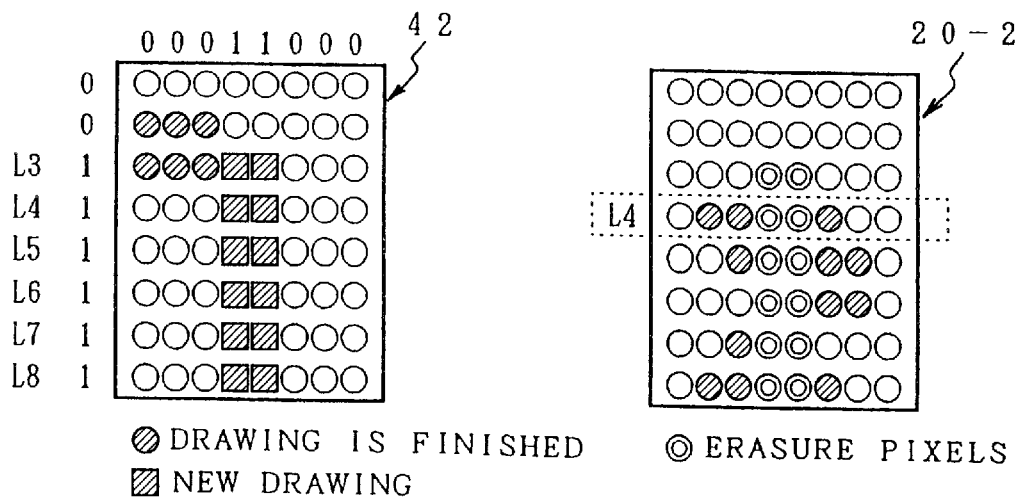
Figure 4D:
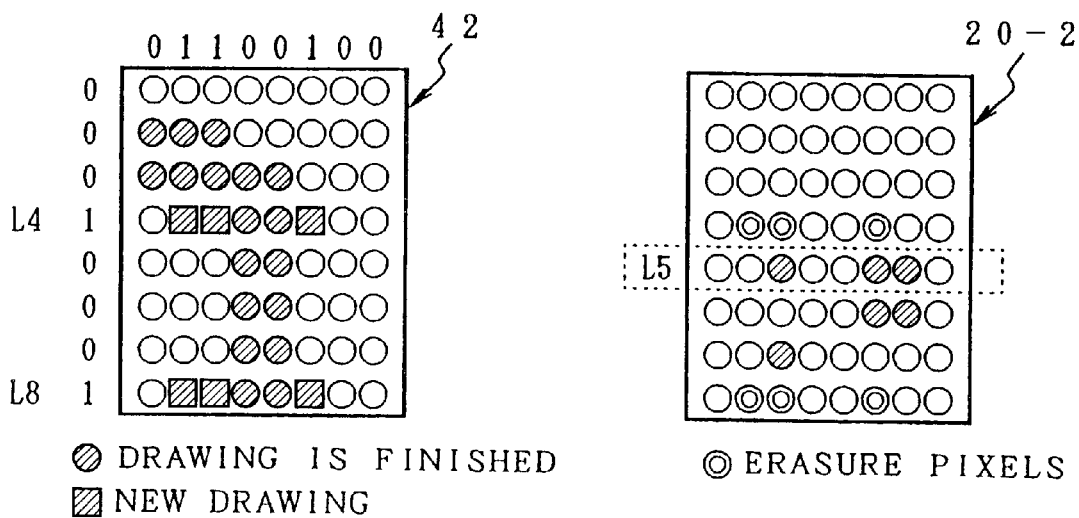
Figure 4E:
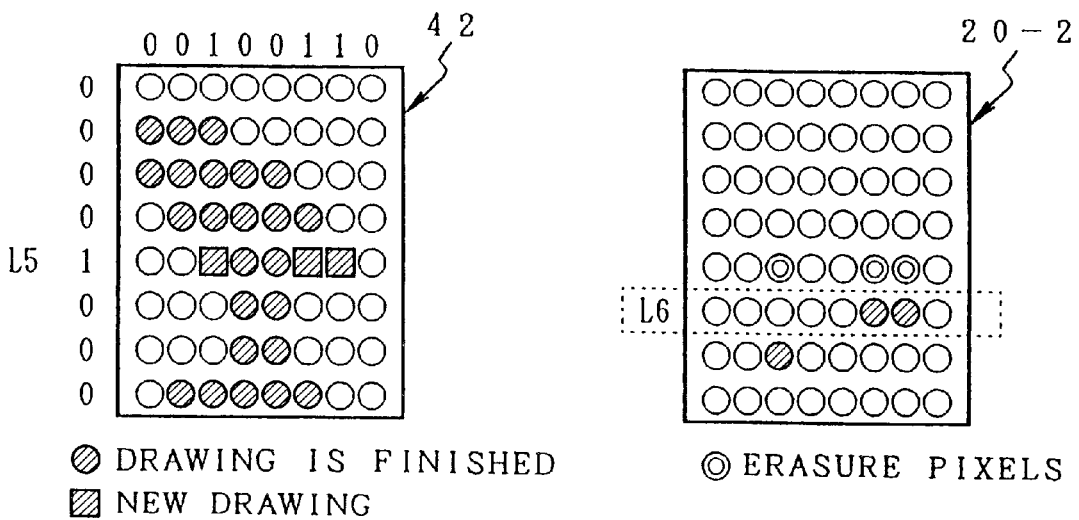
Figure 4F:
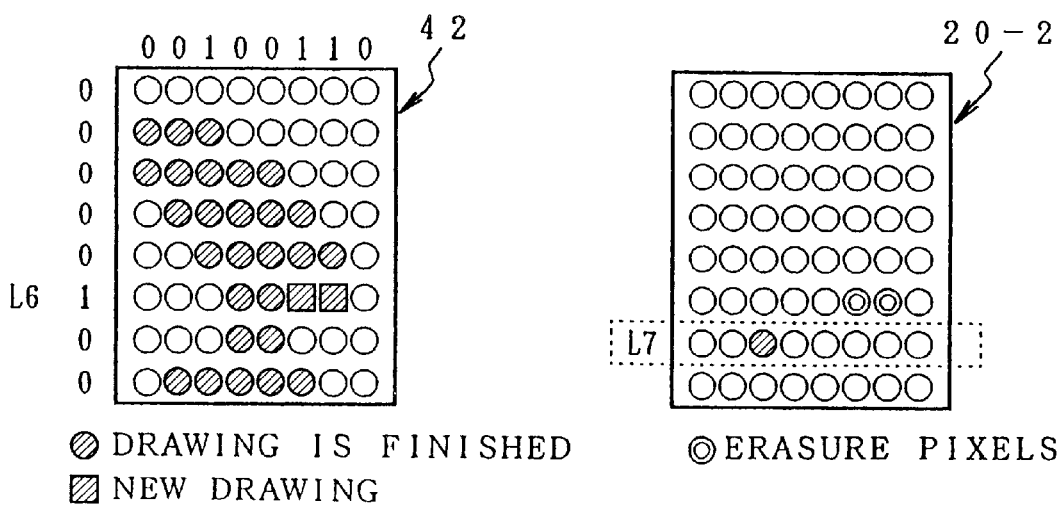
Figure 4G:
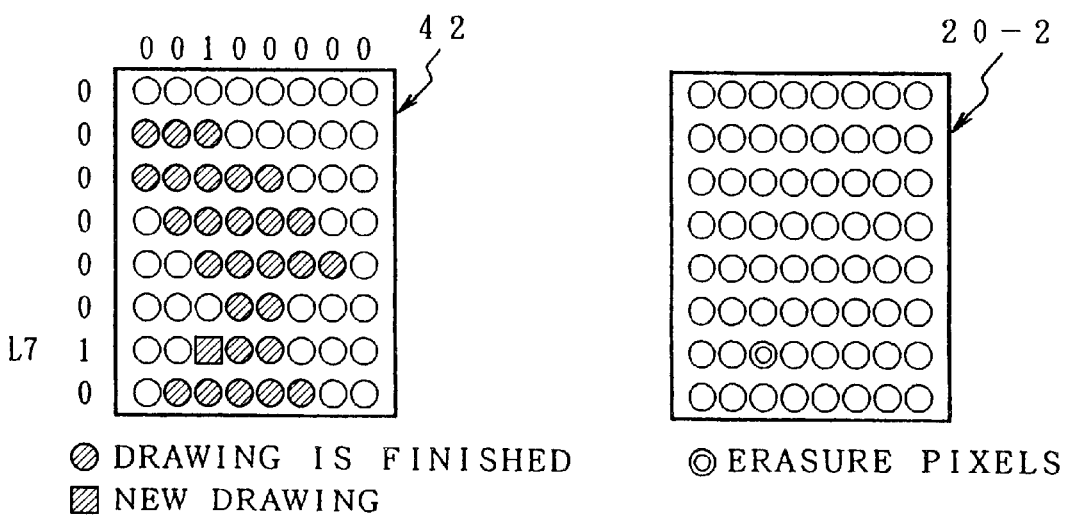

FIGS. 4A to 4G are operation explanatory diagram of the writing display according to the embodiment of FIG. 3. FIG. 4A shows the display image memory area 20-1 in the frame memory 20. For simplicity of explanation, a case where the LCD unit 40 is constructed by total 64 pixels of (8 lines×8 pixels) is shown as an example. The number of display pixels of display lines L1 to L8 in the image data is equal to "03455434" as shown on the right side. In this case, the display line setting unit 60 sequentially sets a line selecting order in accordance with the order of the line Nos. L1 to L8. When the image data in the display image memory area 20-1 in FIG. 4A is written and displayed to the LCD unit 40, the display line L1 is first set. The line data of the line L1 is read out from the work memory area 20-2 to the line data storing unit 62 and write line number detecting unit 64. However, since no display pixel exists with respect to the line L1, the writing display of the line L1 is not performed but the processing routine advances to the process of the next line L2. FIG. 4B shows display contents of the liquid crystal panel 42 in the writing display of the line L2 and an erasing state after the data was written into the work memory area 20-2. First, when the line L2 is set as a display line, the line data "11100000" of the line L2 in the same work memory area 20-2 as that of the image data in FIG. 4A is read out and stored into the line data storing unit 62 and, at the same time, it is stored into the write line number detecting unit 64. The first line L2 is detected as a write line. Subsequently, the line data of the next line L3 is read out and compared with the line data of the line L2 by the write line number detecting unit 64. Since the display pixels of the line L2 are included in the line L3, the line L3 is detected as a write line. With respect to the remaining lines L4 to L8, since all of the display pixels of the line L2 which is at present a processing target are not included, those lines are not detected as write lines. Therefore, in the writing operation of the line L2 of the liquid crystal panel 42, two lines of the write line Nos. L2 and L3 are designated, the data electrodes D1, D2, and D3 as display pixels of the line L2 are set to "1", and a voltage is applied, so that data is newly written to the liquid crystal panel 42. After completion of the writing, three display pixels of each of the lines L2 and L3 are erased as shown in the work memory area 20-2 in FIG. 4B. After completion of the erasure, the next line L3 is set by the display line setting unit 60 and the writing display to the liquid crystal panel 42 by the line data "00011000" of the line L3 in FIG. 4C is executed. Since the display pixels of the line data "00011000" of the line L3 are included in the lines L4 to L8, those line numbers are detected. The same line data is simultaneously written to six lines of L3 to L8. The written pixels are erased as shown in the work memory area 20-2 in FIG. 4C and the next line L4 is set. FIG. 4D shows the writing display to the liquid crystal panel 42 by the setting of the line L4. In this case, the line L8 is detected in addition to the line L4 and the same line data is written to two lines of L4 and L8. After the display pixels in the work memory area 20-2 were erased, the next line L5 is set. FIG. 4E shows the writing display of the line L5 to the liquid crystal panel 42. In this case, the other lines are not detected but the writing display of only the line L5 is performed. After the display pixels in the work memory area 20-2 were erased, the next line L6 is set. FIG. 4F shows the writing display of the line L6 to the liquid crystal panel 42. In this case as well, the other lines are not detected and the writing display of only the line L6 is executed. After the display pixels in the work memory area 20-2 were erased, the next line L7 is set. FIG. 4G shows the writing display of the line L7 to the liquid crystal panel 42. By such a writing operation, all of the display pixels in the work memory area 20-2 are erased and the writing process is finished.

FIGS. 5A and 5B are timing charts of the writing display according to the embodiment of FIG. 3 in comparison with the conventional writing display. FIG. 5A shows the conventional writing display and the writing display of each of the eight display lines L1 to L8, namely, the writing displays of eight times are necessary. On the other hand, FIG. 5B shows the writing display according to the embodiment of FIG. 3 and the number of times the writing can be reduced to six times by the simultaneous writing of a plurality of lines. In association with the progress of the number of times of the writing display in the liquid crystal panel 42 in FIGS. 4A to 4G, at the initial stage of FIGS. 4A to 4C as a writing initial stage, the schematic writing display of the display image in FIG. 4A is executed and, after that, the writing display by the detailed additional writing of FIGS. 4D to 4G is performed. Therefore, the partial pixel display of almost all of the lines is executed by, for example, the writing operation of about two times in FIG. 5B and the outline of the display picture plane can be recognized. Thus, at the time of the retrieving work by the switching of the picture plane, the contents can be grasped by the outline display at the initial stage of the writing display. The necessary retrieval picture plane can be promptly switched and discriminated. When the target retrieval picture plane is obtained, it is sufficient to display until the end.

FIG. 6 is a flowchart for the writing display process in FIG. 3. First in step S1, the line number (n) to set the line as a processing target is initialized to (n=1). In step S2, the line data of the line (n) is read out. In step S3, a check is made to see if the line data of the read-out line (n) includes the display pixels. When it doesn't include any display pixel, the processing routine skips to step S7 and the writing display of this line is not performed but the line number is increased to the next line number. When the line data includes the display pixels, step S4 follows and the other lines including the read-out line data are detected and selected from the image data. In step S5, the data of the display pixels of the selected line is erased from the image data. In step S6, with respect to the selected line number, the line data which is at present being processed is simultaneously written to the liquid crystal panel. After completion of the writing, the line number is increased by "1" in step S7. When the line is not the final line in step S8, the processing routine is again returned to step S3 and the writing display of the next line is executed. In the processes in FIG. 6, before the simultaneous writing of the line data for the detected write lines is executed to the liquid crystal panel in step S6, the display pixels are erased from the frame memory. However, the processing contents are substantially the same even if steps S5 and S6 are exchanged.

Figure 7:
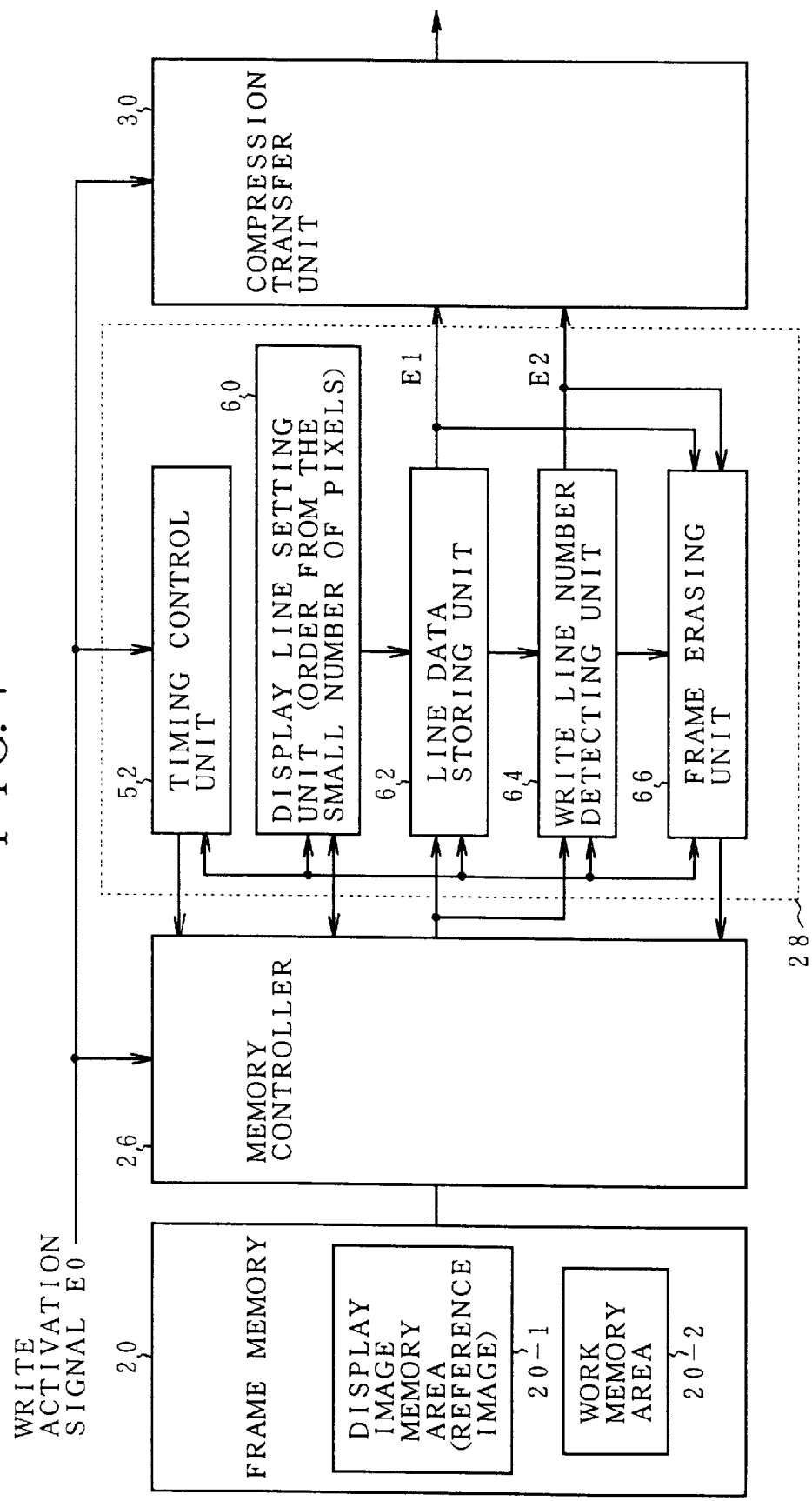
FIG. 7 is a functional block diagram of a write controller to which another image display control of the invention is applied.

FIG. 7 shows another embodiment of the write controller 28 provided on the projector 12 side in FIG. 1A and 1B. The embodiment is characterized in that the order of the display lines to perform the writing display is set to the order from the small number of pixels of the line data. The other construction and functions are substantially the same as those in the embodiment of FIG. 4.

Figure 8A:
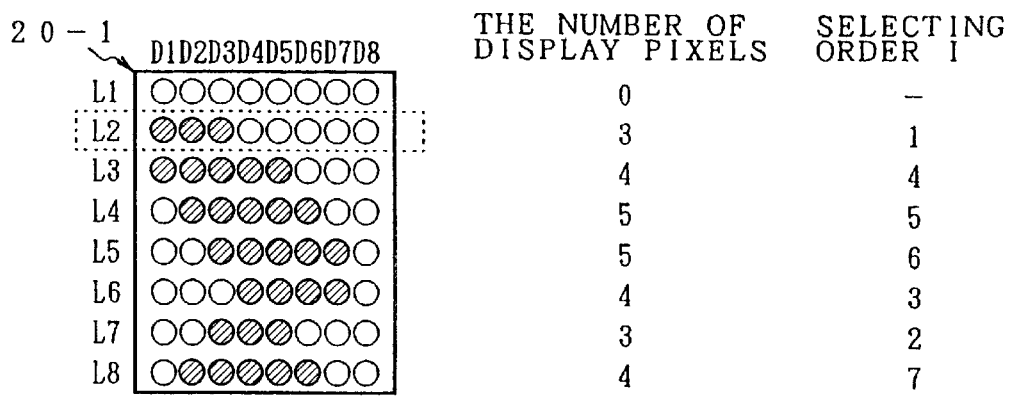
FIGS. 8A to 8E are explanatory diagrams of processing contents of a writing display in FIG. 7.
Figure 8B:
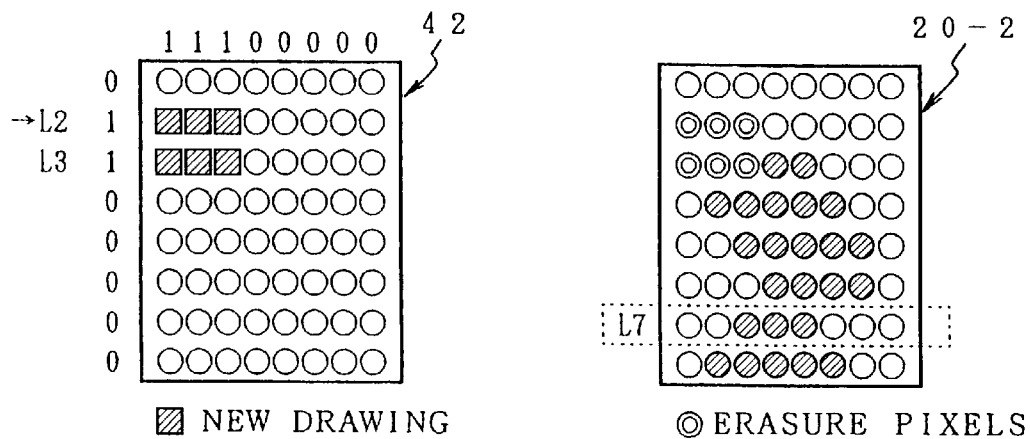
Figure 8C:
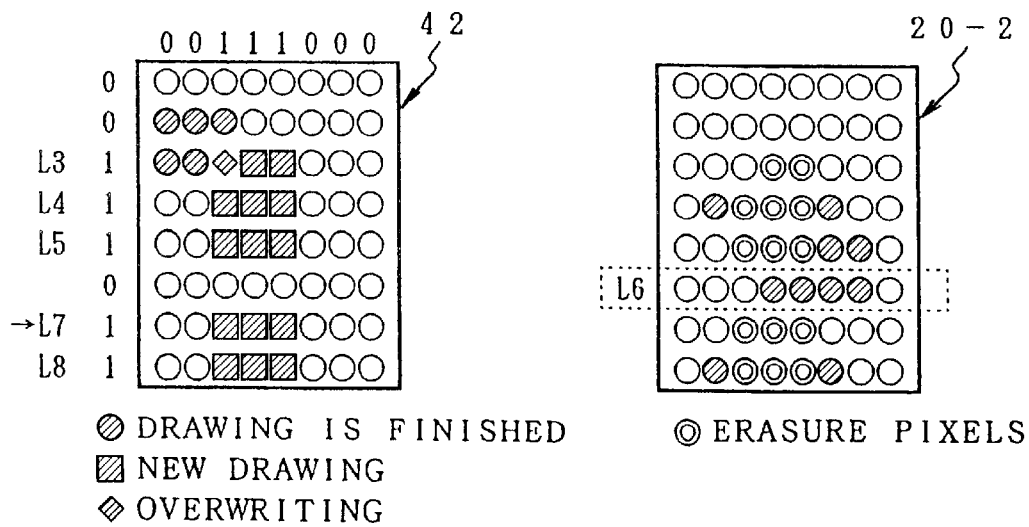
Figure 8D:
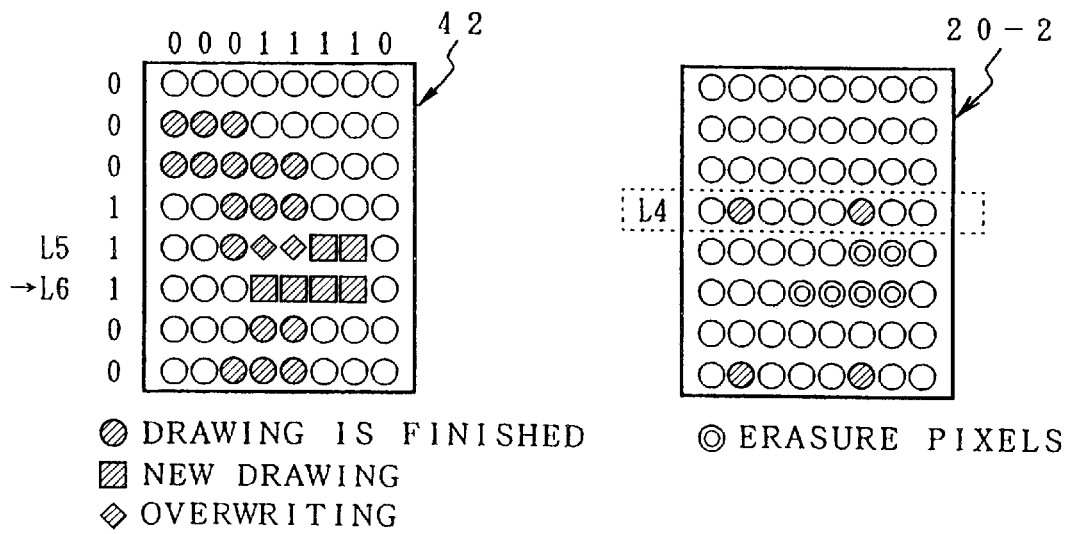
Figure 8E:
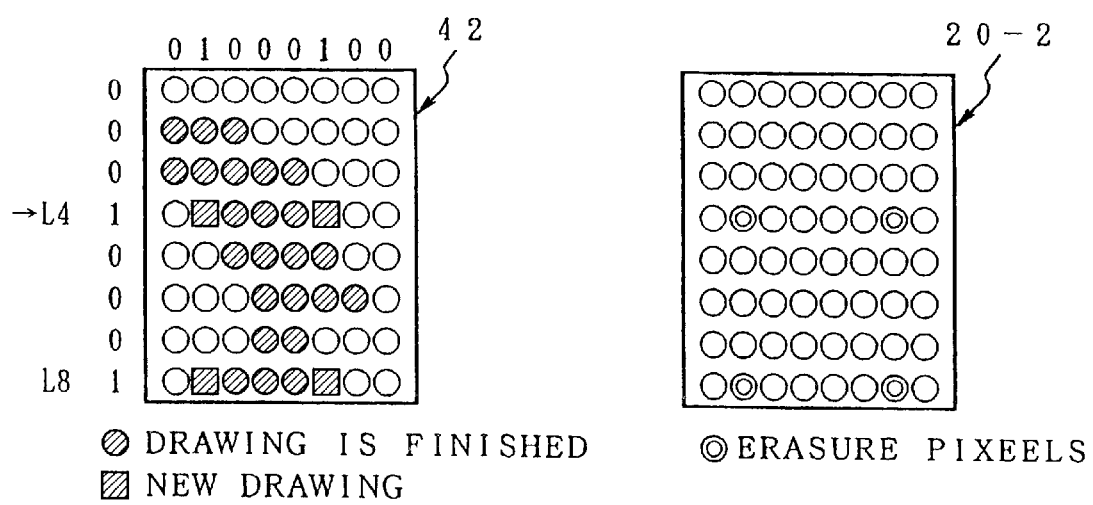

FIGS. 8A to 8E show the writing display by the write controller 28 in FIG. 7. First, image data as shown in FIG. 8A has been transferred from the personal computer 10 side as an upper apparatus and stored in the display image memory area 20-1 of the frame memory 20. When receiving the write activation signal E0, the write controller 28 first activates the display line setting unit 60, sequentially reads out the line data from the display image memory area 20-1 in the frame memory 20, and counts the number of pixels of each line. In FIG. 8A, for simplicity of explanation, a display writing of 64 pixels (8 lines×8 pixels) is shown as an example. In this case, as shown on the right side, the number of display pixels of the lines L1 to L8 is equal to "03455434" and is detected by the display line setting unit 60. When the number of display pixels can be detected as mentioned above, the selecting order is set to the order from the small number of display pixels. Since the line L1 has no display pixel, it is excluded from the targets to set the order. With regard to the remaining lines L2 to L8, the selecting orders are set to L2, L7, L6, L3, L4, L5, and L8, respectively. When the numbers of display pixels are equal, the line of the smaller line number is preferentially set. After completion of the setting of the selecting orders of the lines for the writing display as mentioned above, the writing displays of FIGS. 8B to 8E are executed in accordance with the selecting orders. FIG. 8B shows the writing display to the liquid crystal panel 42 of the line data of the line L2 having the selecting order No. 1 in FIG. 8A. In this case, the line L3 having the same data is detected and the simultaneous writing is executed. The display pixels of the lines L2 and L3 are erased as shown in the work memory area 20-2 and the line L7 having the selecting order No. 2 is subsequently set. FIG. 8C shows the writing display of the line L7 for the liquid crystal panel 42 and the lines L4, L5, and L8 including the display pixels of the line data of the line L7 are detected. In the embodiment, with respect to the line data "00111000" of the line L7 as a processing target at present, it is compared with the original data of the lines L2 and L3 which has already been written, namely, the line data stored in the display image memory area 20-1 in FIG. 8A. In this case, since the line L3 includes the same display pixels as those of the line L7 as a processing target at present, it is detected as a write line. Therefore, in the simultaneous writing using the line data of the line L7, the line data is simultaneously written with respect to five lines of L3, L4, L5, L7, and L8. In this instance, since the third pixel of the line L3 has already been written at the first time in FIG. 8B, it is overwritten. When the display writing is finished, the display pixels are erased as shown in the work memory area 20-2 in FIG. 8C and the next line L6 having the selecting order No. 3 is designated. FIG. 8D shows the writing display of the line L6 to the liquid crystal panel 42. In this case, with respect to the image data in which the display pixels written in the work memory area 20-2 have already been erased, although the other lines including the same line data don't exist, by referring to the image data of FIG. 8A as original image data, it will be understood that the same data is partially included in the line L5. In this case, therefore, the lines L6 and L5 are detected and the simultaneous writing using the line data of the line L6 is performed to the liquid crystal panel 42. Therefore, since the line data has already been written with respect to the line L5, a part of the data is overwritten. After completion of the overwriting, as shown in the work memory area 20-2 in FIG. 8D, the display pixels which were newly drawn are erased and the next line L3 having the selecting order No. 4 is set. However, since the line L3 includes no display pixel, the next line L4 having the selecting order No. 5 is set. Since the display pixels exist in the line L4, the display writing of the liquid crystal panel 42 in FIG. 8E is executed. In the display writing, the line L8 is detected and the line data is simultaneously written to two lines of L1 and L8 using the line data of the line L4. In association with the writing, all of the display pixels are erased by the erasure of the pixels in the work memory area 20-2 in FIG. 8E and the writing procedure is finished.

FIGS. 9A and 9B are timing charts showing the writing display of the invention which is sequentially executed in accordance with the order from the small number of pixels in FIG. 7 in comparison with the conventional writing display. As compared with 8 times in the conventional writing in FIG. 9A, according to the writing of the order from the small number of pixels in FIG. 9B, the writing display can be finished by 4 times, that is the half of the 8 times.

Figure 10:
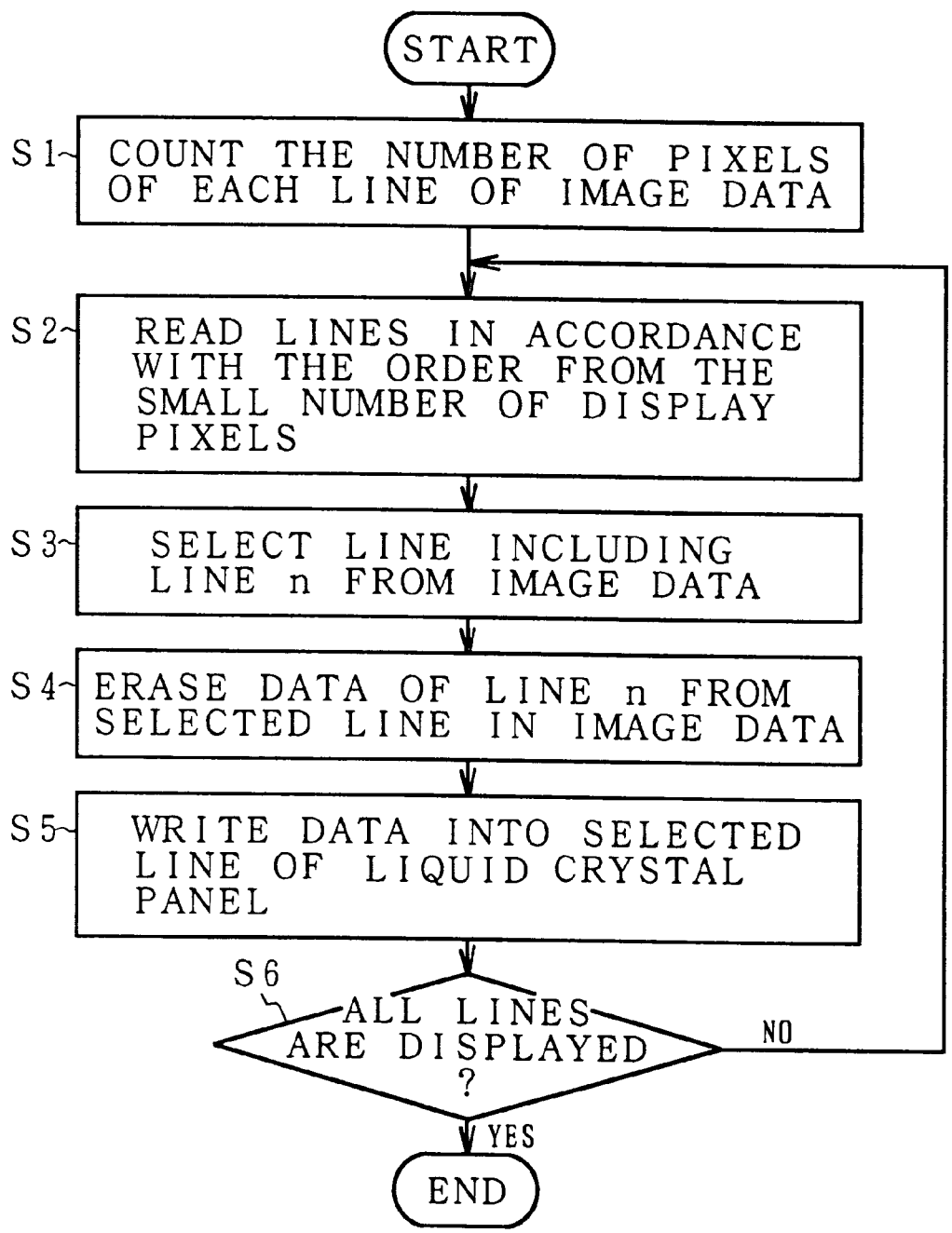
FIG. 10 is a flowchart for a writing display process in FIG. 7.

FIG. 10 is a flowchart for the image display control in which the orders of the display lines are sequentially set in accordance with the order from the small number of pixels in FIG. 7. First in step S1, the number of pixels of each line of the image data is counted. In step S2, the lines are sequentially read out in accordance with the order from the small number of display pixels. In step S3, the lines including the line data of the line (n) which is at present being processed are selected and detected. In step S4, the data of the display pixels of the line (n) is erased from the selected lines of the image data in the work memory area. After that, in step S5, the line data that is at present being processed is simultaneously written to the plurality of selected lines. In step S6, the above processes are repeated until all lines are displayed.

FIGS. 11A and 11B show a modification of FIGS. 1A and 1B and is characterized in that the write controller 28 to perform the write control of the invention is provided on the projector 12 side. In association with it, a frame memory 48 and a memory controller 50 are added to the projector 12. When receiving a write activation, the memory controller 26 of the personal computer 10 continuously reads out the image data in the frame memory 20 on a line unit basis. The image data is converted into code data and transferred by the compression transfer unit 30. The transfer code data is decoded by the reception decoding unit 34 of the projector 12 and stored into the frame memory 48. When receiving a signal indicative of the completion of the transfer of the image data to the frame memory 48, the write controller 28 is activated and starts the write control to the LCD unit 40. The write controller 28 has the same function and construction as those in FIG. 3. The frame memory 20 and memory controller 26 in FIG. 3 are replaced to the frame memory 48 and memory controller 50 in FIGS. 11A and 11B. The compression transfer unit 30 in FIG. 3 is replaced to the display controller 36 in FIGS. 11A and 11B. The embodiment of FIGS. 11A and 11B can simplify the function as a display driver that is provided on the personal computer 10 side and is suitable in a case where the projector 12 to realize the display control of the invention is provided as an option. On the other hand, in the embodiment of FIGS. 1A and 1B, the function on the projector 12 side is simplified. It is sufficient to use any one of the above embodiments as necessary.

[Batch display and additional writing display of common line data]

Figure 12:
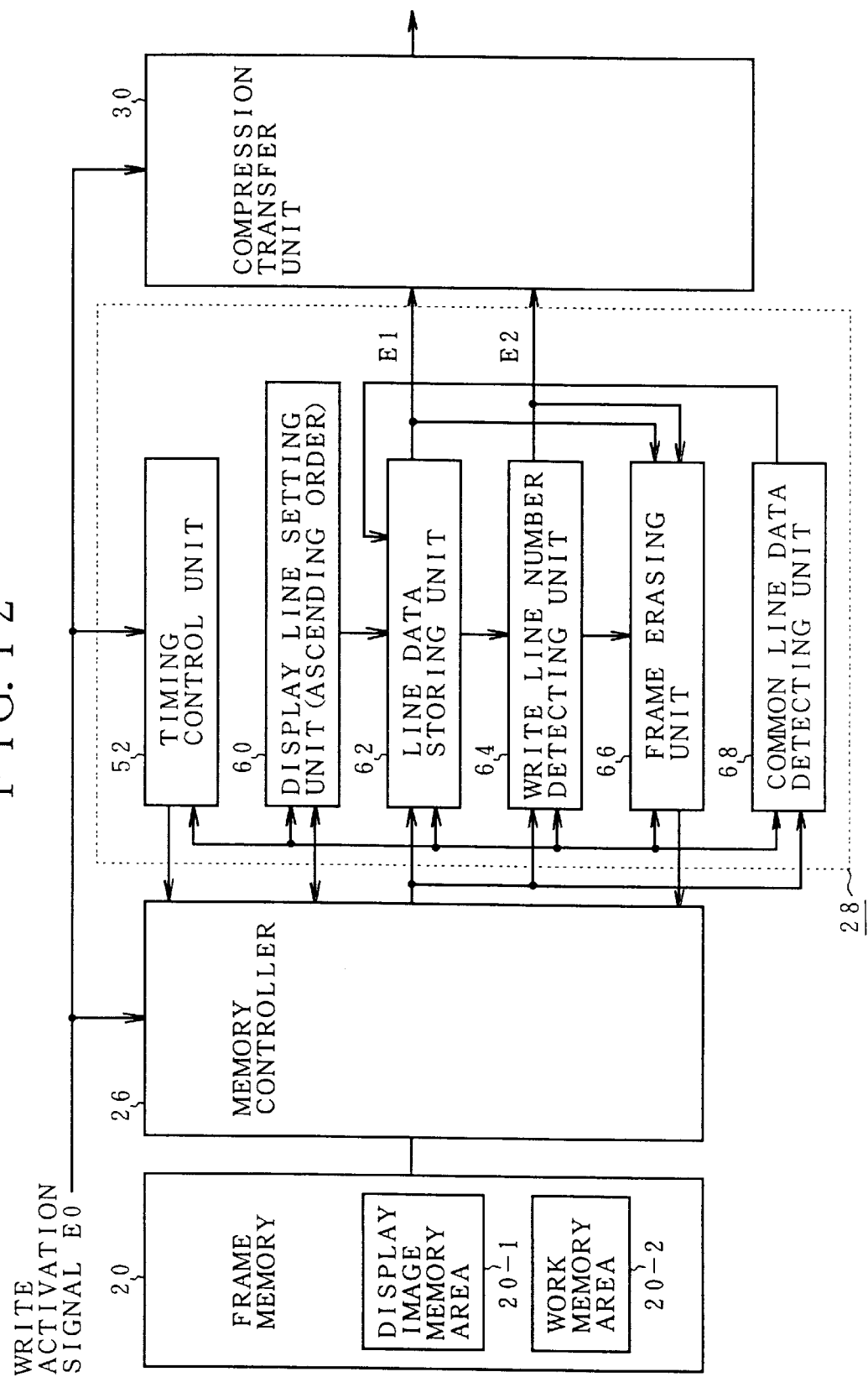
FIG. 12 is a functional block diagram of the write controller in FIGS. 11A and 11B to realize a common batch display.

FIG. 12 is a functional block diagram of the second invention of the write controller 28 provided for the projector 12 in FIGS. 1A and 1B. The write controller 28 is characterized in that in addition to the writing display in which the display lines were sequentially designated by the write controller 28 in FIG. 3, common line data representing the display image is detected at the first time of the writing display and is batch displayed to a plurality of display lines by the simultaneous writing, and after that, the detailed display by the additional writing is executed by the designation of the display lines according to the predetermined order.

In FIG. 12, in a manner similar to the embodiment of FIG. 3, the timing control unit 52, display line setting unit 60, line data storing unit 62, write line number detecting unit 64, and frame erasing unit 66 are provided for the write controller 28. Further, a common line data detecting unit 68 is newly provided in the embodiment. When the write controller 28 is activated on the basis of the write activation signal E0, the common line data detecting unit 68 reads out the line data of all of the display lines stored in the display image memory area 20-1 of the frame memory 20 and detects the common line data representing the image data. When the line data is sequentially read out from the display image memory area 20-1 in the frame memory 20, the common line data detecting unit 68 excludes the line data in which the display pixels necessary to display by the LCD unit 40 don't exist from the detection targets of the common line data. The common line data detecting unit 68, therefore, executes the detecting process of the common line data for all of the line data having the display pixels as targets. The common line data can be detected, for example, as AND data of the display pixels of all of the line data. The detected common line data is stored into the line data storing unit 62. Simultaneously with the storage of all of the line data for the line data storing unit 62, all of the line data is also written into the write line number detecting unit 64. The write line number detecting unit 64 detects the line numbers of the lines having the display pixels as write lines of the common line data. Therefore, when the detection of the common line data is completed and the line data is stored into the line data storing unit 62, the common line data is supplied as a line data signal E1 to the compression transfer unit 30. At the same time, the line number signal E2 of the lines having the display pixels is given from the write line number detecting unit 64. To the LCD unit 40, the compression transfer unit 30 executes a batch writing display in which the detected common line data is simultaneously written to all of the write lines which were likewise detected. After completion of the batch writing display of the common line data as mentioned above, the orders of the display lines are set by the display line setting unit 60. The line data is sequentially read out from the frame memory 20 side every set display line and is stored into the line data storing unit 62. At the same time, the same line data is stored into the write line number detecting unit 64 and the write line numbers are detected. After that, the line data of the subsequent display lines is sequentially read out and transferred to the write line number detecting unit 64. Whether the line data includes the display pixels of the line data in the line data storing unit 62 which is at present a processing target or not is discriminated, thereby detecting the write line number with respect to the line data including such display pixels. After completion of the detecting processes of all lines, the line data stored in the line data storing unit 62 at that time is displayed to one or a plurality of write lines detected by the write line number detecting unit 64 by the simultaneous writing. The additional writing process according to the order of the line number is repeated with respect to all lines. By the batch writing display of the common line data detected by the common line data detecting unit 68, as for the display pixels by the writing of the line data that is executed by the subsequent additional writing, the frame erasing unit 66 executes a process for erasing the display pixels from the image data for display which was developed in the work memory area 20-2 of the frame memory 20 with regard to the relevant display pixels. Therefore, by the progress of the additional writing process in which the line numbers are designated, the writing display of all pixels is completed in a state in which all of the display pixels in the work memory area 20-2 are erased. The additional writing of every display line after the second time corresponds to the writing display control in FIG. 4.

Figure 13A:
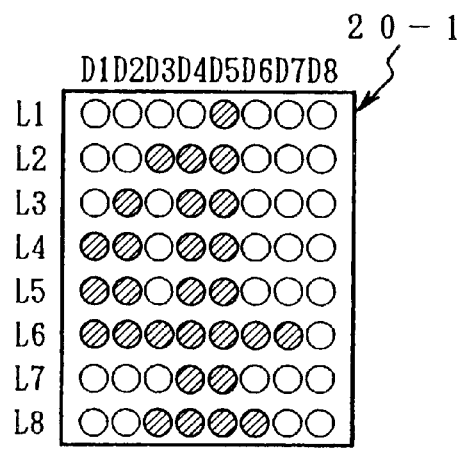
FIGS. 13A to 13H are explanatory diagrams for a simultaneous writing of common data and an additional writing according to the ascending order of line numbers in FIG. 12.
Figure 13B:
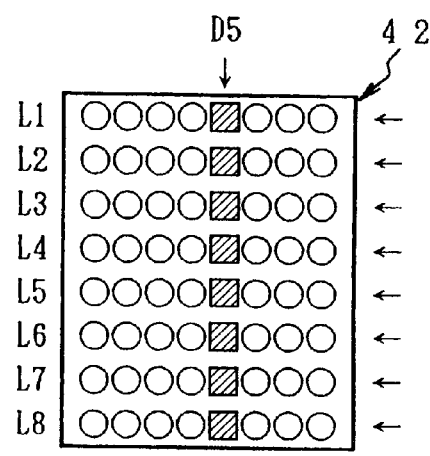
Figure 13C:
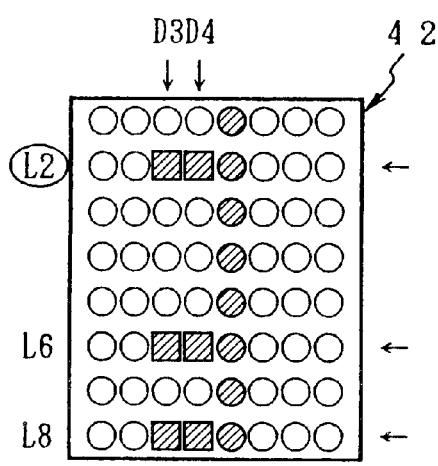
Figure 13D:
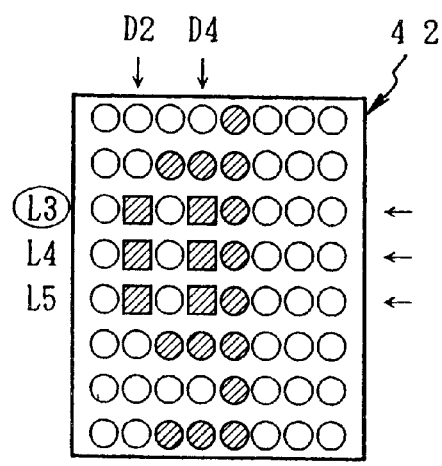
Figure 13E:
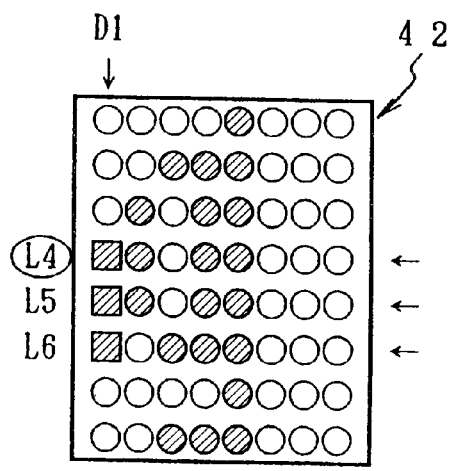
Figure 13F:
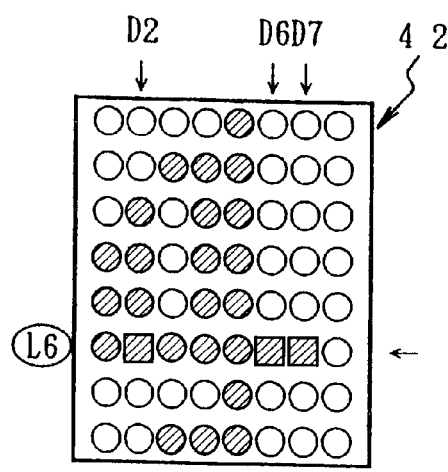
Figure 13G:
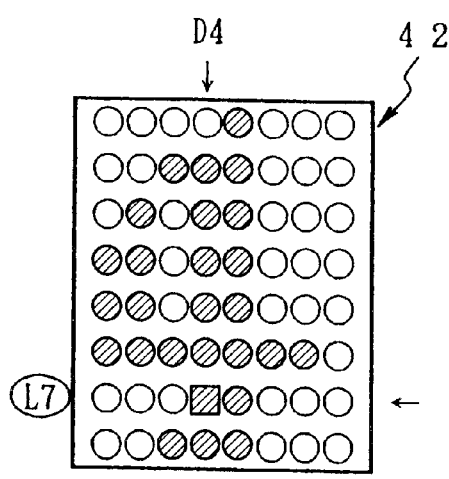
Figure 13H:
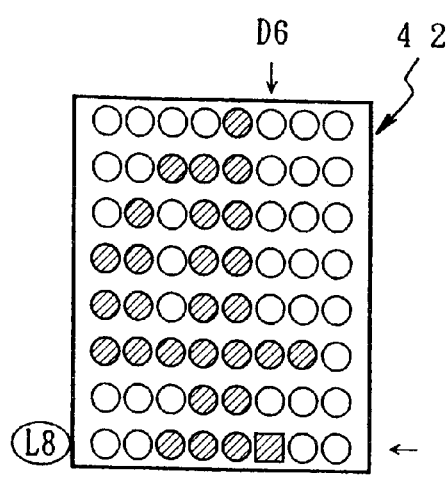

FIGS. 13A to 13H divisionally show the writing display control in FIG. 12 every writing operation of the liquid crystal panel 42. FIG. 13A shows the original image data stored in the display image memory area 20-1 of the frame memory 20. For simplicity of explanation, a liquid crystal panel of 64 pixels of (8 lines×8 pixels) is shown as an example. The write data in FIG. 13A is developed in the work memory area 20-2 of the frame memory 20 at the time of the writing operation. Each time the writing operation is executed by the write controller 28, the display pixels are erased. FIG. 13B shows display contents of the liquid crystal panel 42 by the writing display of the first time. With respect to the first time, the AND "100001000" of each line of the write data in FIG. 13A is detected as common line data by the common line data detecting unit 68. In this case, since the display pixels exist in all of the lines L1 to L8, the batch display by the simultaneous writing of the detected common line data is executed to all lines L1 to L8. After completion of the writing display of the first time, the erasing process of the written display pixels in the work memory area 20-2 in which the same write data as that in FIG. 13A has been developed is executed. FIG. 3C shows the writing display of the first line data after completion of the batch display by the simultaneous writing of the common line data. In the display line setting unit 60 in FIG. 12, since the writing display is set in accordance with the order of the line numbers L1 to L8, the head line L1 is set as for the second time in FIG. 13C. However, since no display pixel exists on the head line L1 because of the erasure of the display pixels by the writing operation of the first time, the line L1 is skipped and the writing display is executed to the line data of the line L2 in which the display pixels exist as a target. In this case, since the same data as the line data of the line L2 exists in the lines L6 and L8, the line numbers L2, L6, and L8 are detected by the write line number detecting unit 64 and the line data of the line L2 is simultaneously written. In a manner similar to the above, the writing operations of the third time in FIG. 13D and the fourth to seventh times shown in FIGS. 13E to 13H are executed. All of the display pixels in the work memory area 20-2 are erased by the writing of the seventh time, so that the writing display is finished at this time point.

FIG. 14 shows the frame memory, an extraction of the common line data, and a display of the liquid crystal panel in operation cycles T1 to T9 of the write controller 28 in the writing operation in FIGS. 13A to 13H. In the first T1 cycle, the common line data which is common to all lines is extracted from the frame memory and the batch display by the simultaneous writing of the common line data is performed for all lines. In the next T2 cycle, although the process in which the line L1 is designated is performed, no display pixel exists in the line L1 of the frame memory because of the erasure of the written display pixels in the T1 cycle. Therefore, in the T2 cycle, the writing of the line data is skipped and the processing routine advances to the T3 cycle. The T3 cycle corresponds to the writing operation of the second time in FIG. 13C. The T4 cycle corresponds to the writing operation of the third time of FIG. 13A. Although the T5 to T8 cycles are omitted, the last T9 cycle corresponds to the writing display of the seventh time of FIG. 13H. The original write data in FIG. 13A shows numeral "4". In the hierarchical writing displays of seven times in FIGS. 13B to 13H, for example, at the fifth time of FIG. 13F, it is possible to recognize that the display data is equal to "4". It will be obviously understood that in dependence on the kind of image, there is also a case where the contents can be almost recognized by the batch display by the common line data of the first time of FIG. 13B. As image data which can be recognized by the batch display by the simultaneous writing of the common line data of the first time as mentioned above, for example, there is a rectangular image in which the display pixels are arranged in the direction which perpendicularly crosses the lines or ruled line data such as a table included in document data or the like.

Figure 15:
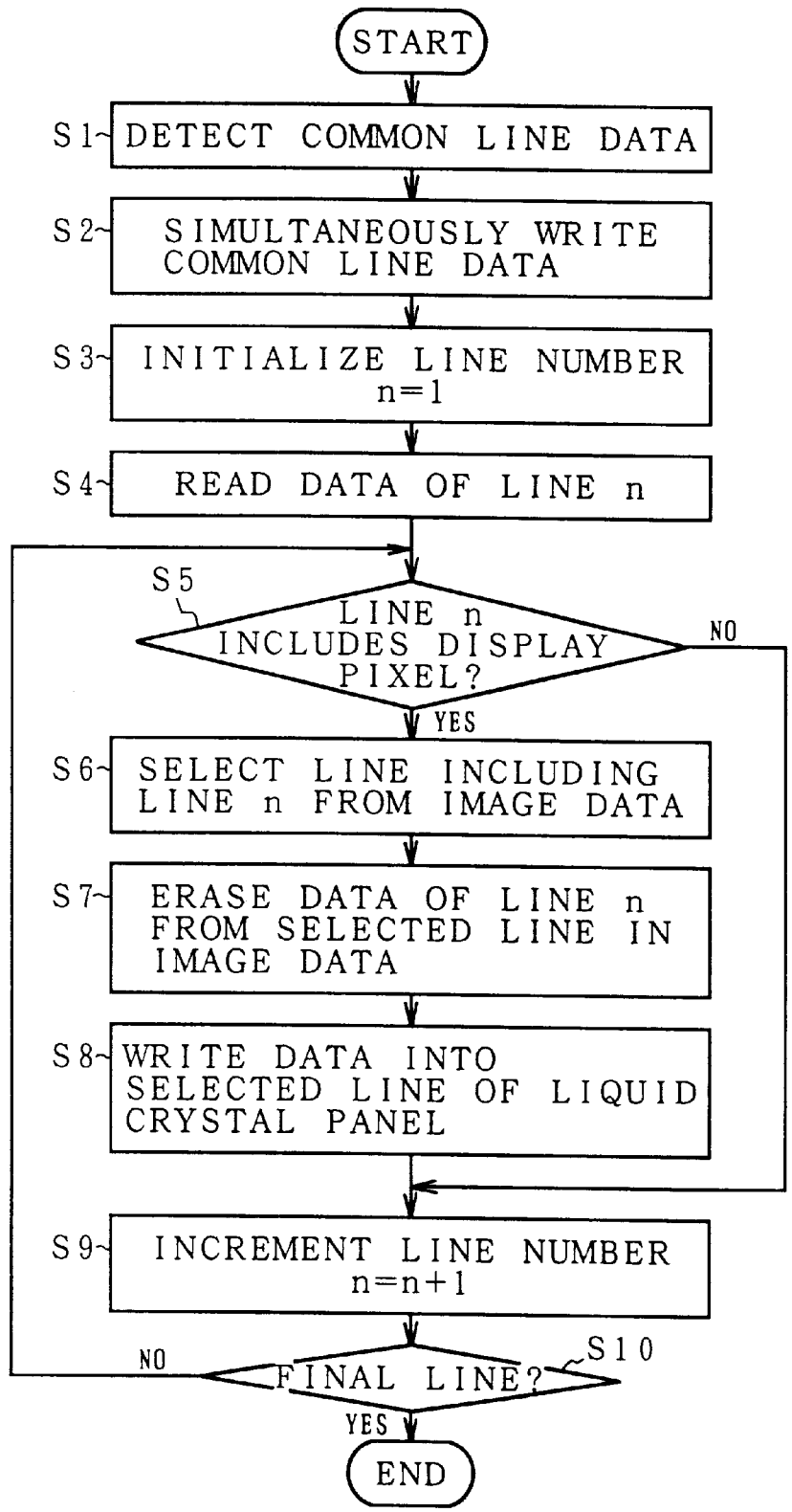
FIG. 15 is a flowchart for a writing display process in FIG. 12.

FIG. 15 is a flowchart for the writing display process by the write controller 28 in FIG. 12. First in step S1, the common line data is detected by the AND or the like of the line data having the display pixels and the detected common line data is simultaneously written to all of the display lines having the display pixels. After completion of the batch display by the simultaneous writing of the common line data, the line data is additionally written in accordance with the set order of the line number (n) in steps S3 to S10. The additional writing process of the line data is substantially the same as the processes in steps S1 to S8 in FIG. 6. In place of the processes in steps S3 to S10 in FIG. 15, it is also possible to perform the additional writing by setting the line numbers in accordance with the order from the small number of pixels of the line data shown in steps S1 to S6 in FIG. 10.

Figure 16A:
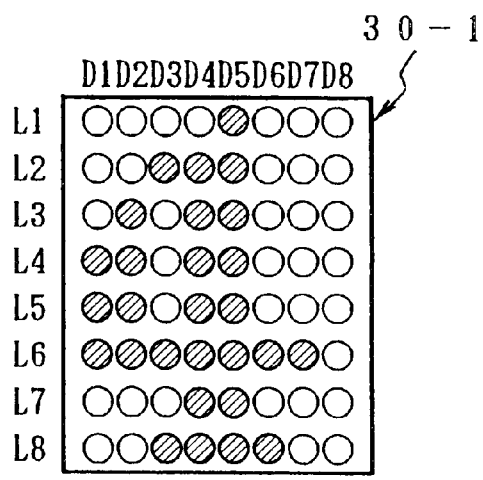
FIGS. 16A to 16H are explanatory diagrams in the case where a processing order of the additional writing is set to a random order in FIG. 12.
Figure 16B:
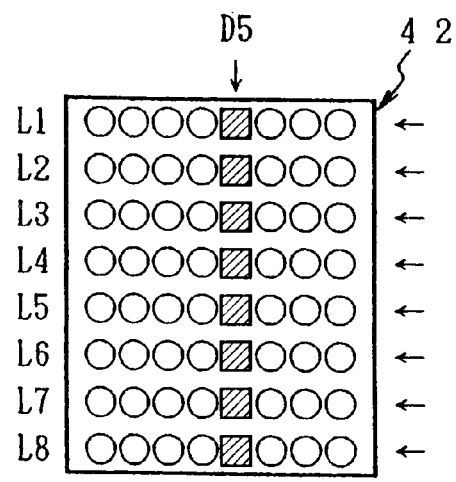
Figure 16C:
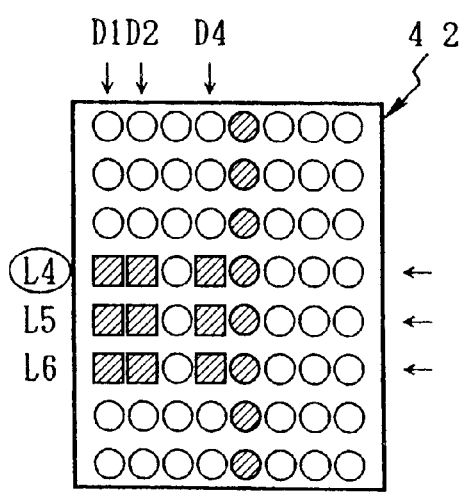
Figure 16D:
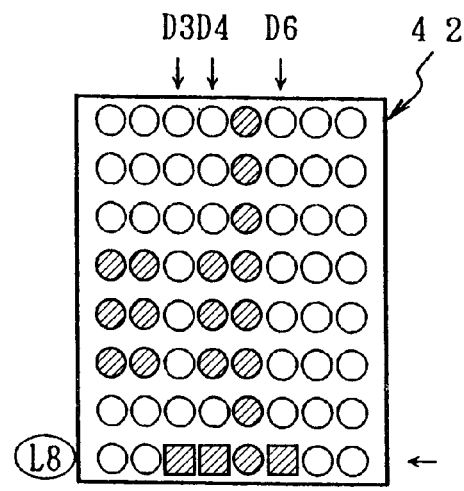
Figure 16E:
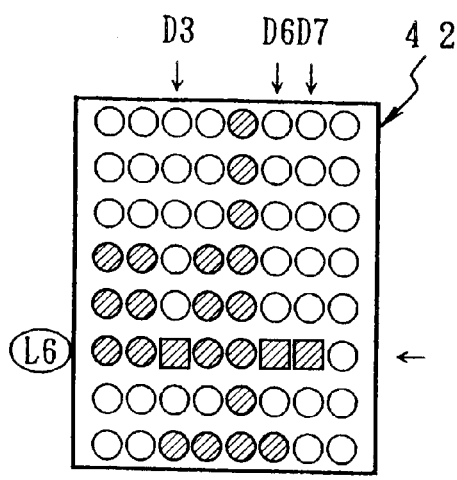
Figure 16F:
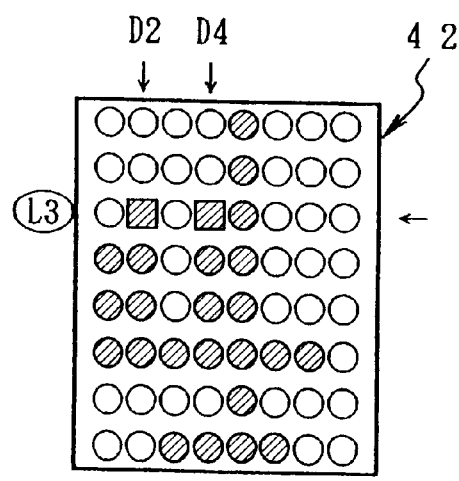
Figure 16G:
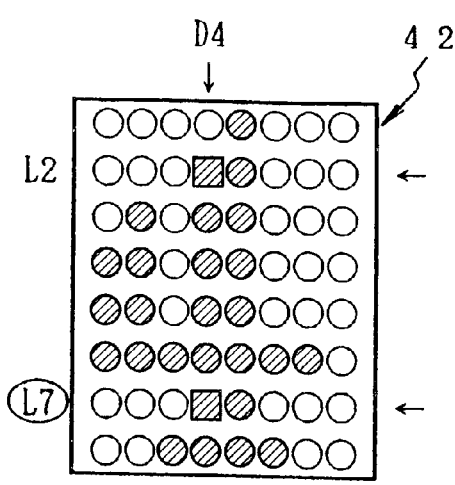
Figure 16H:
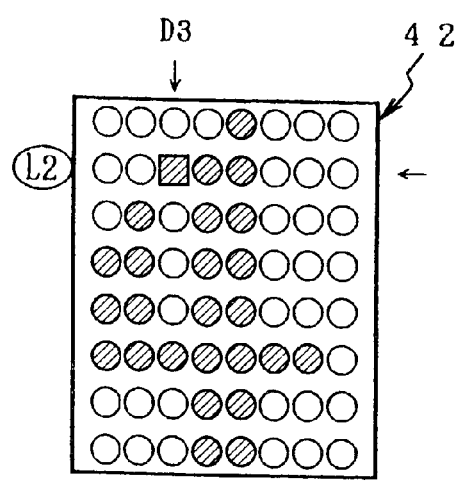
Figure 17A:
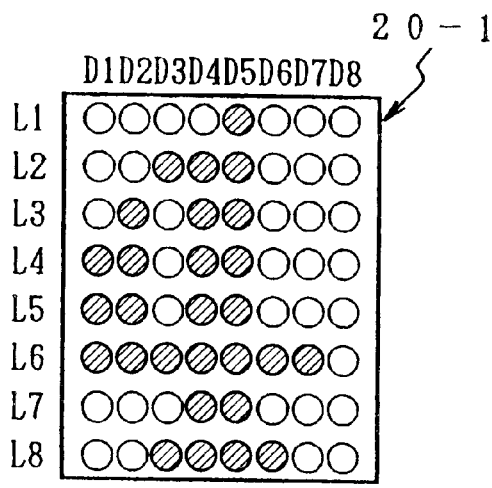
FIGS. 17A to 17H are explanatory diagrams for the additional writing process divided into processes for odd lines and even lines in FIG. 12.
Figure 17B:
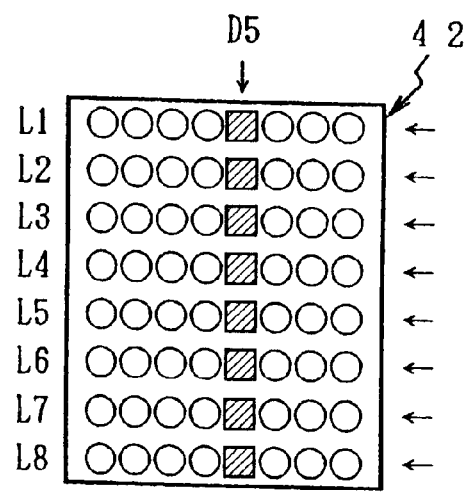
Figure 17C:
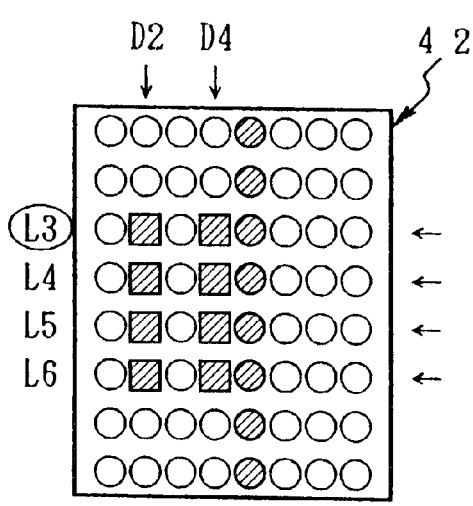
Figure 17D:
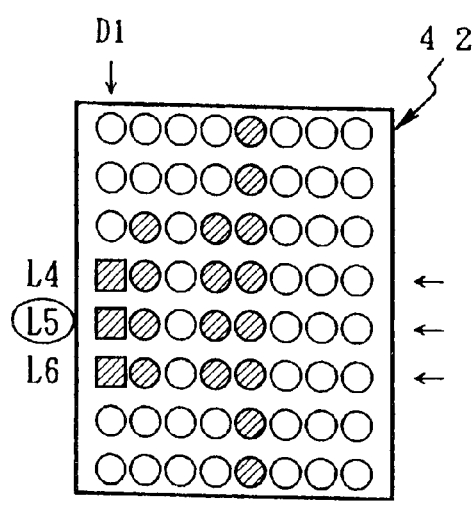
Figure 17E:
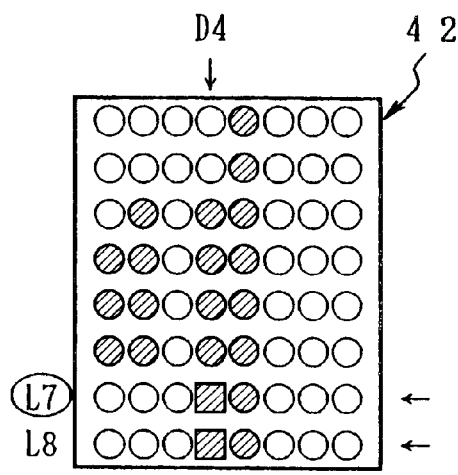
Figure 17F:
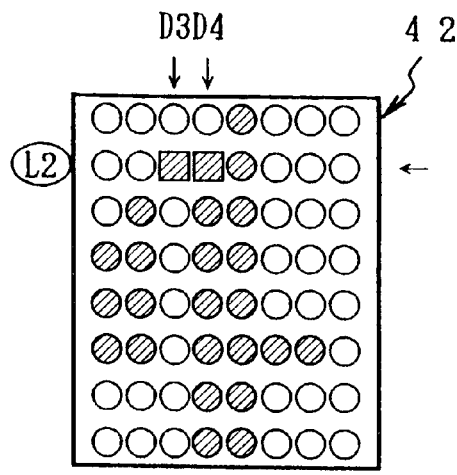
Figure 17G:
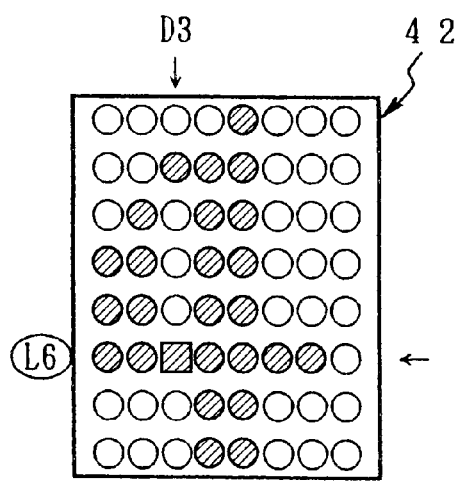
Figure 17H:
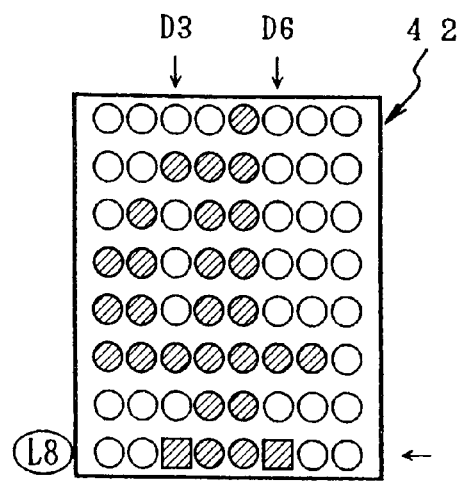

FIGS. 16A to 16H show the number of display times and the contents of the liquid crystal panel 42 in the case where the orders of the display line numbers are set at random with respect to the additional writing process in which the display line numbers are designated and which is executed by the display line setting unit 60 in FIG. 12 after the second time. FIG. 16A shows the original image data stored in the display image memory area 20-1 of the frame memory 20 and substantially the same as that of FIG. 13A. It is assumed that the line numbers to decide the processing order after the second time were set at random to the order of, for example, L4, L8, L6, L3, L1, L7, and L2 for the write image data. The batch display of the liquid crystal panel 42 by the simultaneous writing of the common line data of the first time in FIG. 16B is substantially the same as that of FIG. 16B. The additional writing process of the liquid crystal panel 42 according to the order of the line numbers set at random is executed in the cycles from the second time of FIG. 16C to the seventh time of FIG. 16H. Even when the orders of the display lines for the additional writing are set at random, the display contents can be almost recognized by the writing display of the fifth time of FIG. 16F.

FIGS. 17A to 17H are characterized in that the setting of the additional writing display line number which is executed by the display line setting unit 60 in FIG. 12 after the second time is performed divisionally for the odd lines and even lines in accordance with this order. Namely, the additional writing is sequentially performed with respect to the odd lines in accordance with the order of L1, L3, L5, and L7. Subsequently, the additional writing is sequentially performed with respect to the even lines in accordance with the order of L2, L4, L6, and L8.

Figure 18A:
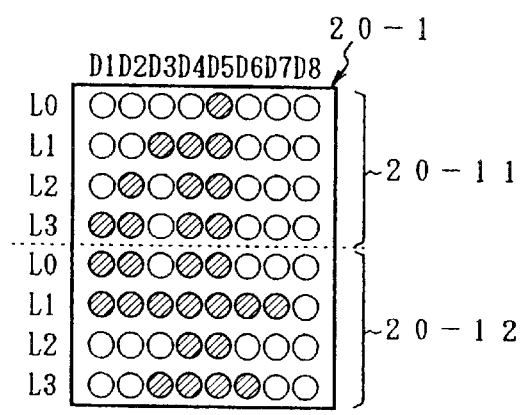
FIGS. 18A to 18F are explanatory diagrams for a display writing in case of dividing a display area into two areas in FIG. 12.
Figure 18B:
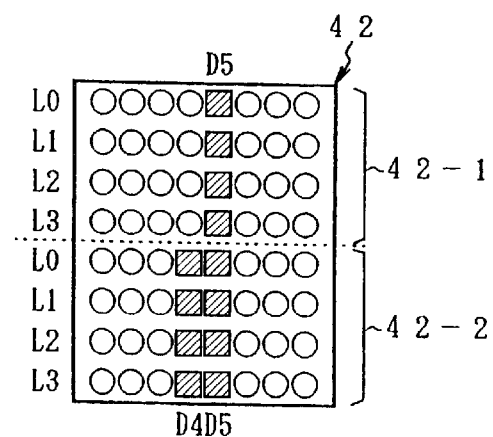
Figure 18C:
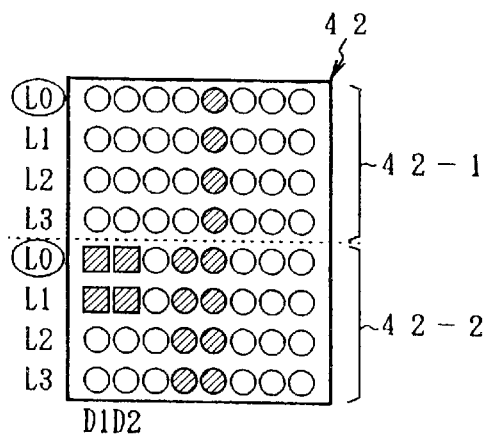
Figure 18D:
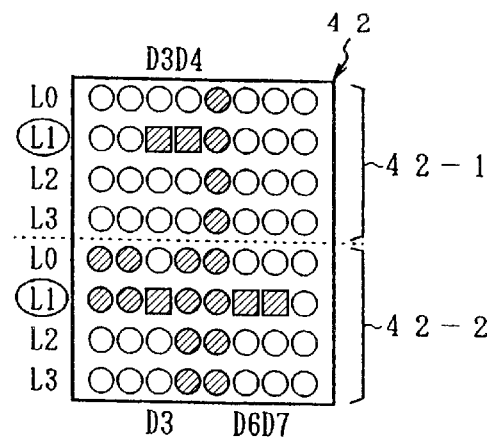
Figure 18E:
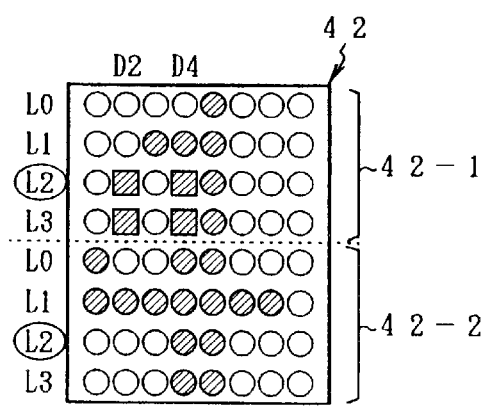
Figure 18F:
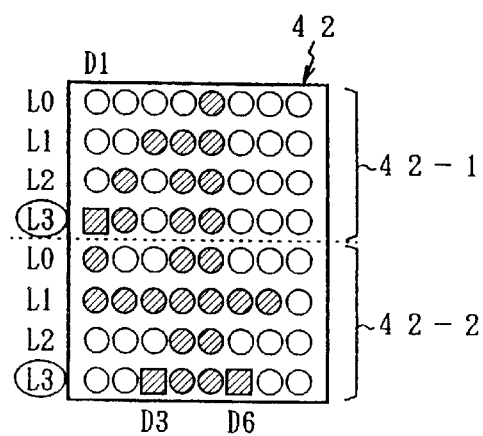

FIGS. 18A to 18F are characterized in that the display area of the liquid crystal panel 42 is divided into two areas by the display line setting unit 60 in FIG. 12 and the batch display by the simultaneous writing of the common line data and the additional writing of every line are alternately executed in accordance with the orders of the line numbers. FIG. 18A shows the original write image data in the display image memory area 20-1 of the frame memory 20. Eight lines are vertically divided into two areas 20-11 and 20-12 each having four lines of L0 to L3. In correspondence to it, as shown in FIG. 18B, the liquid crystal panel 42 is also vertically divided into two display areas 42-1 and 42-2 each having four lines L0 to L3. First in FIG. 18B, the simultaneous writing by the detection of the common line data to the upper half display area 42-1 is executed as a process of the first time. Subsequently, the batch display of the simultaneous writing by the detection of the common line data to the lower half area 42-2 is executed as a writing display of the second time. Therefore, the peculiar different batch displays of the common line data are executed for the areas 42-1 and 42-2. FIG. 18C shows the display writing of every display line of the liquid crystal panel 42. With respect to the head line L0 in the upper area 42-1, since no display pixel exists in this instance, the additional writing in which the display line L1 is set is performed with regard to the lower display area 42-2. Since the line data of the display line L1 also includes the line L0, the simultaneous writing of the lines L0 and L1 is executed and it becomes the writing display of the third time. FIG. 18D shows the additional writing in which the line L1 in each of the display areas 42-1 and 42-2 is designated as a display line and it becomes the writing display of the fourth and fifth times. FIG. 18E shows the additional writing in which the third line L2 in each of the display areas 42-1 and 42-2 is designated. Since no display pixel exists in the line L2 in the lower area 42-2, the line L2 in the upper area 42-1 becomes a writing target. At the same time, the simultaneous writing of the line L3 including the same line data is performed and it becomes the writing display of the sixth time. FIG. 18F relates to the writing display of the fourth line L3 in each of the display areas 42-1 and 42-2. Since the line L3 in each area has the display pixels, the writing displays of the seventh and eighth times are executed. In FIGS. 18A to 18F, a case where the display area is divided into two areas is shown as an example. In the actual LCD unit shown in FIG. 2, for example, since the maximum number of line electrodes from the line electrode driver is equal to 2500, the number of lines (n) to decide arbitrary dividing areas in a range of the number of lines (N) is determined, a dividing number (m) is determined by (N/n), and it is sufficient to repeat similar processes every division area.

[Simultaneous writing of a plurality of lines and additional writing of every line]

Figure 19:
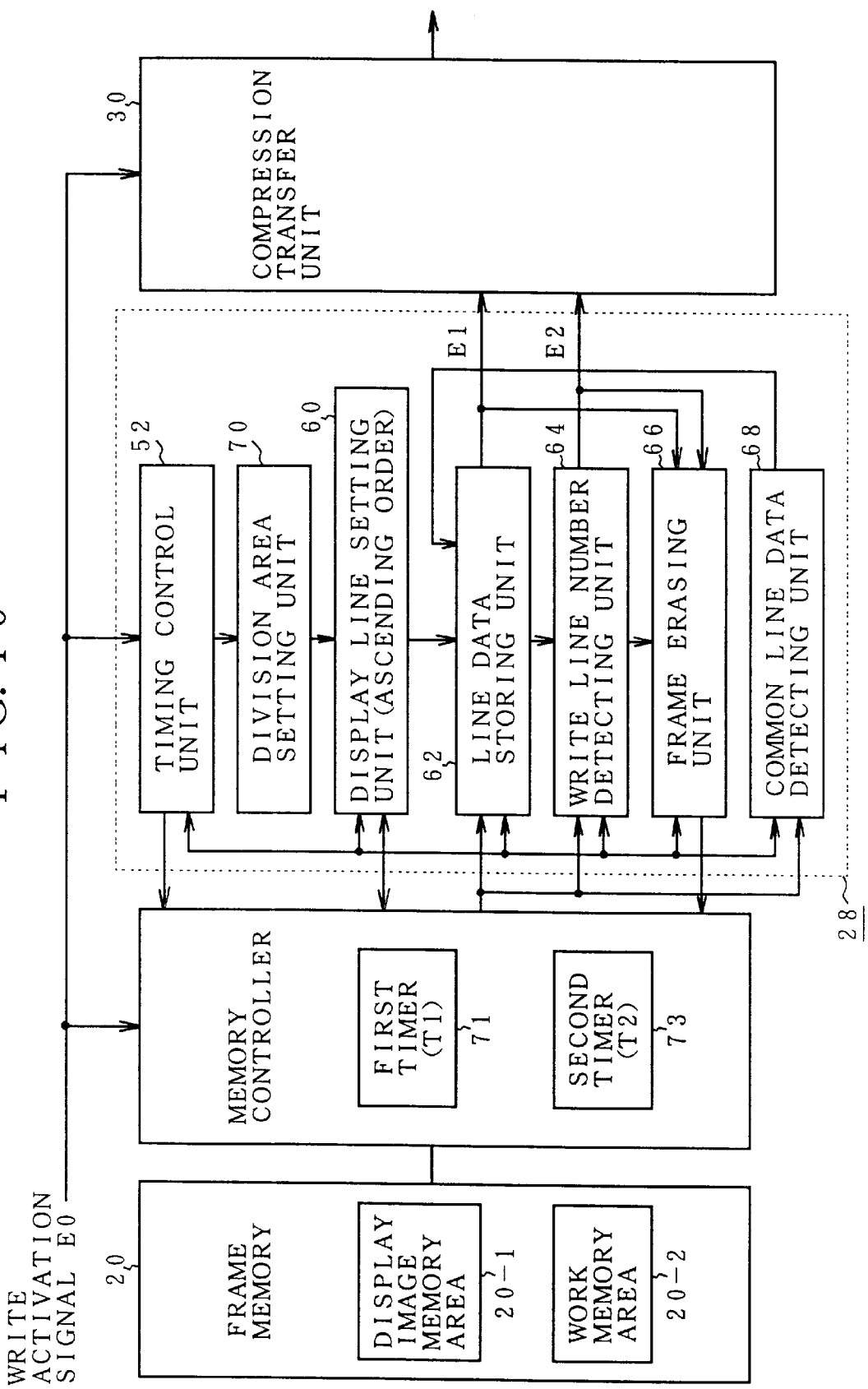
FIG. 19 is a functional block diagram of a write controller for performing a batch display of the common line data and an additional writing of every line by dividing the display area.
Figure 20:
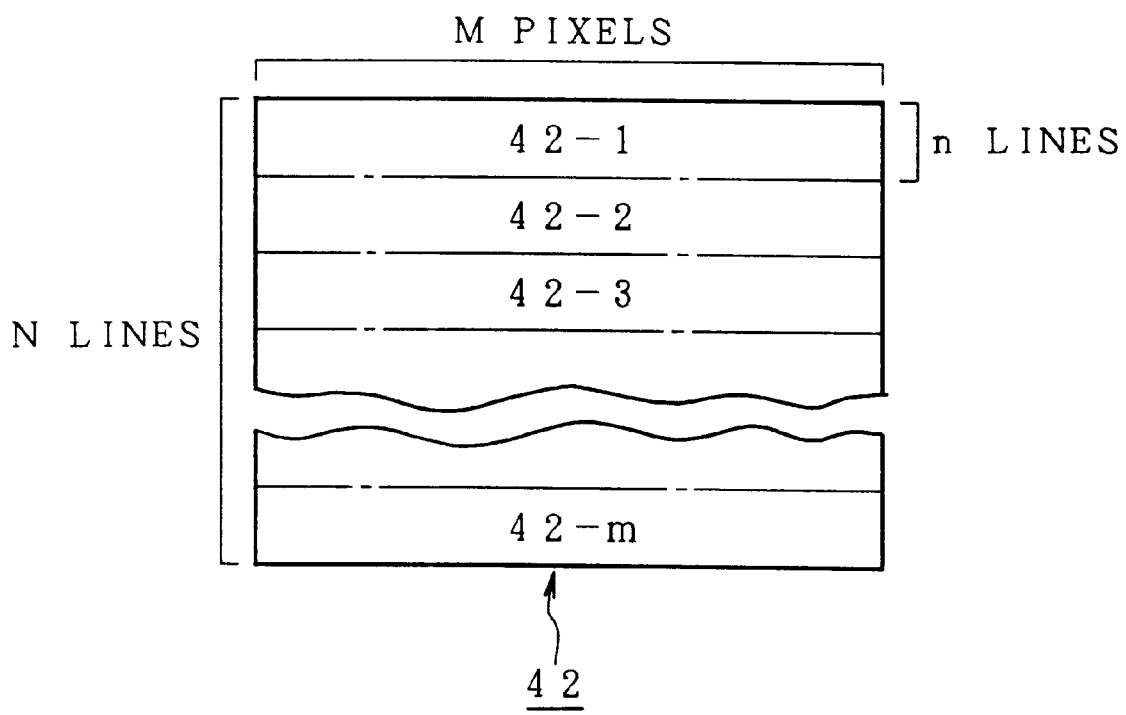
FIG. 20 is an explanatory diagram of an area division of a liquid crystal panel.

FIG. 19 is a functional block diagram of the write controller of the third invention of the present application. In addition to the embodiment of FIG. 12, a division area setting unit 70 is newly provided for the write controller 28. Now, assuming that the number of lines of the LCD unit 40 is set to (N), the division area setting unit 70 sets the number of lines (n) to decide proper division areas within the line number (N), so that the dividing number (m) is obtained as (N/n). FIG. 20 shows an example of the division of the display area in the liquid crystal panel 42. The display area is divided into areas 42-1 to 42-m on an n-line unit basis per (N) lines. Referring again to FIG. 19, the write controller 28 first executes the writing at the first stage such that with respect to each of the (m) blocks obtained by dividing the display panel 42 every (n) lines set by the division area setting unit 70, single write data representing (n) lines is formed and the representative write data is simultaneously written to (n) lines of every block in a first writing time T1. After completion of the writing at the first stage, the write controller 28 executes the additional writing for reading out the inherent write data of every line as additional write data and sequentially writing the write data every line in a second writing time T2 longer than the first writing time T1. The first writing time T1 when the simultaneous writing of (n) lines is performed is equal to a time of a few milliseconds which is necessary for rewriting the liquid crystal cells from white to black by the pixel data of one line after the whole surface of the liquid crystal panel 42 was initialized to white. The first writing time T1 is set to one unit time. On the other hand, the second writing time T2 when the additional writing is executed at the second stage is equal to a time exceeding tens of milliseconds in a manner similar to that in the ordinary writing because the additional writing is a writing operation to rewrite the liquid crystal cells of one line in which the white and black pixels mixedly exist due to the writing of the first stage by other pixel data and includes both of the rewriting from white to black and the rewriting from black to white. In the embodiment, a time of ten and a few unit times (about 75 msec) which is ten and a few times as large as the first writing time T1 is set as a second writing time T2 for performing the additional writing. The first and second writing times T1 and T2 are set by, for example, each of a first timer 71 and a second timer 73 provided for the memory controller 26 and are set into the display controller 36 in FIGS. 1A and 1B or FIGS. 11A and 11B. Further, the temperature sensor 45 is provided for the liquid crystal panel 42 provided for the projector 12 in FIGS. 1A and 1B or FIGS. 11A and 11B. On the basis of an environmental temperature of the liquid crystal panel 42 by the temperature sensor 45, the write controller 36 changes the set second writing time T2 for the additional writing. Namely, although the second writing time T2 is set as, for example, 15 unit times by using, for instance, an environmental temperature 25° C. as a reference, when the temperature rises, a time to rewrite the liquid crystal cells from black to white becomes short. When the temperature decreases, on the contrary, the time to rewrite the liquid crystal cells from black to white becomes long. Therefore, the second writing time T2 is changed in accordance with the temperature detected by the temperature sensor 45.

Figure 21:
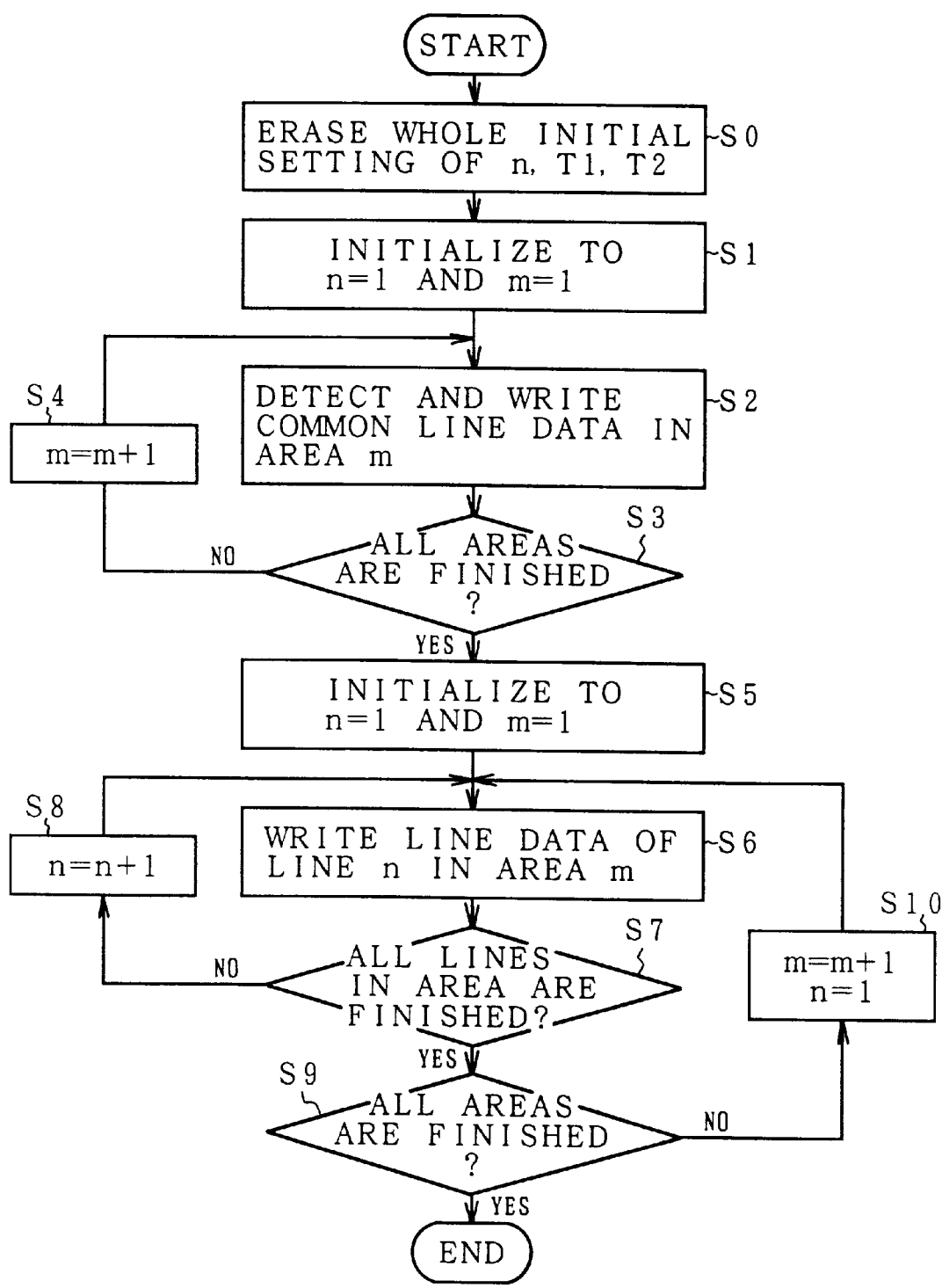
FIG. 21 is a flowchart for a writing display process by the area division in FIG. 19.

FIG. 21 is a flowchart for the writing display process for the area division by the write controller 28 in FIG. 19. First in step S0, each of the number of lines (n), first writing time T1, and second writing time T2 are initially set. Further, an initialization to erase the whole surface of the liquid crystal panel 42 to white is performed. In step S1, a line counter (n) to set the line number is set to "1" and an area number counter (m) to decide the area dividing number is likewise initialized to "1". In step S2, with respect to the first area (m=1), the common line data representing the (n) lines is detected and the simultaneous writing of (n) lines is executed in the first writing time T1. Thus, the batch display by the simultaneous writing of the common line data is executed to the area 42-1 in FIG. 20. As common data representing (n) lines in this case, the AND of the pixel data of (n) lines, the pixel data of the first head line, or the like is used. In step S3, a check is made to see if the processes have been finished for all of the areas. If NO, the count value of the area counter (m) is increased by "1" in step S4. Similar processes are repeated in step S2. When the writing display by the detection of the common line data is finished with regard to all of the areas, step S5 follows. The line counter (n) and area counter (m) are initialized to "1", respectively. In step S6, the additional writing by the reading of the line data of the line (n=1) in the area (m=1) is executed. In the additional writing in step S6, the inherent line data is read out as it is and is written and the pixel data of one line is written in the second writing time T2. In this case, when the additional write data is the same as the pixel data which has already been written in step S2, the additional writing is skipped and the processing routine advances to the next line. When all of the additional write data is equal to 0 (white) as well, the additional writing is skipped and the processing routine advances to the next line. After completion of the additional writing of one line, a check is made in step S7 to see if the processes of all lines in a present area (m=1) have been finished. Until the processes for all lines are finished, the additional writing of the line data in step S6 is repeated while increasing the line counter (n) one by one in step S8. When the processes for all lines in one area are finished, a check is made in step S9 to see if the additional writing of all areas has been performed. If NO, the line counter (n) is initialized to (n=1) in step S10. After that, the area counter (m) is increased by "1" and the processing routine advances to the next area. The additional writing of every line in step S6 is repeated.

Figure 22A:
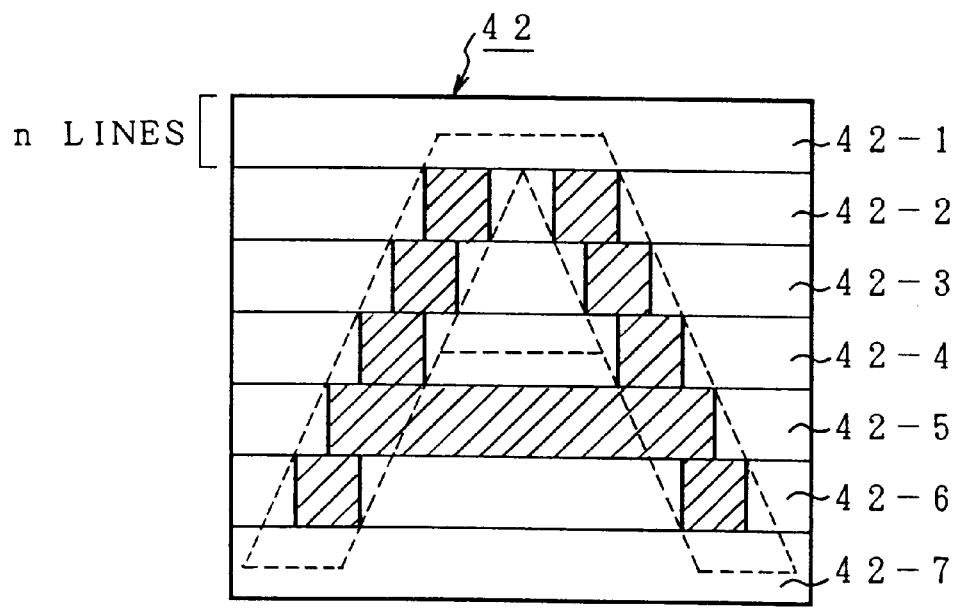
FIGS. 22A and 22B are explanatory diagrams of specific examples of the writing display by the area division according to FIG. 19.
Figure 22B:
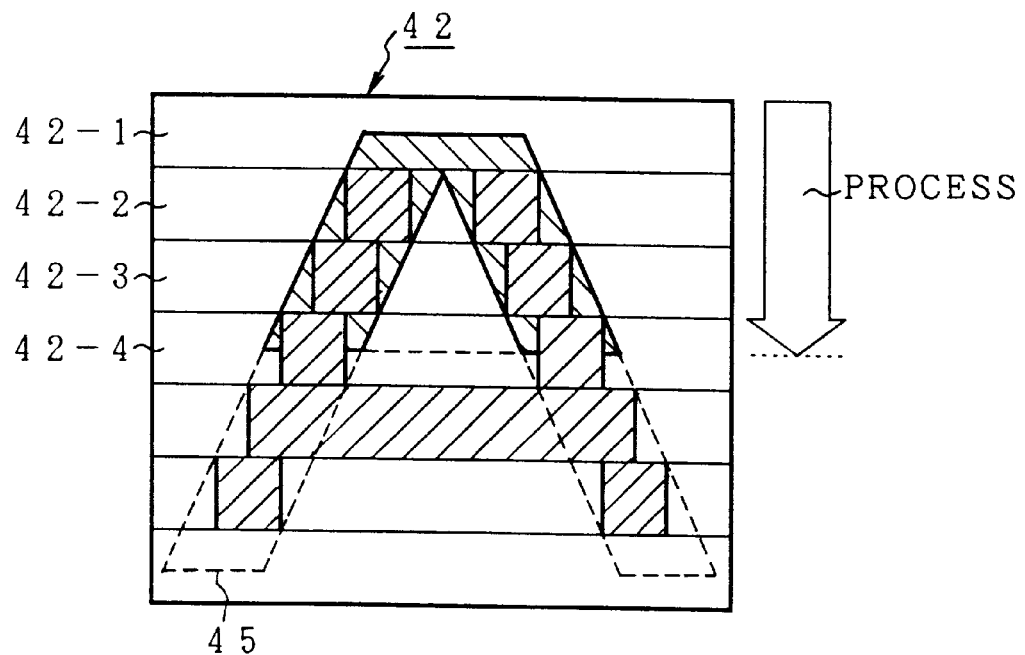

FIGS. 22A and 22B show examples of the writing display for the division areas by the processes in FIG. 21. FIG. 22A relates to a division batch display of the areas 42-1 to 42-7 by the simultaneous writing of the common line data. For example, it is now assumed that the image data to be displayed is a character "A" shown by a broken line. First, the common line data representing each area is detected in accordance with the order of the areas 42-1 to 42-7. The batch display is executed by the simultaneous writing in the first writing time T1. At the stage of the completion of the simultaneous display by the common line data of all areas, the schematic contents of the image can be almost recognized. Subsequently, the additional writing by the designation of the line numbers for every areas 42-1 to 42-4 in FIG. 22B is slowly executed by using the second writing time T2 per line. In this case, the processing routine is in a state in which the additional writing has progressed to the middle of the area 42-4. At this stage, it is possible to almost certainly know that the display contents indicate the character "A". In the processes in steps S6 to S9 in FIG. 21, although the additional writing of (n) lines is performed every areas 42-1 to 42-7 as shown in FIG. 22A, in place of it, the additional writing can be also performed so as to sequentially repeat the division areas 42-1 to 42-7 with regard to the same line number. Namely, for the additional writing of (n) lines of every areas 42-1 to 42-7 in FIG. 22, by executing the additional writing in accordance with the order of the division areas 42-1 to 42-7 with regard to the same line number, the writing of the whole picture plane to display the details can be performed. There is a possibility such that the image contents can be more promptly grasped. Although the additional writing of (n) lines has been performed in the ascending order corresponding to the order of the line numbers, as another method, the locations of the lines where the additional writing was performed can be made inconspicuous by performing the additional writing by an interlace order or at random.

Figure 23A:
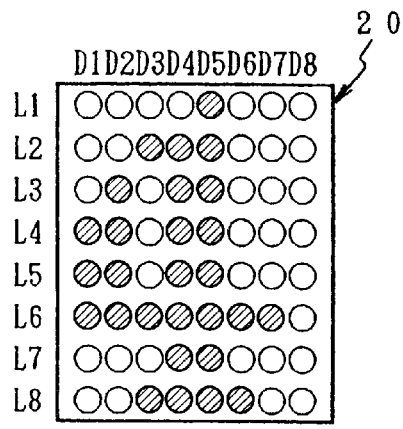
FIGS. 23A to 23C are explanatory diagrams for an interlace writing display according to the embodiment of FIG. 19.
Figure 23B:
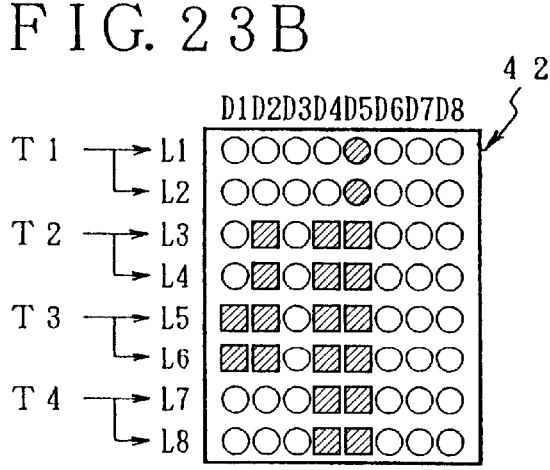
Figure 23C:
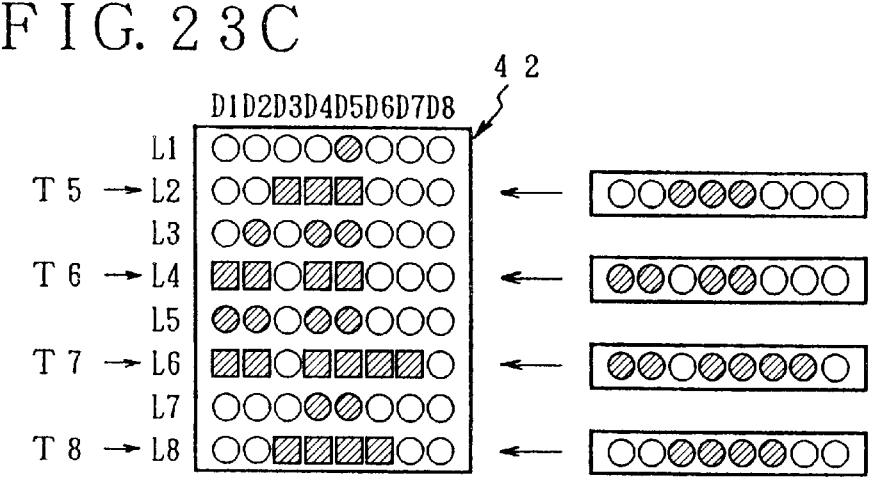

FIGS. 23A to 23C show a modification of the division areas in the embodiment of FIG. 19. The modification is characterized in that the odd lines and the even lines are grouped to one set, the line data of the odd lines is first set to the common data and is simultaneously written to the adjacent even lines, and after that, the additional writing of the inherent line data is performed with regard to the even lines. Namely, it relates to the case where the number of lines (n) is set to (n=2). FIG. 23A shows the original write image data stored in the frame memory 20. First, in the T1 cycle of FIG. 23B, the line data of the odd line L1 is set to the common line data and the writing in the first writing time T1 is simultaneously executed to the adjacent even line L2 for two lines. In a manner similar to the T2, T3, and T4 cycles as well, the line data of the odd lines L3, L5, and L7 is simultaneously written as common line data to each of the even lines L4, L6, and L8 in the first writing time T1 for two lines. Subsequently, as shown in the T5 cycle of FIG. 23C, with respect to the even line L2 in which the writing of the common line data was finished in the T2 cycle, the additional writing according to the second writing time T2 using the inherent line data is performed. With respect to the next T6, T7, and T8 cycles, the additional writing according to the second writing time T2 using the inherent line data of the even lines L4, L6, and L8 is similarly executed.

In the display writing corresponding to the interlace in which the lines are divided into the odd lines and the even lines in FIGS. 23A to 23C, by the simultaneous writing of the even lines using the odd line data at the first stage, the writing display of all lines can be executed. Therefore, a deterioration of the display quality such that the contrast largely changes during the process by the ordinary interlace writing in which the lines are divided into only the odd lines and the even lines and the writing display is sequentially performed doesn't occur. Even in the interlace writing which is slow with respect to the time, a change in contrast is hardly conspicuous.

[Division of display area which can be independently driven]

Figure 24A:
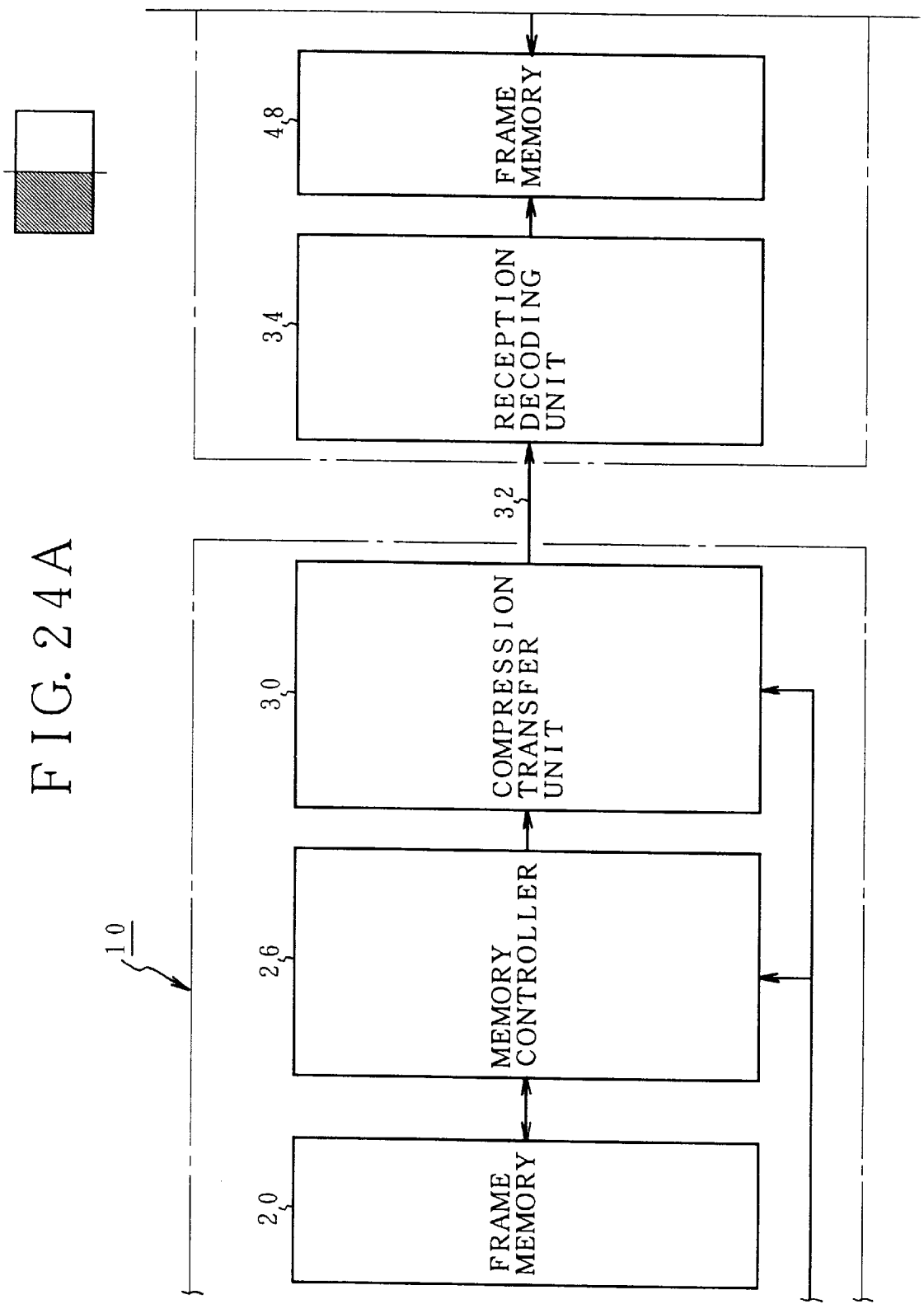
FIGS. 24A and 24B are block diagrams of an embodiment of the invention for performing a simultaneous interlace writing.
Figure 24B:
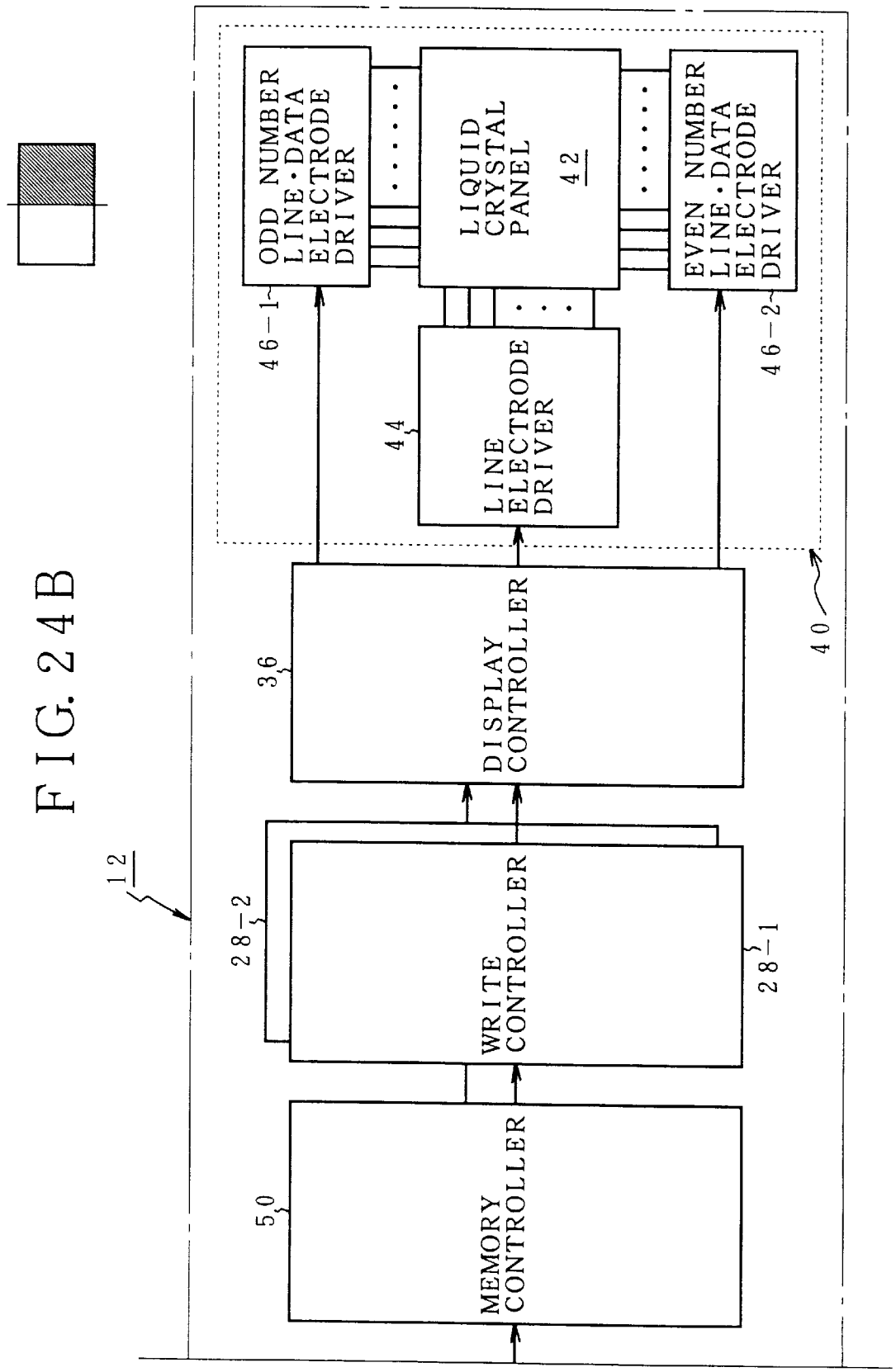

FIGS. 24A and 24B are block diagrams of an embodiment of a display apparatus according to the fourth invention of the present application in which the liquid crystal display unit is divided into a plurality of areas which can be independently driven. A case where the write controller is provided on the projector side is shown as an example. The liquid crystal display (LCD) unit 40 which is divided into odd lines and even lines and can be independently driven is provided for the projector 12 connected as an external display apparatus for the personal computer 10 as an upper apparatus. Namely, the fourth invention is characterized in that the LCD unit 40 uses a construction which enables the simultaneous interlace writing in which the odd fields and even fields can be independently displayed in parallel. For this purpose, an odd number line·data electrode driver 46-1 and an even number line·data electrode driver 46-2 to realize the simultaneous interlace writing are newly provided for the liquid crystal panel 42 of the LCD unit 40.

Figure 25:
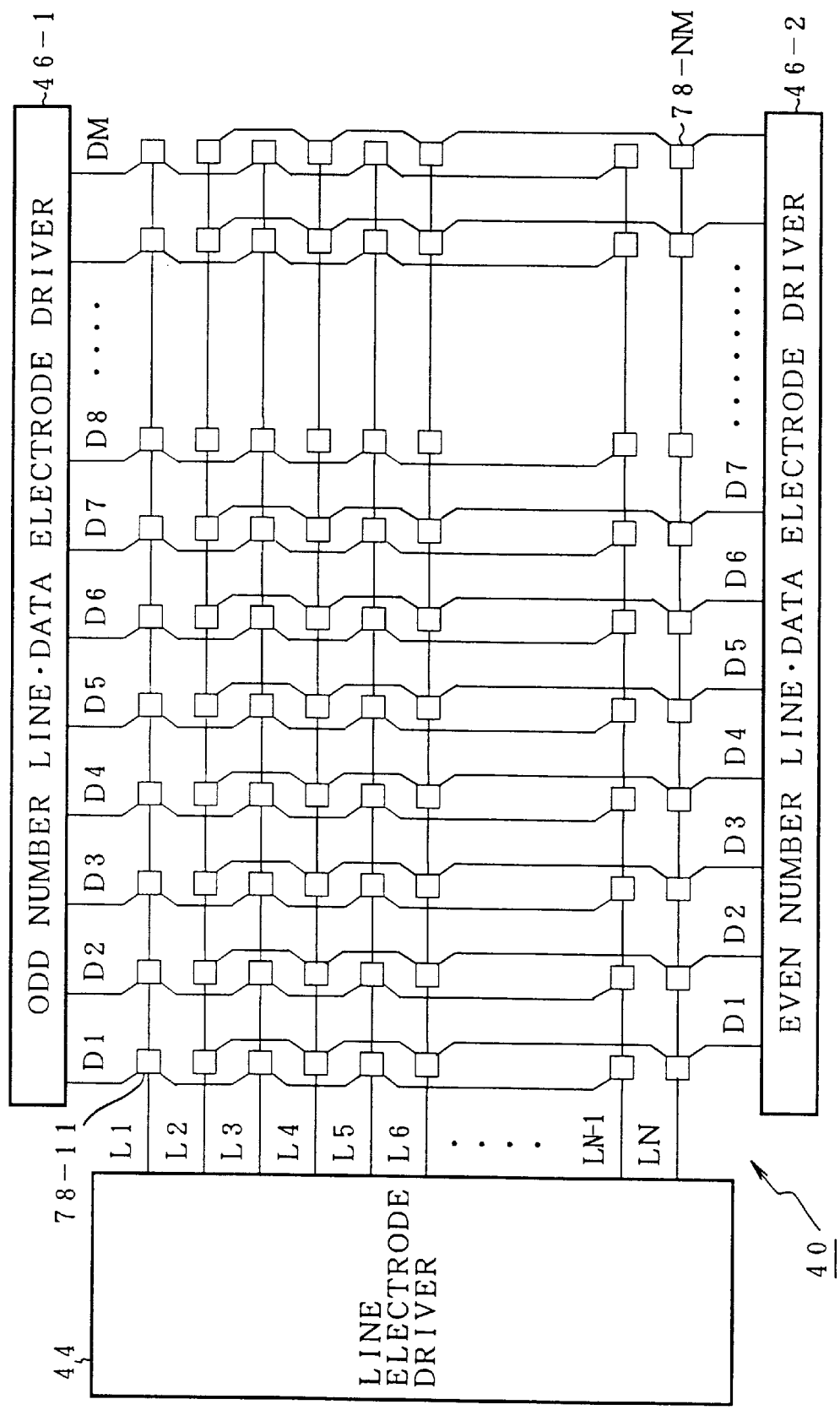
FIG. 25 is a schematic constructional diagram of a liquid crystal display unit having a simultaneous interlace writing structure which can be independently driven in FIGS. 24A and 24B.

FIG. 25 shows a schematic construction of the LCD unit 40 which enables the simultaneous interlace writing in FIGS. 24A and 24B. In the LCD unit 40, the line electrodes L1 to $L_N$ (where, N is an even number) led out from the line electrode driver 44 are divided into odd lines and even lines. That is, the odd line electrodes are set to L1, L3, . . . , and $L_{N-1}$ and the even line electrodes are set to L2, L4, L6, . . . , and $L_N$. The data electrodes D1 to $D_M$ led out from the odd number line·data electrode driver 46-1 are connected to the liquid crystal cells 78-11 to 78-(N-1,M) of the odd line electrodes L1, L3, L5, . . . , and $L_{N-1}$. On the other hand, the data electrodes D1 to $D_M$ from the even number line·data electrode driver 46-2 are connected to the liquid crystal cells 78-21 to 78-NM of the even line electrodes L2, L4, L6, . . . , and $L_N$.

Figure 26:
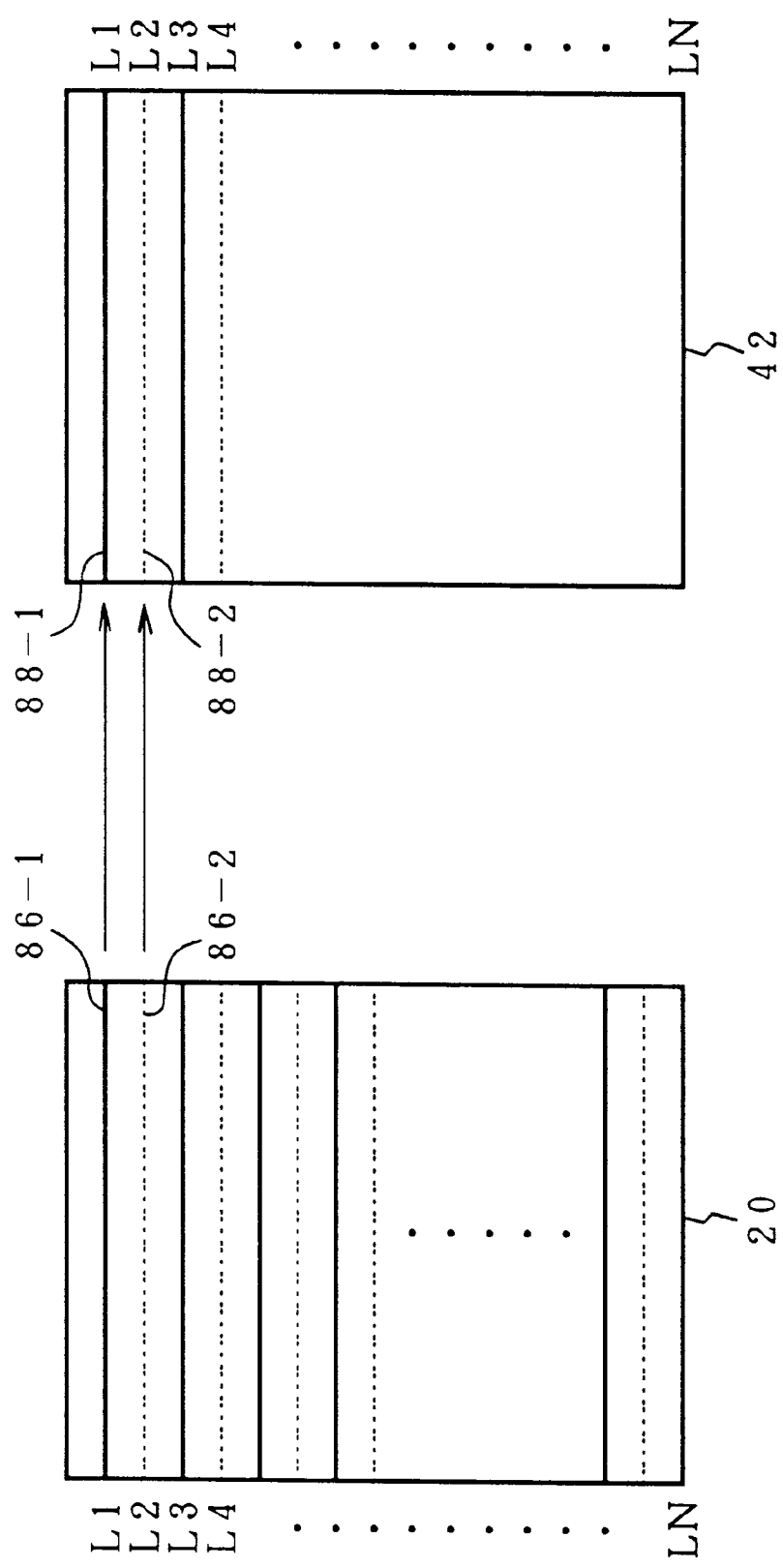
FIG. 26 is an explanatory diagram for the simultaneous interlace writing in FIGS. 24A and 24B.

FIG. 26 is an explanatory diagram of the write control for the liquid crystal panel 42 having the simultaneous interlace writing structure of FIG. 25. In correspondence to the line electrodes L1 to $L_N$ of the liquid crystal panel 42, (N) line data has been stored in the frame memory 20 on a line unit basis. Therefore, as for the first writing to the liquid crystal panel 42 from the frame memory 20, line data 86-1 of the odd line L1 is read out and written as line data 88-1 into the liquid crystal panel 42. At the same time, line data 86-2 of the even line L2 in the frame memory 20 is read out and written as line data 88-2 into the liquid crystal panel 42. That is, the line data of the odd line and the even line is simultaneously read out from the frame memory 20 and is simultaneously written to the liquid crystal panel 42. Thus, the display speed can be doubled as compared with that of the LCD unit 40 having only one display area that can be independently driven in FIGS. 1A and 1B. The interlace control which enables the 2-line simultaneous writing of the odd line and the even line corresponds to the case where the dividing number (m) of the liquid crystal panel 42 which can be independently driven is set to (m=2). As mentioned above, in the LCD unit 40 in FIGS. 24A and 24B, two write controllers 28-1 and 28-2 are provided in correspondence to the odd line and even line which enable the simultaneous writing, thereby performing the writing operation in parallel. Functions, constructions, and controls of the write controllers 28-1 and 28-2 are similar to those in the embodiment of the first invention of FIG. 3 or the embodiment of the second invention of FIG. 16 except that the odd fields and even fields of the liquid crystal panel 42 are merely set to targets.

Figure 27:
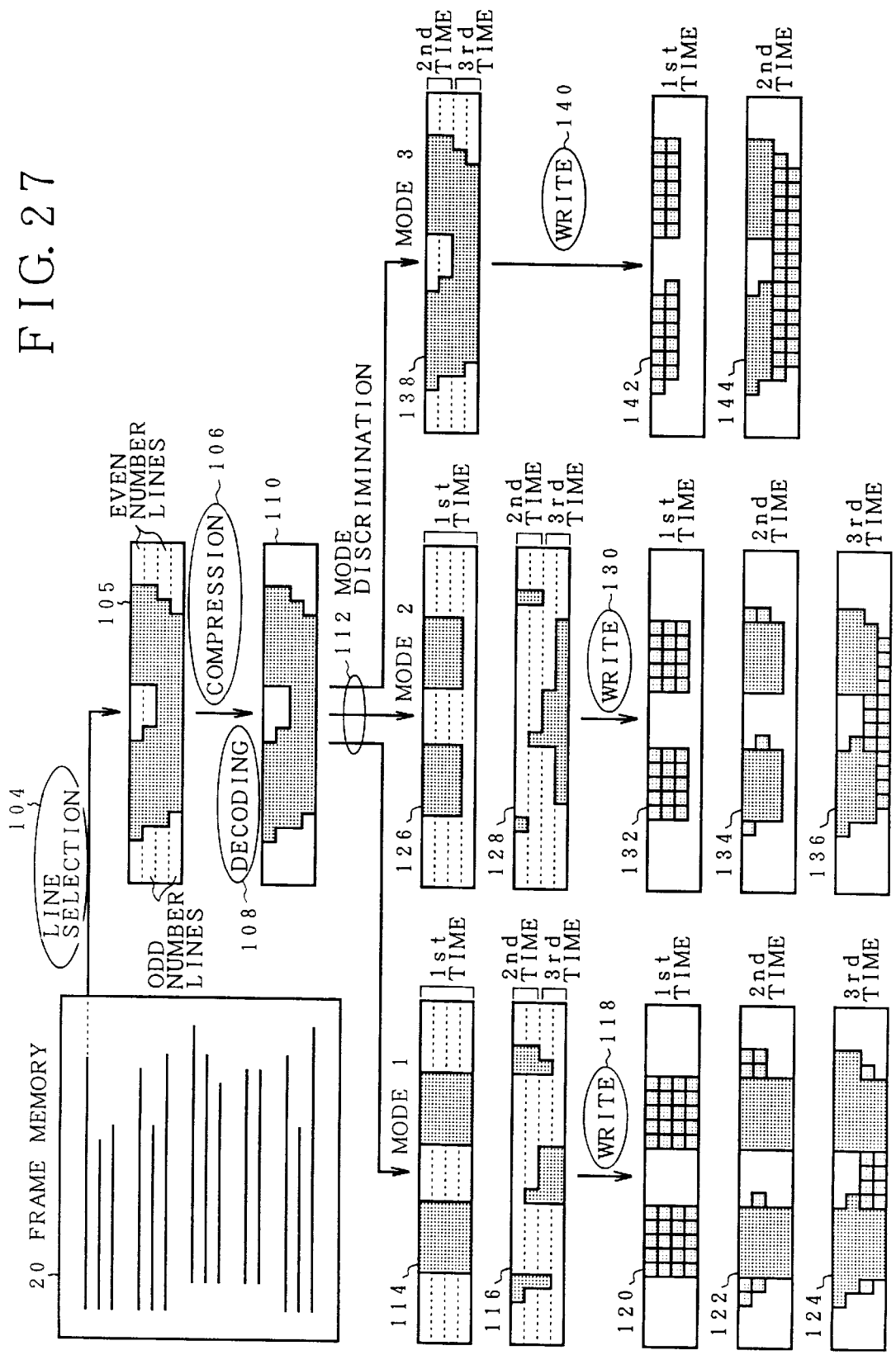
FIG. 27 is an explanatory diagram for an interlace writing by a write controller in FIGS. 24A and 24B.

FIG. 27 is an explanatory diagram of the writing process to the LCD unit 40 by the write controllers 28-1 and 28-2 to perform the simultaneous interlace writing in FIGS. 24A and 24B. FIG. 27 shows a case where the write controllers 28-1 and 28-2 with the same function as that in the embodiment of the second invention of FIG. 12 are applied to the third invention.

Figure 28:
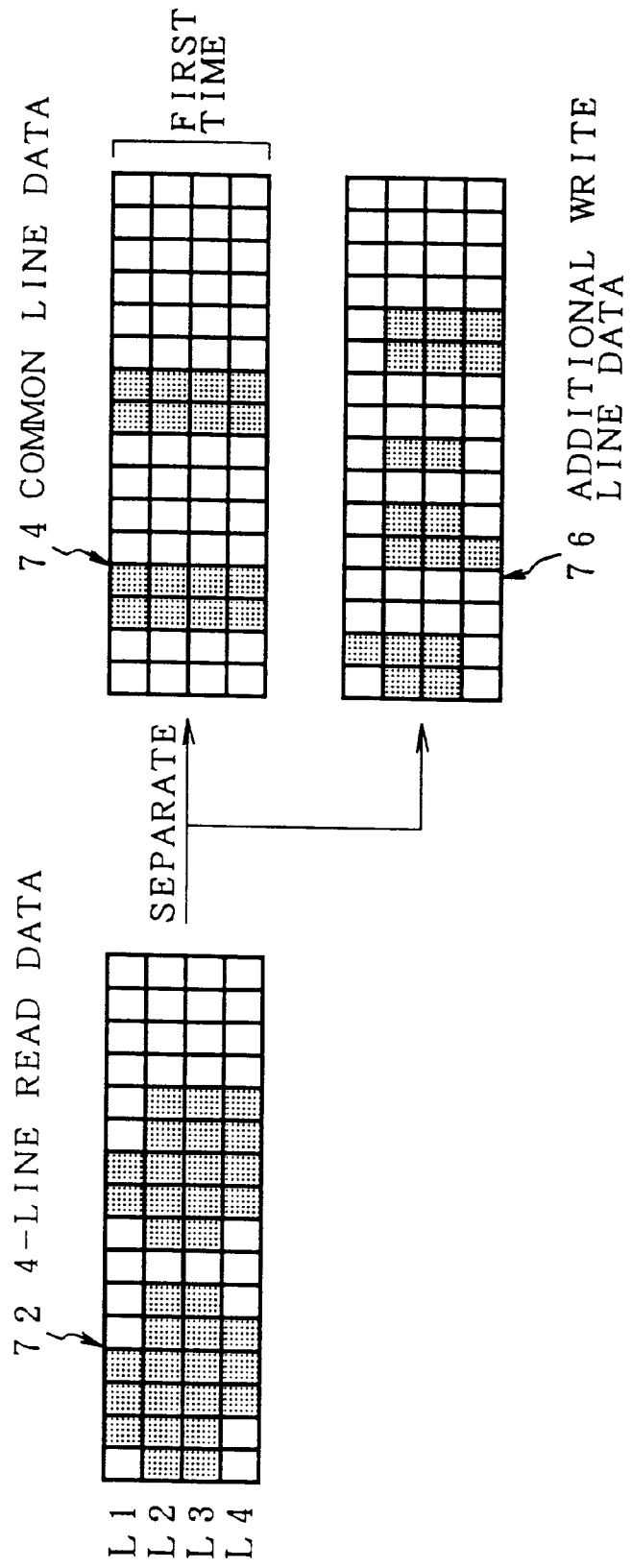
FIG. 28 is an explanatory diagram for a detection of common line data in mode 1 and a separation of additional write line data by the write controller in FIGS. 24A and 24B.
Figure 29:
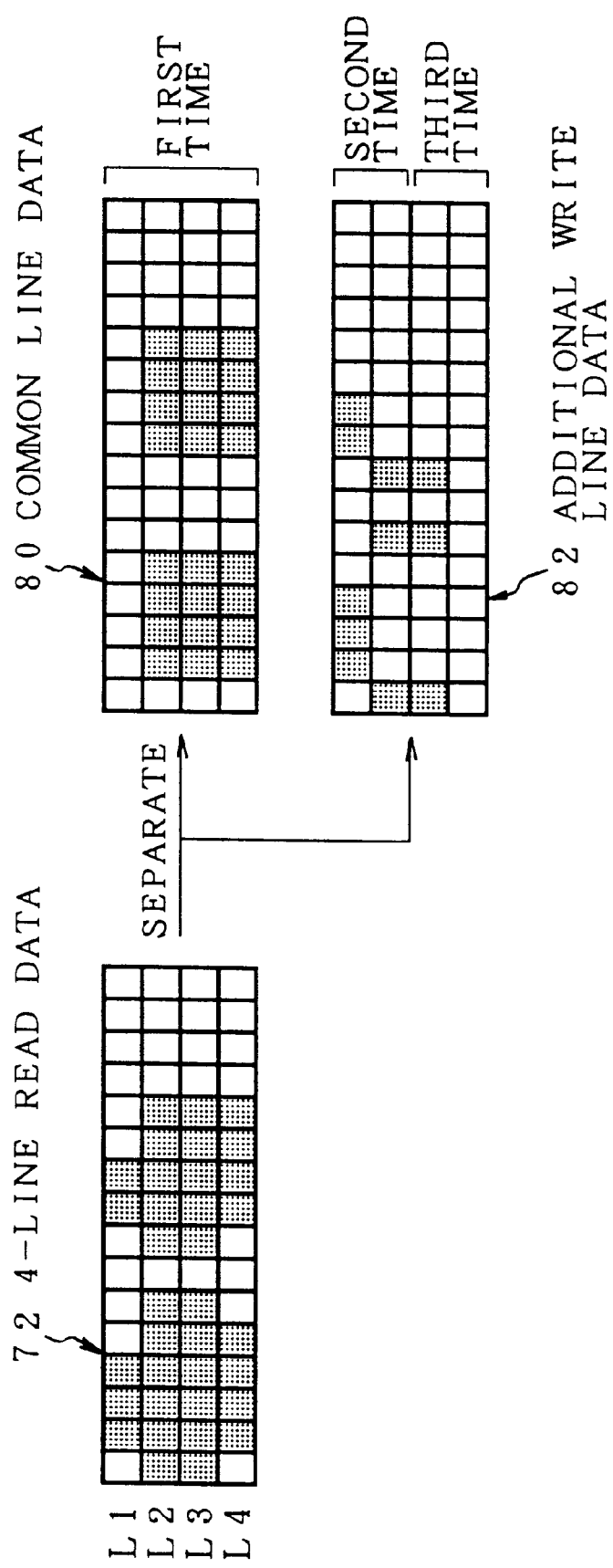
FIG. 29 is an explanatory diagram for a detection of common line data in a mode 2 and a separation of additional write line data by the write controller in FIGS. 24A and 24B.

In FIG. 27, for example, document data has been stored in the frame memory 20 on the personal computer 10 side and, for example, four line data by the reading of two times of the odd and even lines is derived like read data 105 by a line selection 104. The read data 105 is converted into code data by a compression 106 and transferred to the projector side. After that the code data is reconstructed as image data 110 by a decoding 108. A mode discrimination 112 is subsequently executed. In the embodiment of FIGS. 24A and 24B, as a detecting method of the common line data, as shown in FIG. 28, a detection of common line data 74 by the AND of read data 72 of four lines L1 to L4 is set to mode 1. The read data 72 from which the black display pixels included in the common line data 74 are eliminated becomes additional write line data 76 which is read out and additionally written on a line unit basis by the sequential designation of the write lines. A detection of the common line data in mode 2 is as shown in FIG. 29. In mode 2, a line arrangement of the pixels such that the simultaneous writing of a plurality of lines can be performed and the number of write pixels is maximized is detected with respect to the read data 72 and is set to common line data 80. In this case as well, data in which the black display pixels included in the common line data 80 are eliminated from the read data 72 is set to additional write line data 82 which is read out and additionally written on a line unit basis by the sequential designation of the write lines. Further, mode 3 relates to the simultaneous interlace writing in which the odd line and even line are simultaneously read out and the 2-line simultaneous writing is executed as shown in FIG. 30. In the above setting of modes 1, 2, and 3 of the write control, an optimum mode is set in accordance with the necessity by a scan of the operator or a software-like instruction from the upper personal computer 10. In a mode discrimination 112 in FIG. 27, for instance, now assuming that mode 1 is determined, as shown in FIG. 28, the data is automatically separated into common line data 114 which is given by the AND of the display pixels of four lines and line data 116 comprising the remaining display pixels excluding the common line data 114. Common line data 120 is first simultaneously written by one time by a write 118 and, subsequently, line data 122 and 124 excluding the common line data are additionally written separately two times on a 2-line unit basis. In mode 2, the data is separated into common line data 126 in which the number of pixels by the simultaneous writing is maximum and remaining line data 128. Similarly, common line data 132 is simultaneously written by a write 130 and remaining line data 134 and 136 are written on a 2-line unit basis. Further in mode 3, line data 142 of two odd and even lines of the first time is written and line data 144 of the next odd and even lines of the second time is written by a write 140. In FIG. 27, as compared with the case where the number of writing times in modes 1 and 2 in which the common line data is simultaneously written is equal to 3 times, the number of writing times in mode 3 to perform the simultaneous interlace writing is equal to 2 times, so that the simultaneous interlace writing in mode 3 is executed at a highest speed. Such a number of writing times is peculiar to the pixel pattern of first four lines read out from the frame memory 20. For example, as for the line data having a pixel arrangement of a rectangular shape or ruled lines in which the continuous pixel areas continue in the vertical direction, the number of writing times in which all lines are written all together by the simultaneous writing by the detection of the common line data in mode 1 or 2 is equal to one time. A writing speed can be raised as compared with the simultaneous interlace writing in mode 3.

Figure 31A:
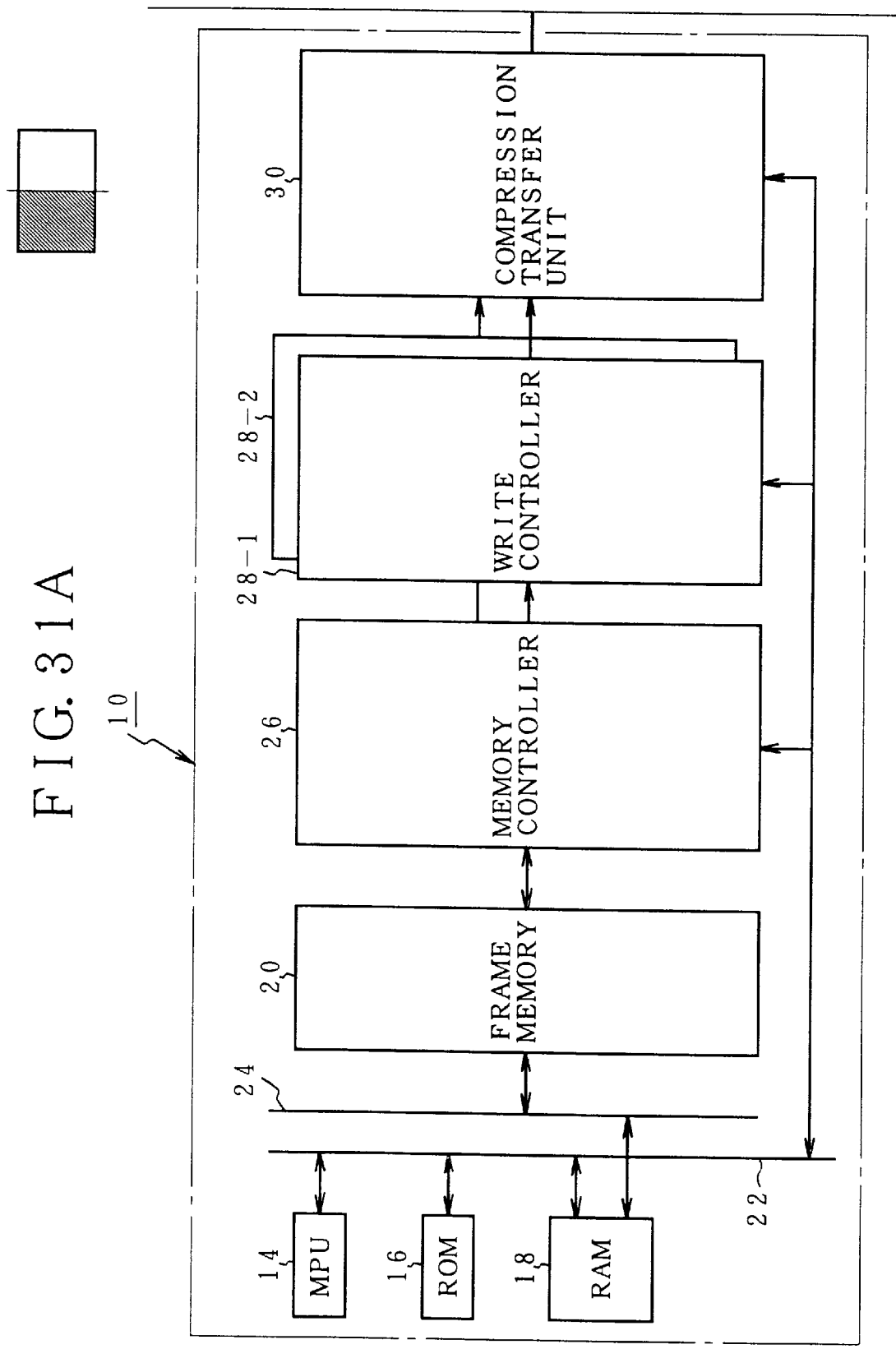

FIGS. 31A and 31B show a modification of FIGS. 24A and 24B. The write controllers 28-1 and 28-2 are provided on the personal computer 10 side. The common line data detected by the write controllers 28-1 and 28-2 and its write line information and the line data in the subsequent additional writing and its write line information are compressed by the compression transfer unit 30 and the resultant compressed data is transferred as code data. In the reception decoding unit 34 on the projector 12 side, the line data and the write line numbers are reconstructed and supplied to the display controller 36 and the simultaneous interlace writing of the LCD unit 40 is performed.

Figure 32A:
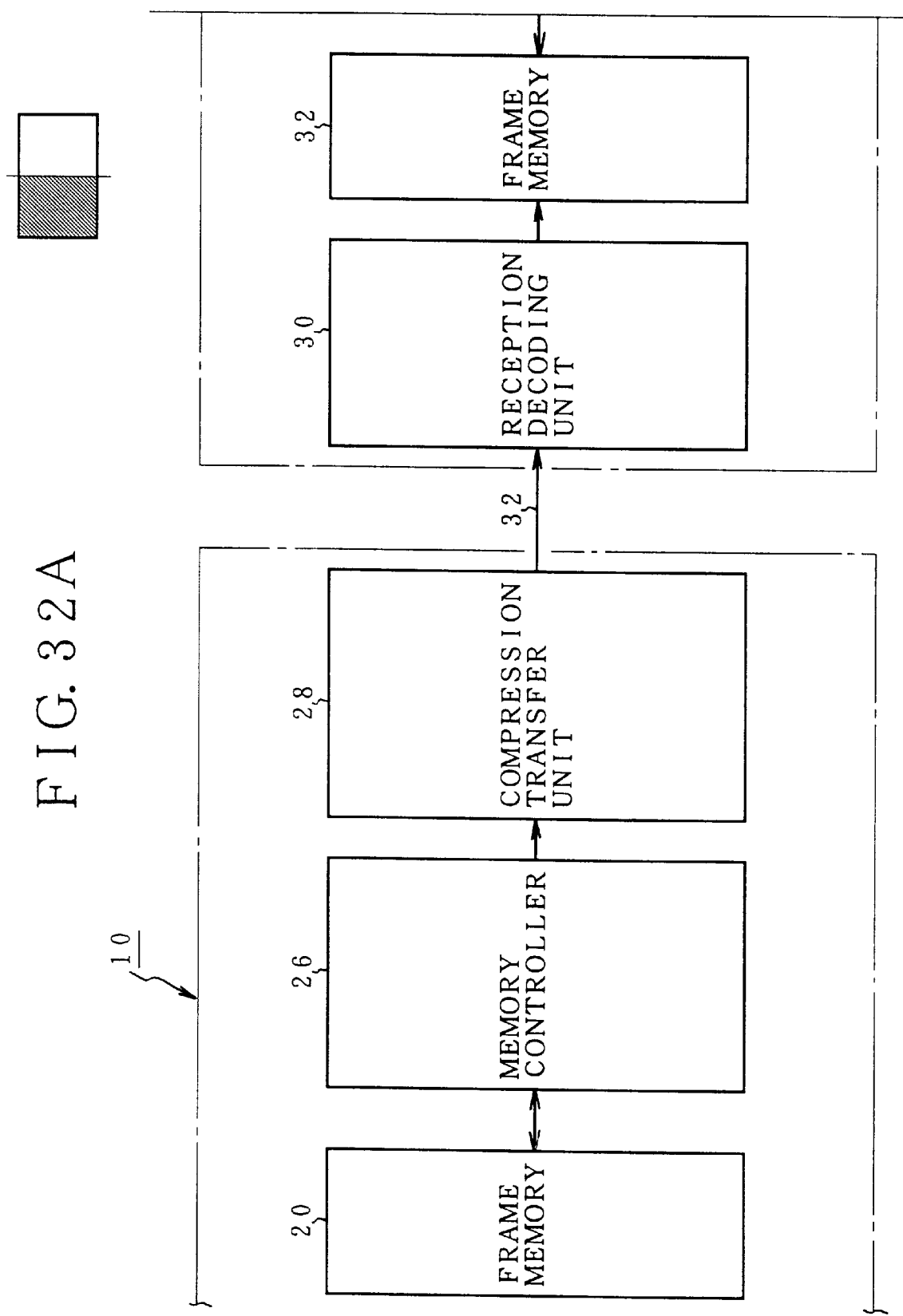
Figure 33:
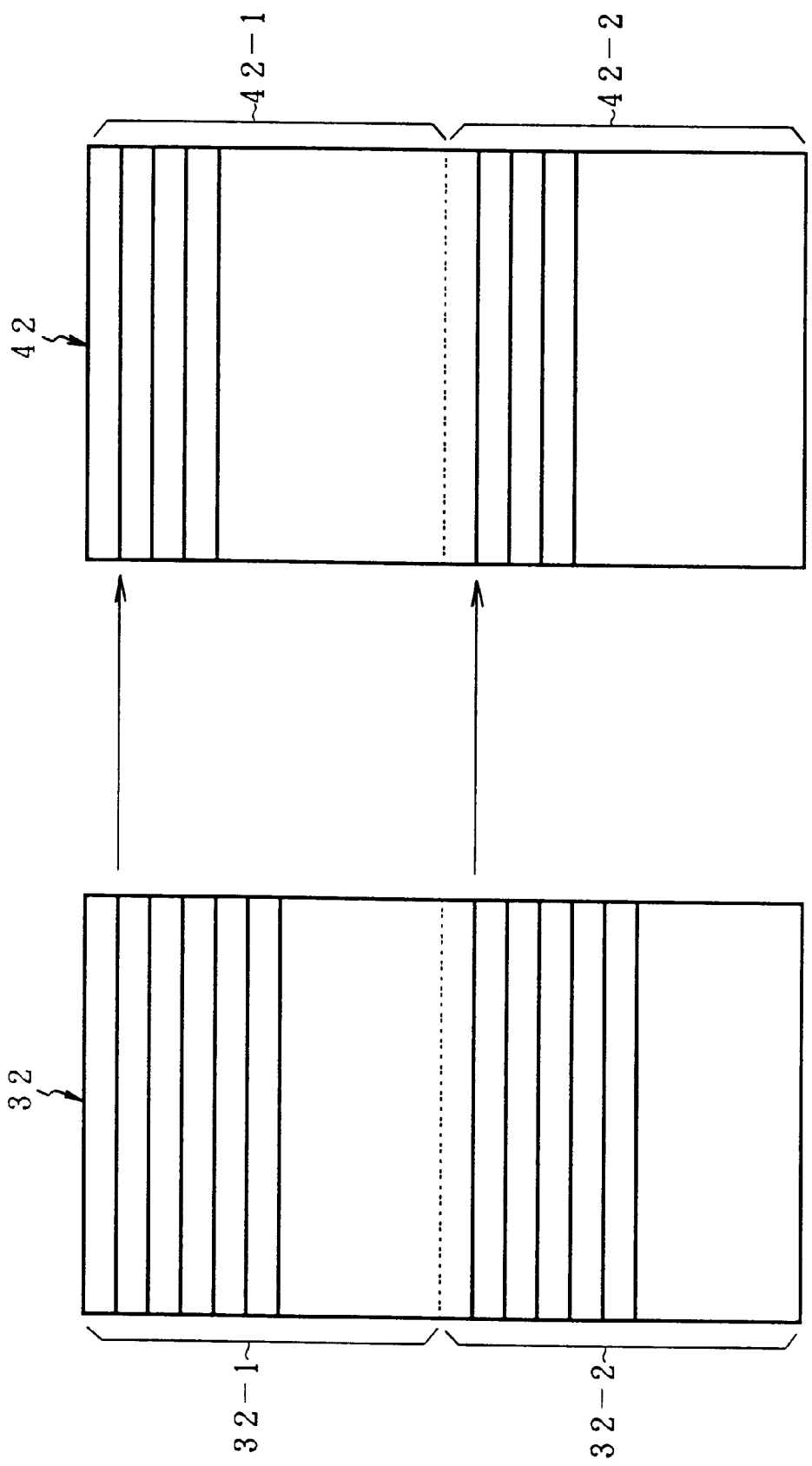
FIG. 33 is an explanatory diagram of a frame memory and the liquid crystal panel in the parallel writing operations in FIGS. 32A and 32B.

FIGS. 32A and 32B show another embodiment of a display apparatus according to the fourth invention having a plurality of display areas which can be independently driven. In the LCD unit 40 of the projector 12 connected as an external display apparatus of the personal computer 10, the liquid crystal panel 42 is divided into two areas 42-1 and 42-2. Data electrode drivers 46-11 and 46-12 to individually display and drive the areas 42-1 and 42-2 are provided. The two write controllers 28-1 and 28-2 are provided in correspondence to the areas 42-1 and 42-2, thereby enabling the data to be written in parallel. FIG. 33 shows a correspondence relation between the frame memory 20 and liquid crystal panel 42. The liquid crystal panel 42 is divided into the areas 42-1 and 42-2 and the line data can be independently written. Therefore, as for the frame memory 20, the line data is read out in parallel every corresponding two areas 20-1 and 20-2 and is simultaneously written into the areas 42-1 and 42-2 of the liquid crystal panel 42 in parallel. As mentioned above, when the liquid crystal panel 42 is divided into two display areas 42-1 and 42-2 as well, a writing speed can be doubled in a manner similar to the case of the simultaneous interlace writing in FIGs. 24A and 24B. It will be obviously understood that the write controllers 28-1 and 28-2 are the same as those in FIG. 3 or 12. For example, when using the write controller 28 in FIG. 12, the simultaneous writing by the detection of the common line data of (n) lines and the subsequent additional writing of each line unit are executed every display areas 42-1 and 42-2.

Figure 34:
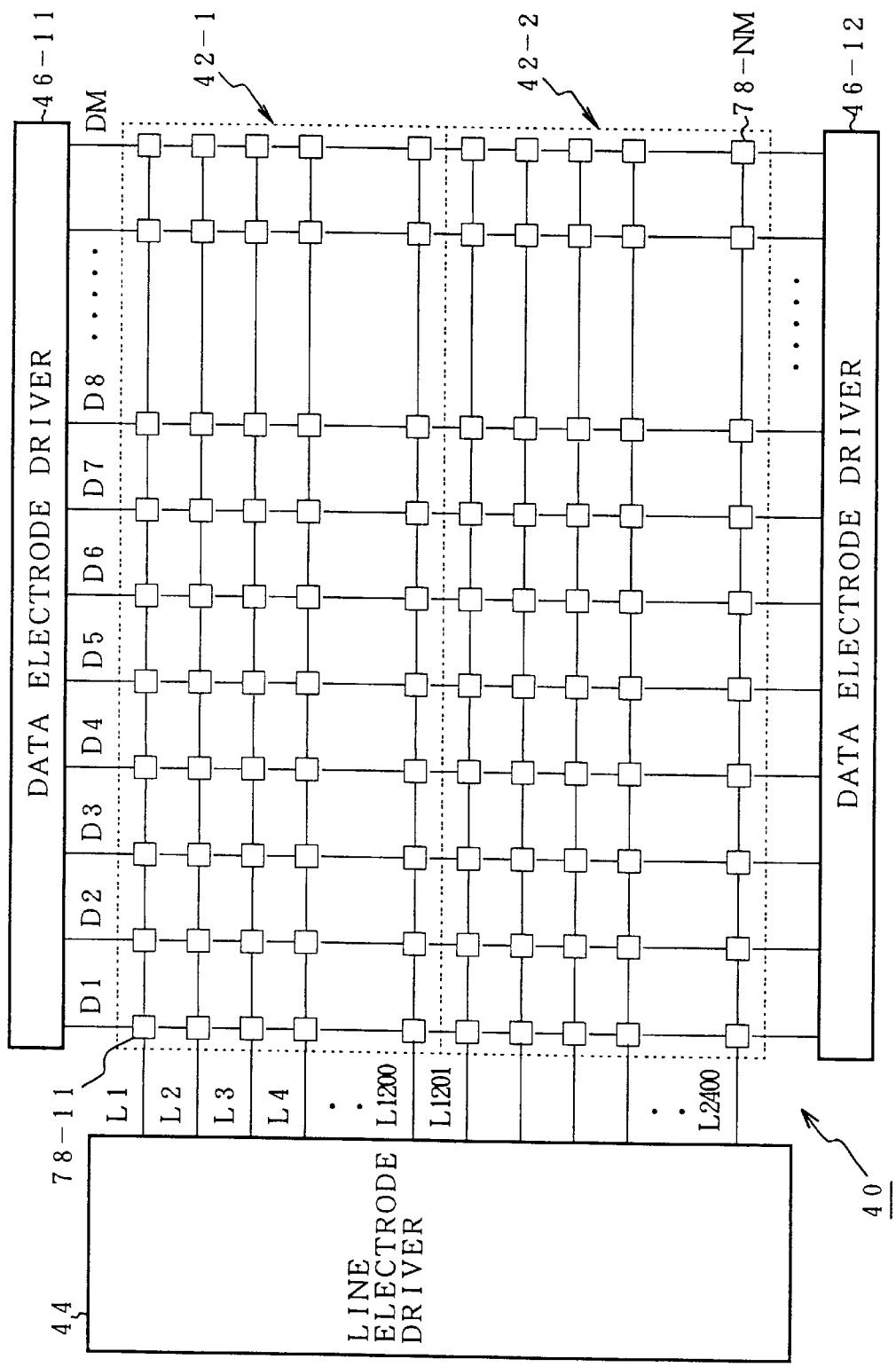
FIG. 34 is a schematic constructional diagram of a liquid crystal display unit in FIGS. 32A and 32B.

FIG. 34 shows a schematic construction of the LCD unit 40 in FIGS. 32A and 32B. In the LCD unit 40, now assuming that the number of line electrodes of the line electrode driver 44 is equal to, for example, 2400, the line electrodes are divided into two areas of the area 42-1 comprising line electrodes L1 to L1200 and the area 42-2 comprising line electrodes L1201 to L2400. The data electrode drivers 46-11 to 46-12 are provided every areas 42-1 and 42-2 and the data electrodes D1 to $D_M$ are arranged in a matrix shape. As mentioned above, by dividing the LCD unit 40 into a plurality of areas which can be independently driven, the writing speed can be increased in accordance with the dividing number. The invention is not limited to the example of the division into two areas of FIG. 33 but the dividing number can be also increased to three or four as necessary.

Figure 35A:
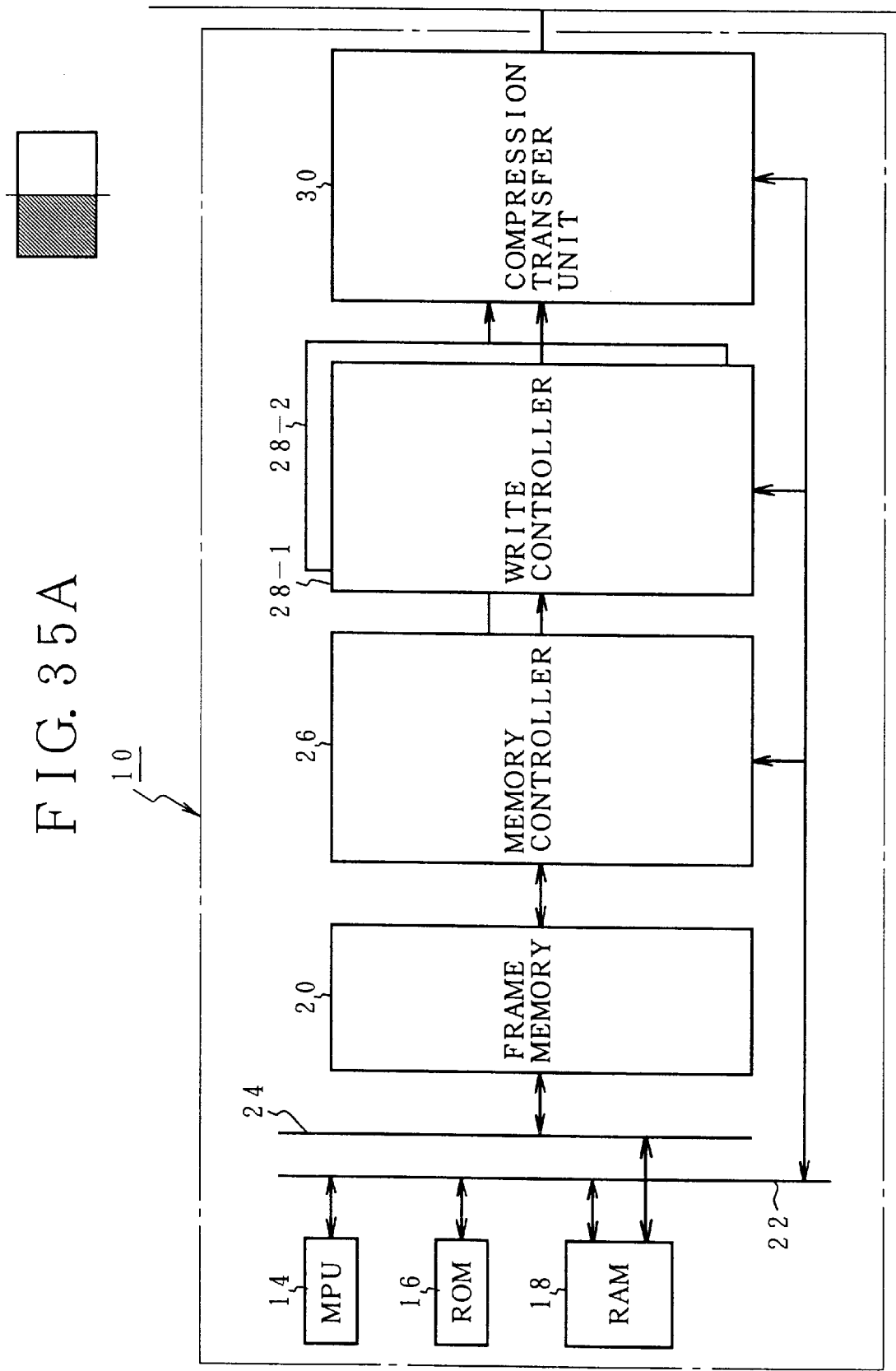

FIGS. 35A and 35B are a modification of FIGS. 32A and 32B. In this case, the write controllers 28-1 and 28-2 are provided on the personal computer 10 side. The common line data detected by the write controllers 28-1 and 28-2 and its write line information and the line data in the subsequent additional writing and its write line information are compressed by the compression transfer unit 30 and the resultant compressed data is transferred as code data. The code data is reconstructed by the reception decoding unit 34 on the projector 12 side and the writing display for every areas 42-1 and 42-2 of the LCD unit 40 is executed in parallel by the display controller 36.

According to the image display method of the first invention as mentioned above, the writing display of a plurality of lines can be simultaneously performed by the writing of one time. The writing display of all pixels can be completed before writing all lines and the display speed can be raised. In particular, with respect to the image data such that the display pixels are arranged in the direction which perpendicularly crosses the display lines, the simultaneous writing by the line data that is common to each line is efficiently executed and the high speed writing display can be performed in an extremely short time. The image display method of the invention essentially has a hierarchical display function such that the display by the simultaneous writing of a plurality of lines is performed in accordance with the order from the large number of display pixels commonly existing in the plurality of lines and the image schematically appears at the initial writing stage and is switched to the detailed display with the elapse of time. Therefore, in the picture plane retrieval or the like, the outline of the image can be recognized at the writing initial stage and the retrieval by the picture plane switching can be performed at a fairly high speed.

According to the image display method of the second invention, prior to the writing display of every line according to the first invention, the common line data is detected by the AND of all line data or the like, and the common line data is simultaneously written to all lines, so that the schematic image of the whole image can be displayed in a lump by the writing operation of the first time. Therefore, as compared with the first invention in which the common display pixels are displayed all together by a plurality of lines as much as possible by sequentially designating the display lines, the number of pixels of the whole picture plane which can be displayed at the writing initial time remarkably increases and the number of writing times is reduced, so that the display speed can be further improved.

According to the image display method of the third invention, the display unit is divided into (M) blocks on an N-line unit basis, the single write data in which (N) lines are used for the simultaneous writing is first formed, and the N-line simultaneous writing is executed by the write data. According to the writing at the first stage, in the phase transition type liquid crystal unit, after the display unit was initialized, the simultaneous writing of (M) blocks is executed in one unit time of about 5 msec that is necessary to rewrite white to black, so that the whole one picture plane is schematically displayed. Therefore, even if the number of writing times is not reduced, the overall contents can be known at the writing initial stage. After that, by performing the ordinary additional writing at the second stage on a line unit basis in which tens of milliseconds are needed, the image is displayed in detail. Thus, the operator can feel a high speed display. Even in the interlace writing in which (N=2 lines), a situation such that the data is written to all lines by the writing at the first stage and the contrast deteriorates during the interlacing operation as in the conventional method doesn't occur.

Further, according to the fourth invention of the present application, by dividing the display unit into a plurality of areas which can be independently driven and executing the writing display in parallel, the display speeds in the first and second inventions can be further raised in accordance with the area dividing number.

Although the above embodiments have been shown and described with respect to the case where the liquid crystal display unit is used as a display device of the projector as an example, the invention is not limited to such an example but can be directly applied to a proper apparatus using the phase transition type liquid crystal display unit.

What is claimed is:

1. An image display method for a display having a plurality of display lines, the method comprising:

setting an order of the display lines of the display;

reading out a selected line of data from an image data storage in accordance with the set order, the selected line of data including at least one display pixel to be written to the display;

comparing the selected line of data with each line of data stored in the image data storage and subsequent to the selected line of data according to the set order;

detecting one or more lines of data as write display lines for the selected line of data when each of the one or more lines of data matches the selected line of data at each display pixel of the selected line of data; and simultaneously writing the one or more write display lines for the selected line of data to a corresponding one or more of the display lines of the display.

2. The method according to claim 1, wherein said reading detects whether the read-out line data includes display pixels which need to be written to said display unit, and when said line data does not include any display pixel, said writing and said displaying are skipped and a next display line is read out.

3. The method according to claim 1, wherein when comparing, display lines having a correlation with the line data read out are detected from said image data storing unit and are simultaneously written.

4. The method according to claim 1, wherein when comparing, display lines of exactly the same display pixels as the line data read out by said reading are detected from said image data storing unit and simultaneously written.

5. The method according to claim 1, wherein when comparing, display lines including a portion of the display pixels of the line data read out by said reading are detected from said image data storing unit and simultaneously written.

6. The method according to claim 1, wherein when writing, a display pixel is written to the display only when the display pixel has not yet been written thereto.

7. The method according to claim 1, wherein when writing, the line data is also overwritten to the display pixels which have already been written.

8. The method according to claim 1, wherein when setting, the order of the display lines corresponds to the display lines of said display unit being sequentially designated from a top display line of the display.

9. The method according to claim 1, wherein when setting, the display lines are ordered from a least number of display pixels included therein to a greatest number of display pixels.

10. The method according to claim 1, wherein a display area of said display unit is divided into areas each of which comprises a plurality of lines, and each process of said setting, said reading, said comparing, and said writing is executed on a divided area unit basis.

11. The method according to claim 10, wherein each time the writing operation is performed once, the divided areas are sequentially switched and the writing operation is performed to all of the areas.

12. An image display apparatus for displaying image data on a phase transition liquid crystal display having a plurality of display lines, said apparatus comprising:

a display line setting unit setting an order for display of lines of data to the liquid crystal display;

a reading unit reading a selected line of data from an image in accordance with the set order, the selected line of data including at least one display pixel to be written to the display;

a write line detecting unit comparing the selected line of data with each line of data stored in the image data storage and subsequent to the selected line of data according to the set order, said write line detecting unit detecting one or more lines of data as write display lines for the selected line of data when each of the one or more lines of data matches the selected line of data at each display pixel of the selected line of data; and a display unit simultaneously writing the one or more write display lines for the selected line of data to a corresponding one or more of the display lines of the liquid crystal display.

13. An image display method for a display having a plurality of display lines, the method comprising:

designating for image data in an image data storage a number of lines of data containing pixel data to be written to the display;

detecting common line data from the designated lines of data, the common line data indicating one or more pixel positions at which each of the designated lines of data includes pixel data to be written to the display;

simultaneously writing the common line data to display lines of the display corresponding to the designated lines of data; and reading out a selected line of data from the image data storage in accordance with a preset order after writing the common line data and simultaneously writing one or more write display lines for the selected line of data to a corresponding one or more display lines of the display.

14. The method according to claim 13, wherein when detecting and reading, when the read-out line data does not include display pixels to be written to said display unit, said line data is excluded from the write display write lines.

15. The method according to claim 13, wherein detecting the common line data includes performing an AND operation of display pixels of the designated lines of data.

16. The method according to claim 13, further comprising detecting display lines including the same display pixels as those of the line data read out from said image data storing unit in accordance with the preset order as additional write lines.

17. The method according to claim 13, further comprising detecting display lines partially including the same display pixels as those of the line data read out from said image data storing unit in accordance with the preset order as additional write lines.

18. The method according to claim 13, wherein when detecting and reading, the written display pixels are deleted from said image data storing unit.

19. An image display method for a display having a plurality of display lines, the method comprising:

forming a corresponding unit of write data for each of a plurality of blocks of the display lines, the plurality of blocks being obtained by dividing the plurality of display lines into one or more blocks each comprising one or more display lines;

for each of the plurality of blocks, simultaneously writing the corresponding write data to the one or more display lines of the block in a first writing time;

for each of the plurality of blocks, forming additional write data to be additionally written thereto; and sequentially writing the respective additional write data to the plurality of blocks, each additional write data being written in a second writing time longer than the first writing time.

20. The method according to claim 19, further comprising:

designating the first and second writing times; and designating a number of lines comprising each block.

21. The method according to claim 19, wherein forming the write data for a block comprises performing an AND operation of display pixels of the display lines of the block.

22. The method according to claim 19, wherein forming the write data for a block comprises setting a line of data corresponding to a first line of the block as the write data.

23. The method according to claim 19, wherein the simultaneous writing of the write data for a block is skipped when the write data includes no display pixels.

24. The method according to claim 19, wherein when the data to be additionally written is identical to the data which has already been written by said simultaneous writing operation, said additional write data is not supplied to said sequential writing operation, and the sequential writing operation is skipped.

25. The method according to claim 20, wherein when designating the writing times, the second writing time to additionally write is changed in accordance with a temperature of said display unit.

26. The method according to claim 19, wherein the forming of additional write data and sequentially writing thereof are executed in accordance with an arbitrary order.

27. An image display control apparatus for a display having a plurality of display lines, said apparatus comprising:

a first data forming unit forming a corresponding unit of write data for each of a plurality of blocks of the display lines, the plurality of blocks being obtained by dividing the plurality of display lines into one or more blocks each comprising one or more display lines;

a first data writing unit writing the units of write data to the plurality of blocks, for each block said first data writing unit simultaneously writing the corresponding write data to the one or more display lines of the block in a first writing time;

a second data forming unit forming additional write data for each of the plurality of blocks, for each block the additional write data to be additionally written thereto; and a second data writing unit sequentially writing the respective additional write data to the plurality of blocks, each additional write data being written in a second writing time longer than the first writing time.

28. An image display method for a display having a plurality of display lines divided into independently driveable display areas, the method comprising for each of the display areas:

reading out a selected line of data from image data in an image data storage in accordance with a preset order, the selected line of data being selected from image data for the display area and including at least one display pixel to be written to the display area;

comparing the selected line of data with one or more lines of data stored in the image data storage for the display area;

detecting one or more of the compared lines of data as write display lines for the selected line of data when each of the one or more lines of data matches the selected line of data at each display pixel of the selected line of data; and simultaneously writing the one or more write display lines for the selected line of data to a corresponding one or more display lines of the display area.

29. The method according to claim 28, further comprising before reading out the selected line of data and displaying the one or more write display lines:

reading out a plurality of line data from the image data in said image data storing unit of every display area of said display unit and detecting common line data included commonly in said plurality of lines and the write lines of said common line data; and simultaneously writing and displaying said corresponding common line data to the display lines of every said display area detected during reading.

30. The method according to claim 29, wherein during reading out the selected line of data and the plurality of line data, the line data detected for each said display area and detection information of said write display lines are compressed and output as code data, and during writing and displaying the common line data and the one or more write display lines, the line data of each display area and write line detection information are decoded from said code data and simultaneously written into the display area.

31. The method according to claim 29, wherein a line of data including no display pixels is eliminated from processing.

32. The method according to claim 29, wherein the detecting of common line data comprises performing an AND operation of the plurality of line data.

33. The method according to claim 29, wherein detecting the common line data comprises detecting line data which can be simultaneously written and in which the number of display pixels is a maximum.

34. The method according to claim 29, wherein detecting the one or more write display lines comprises reading out line data from the image data in said image data storing unit, the read-out line data excluding the display pixels written in said display unit.

35. A display apparatus for a phase transition liquid crystal display having a plurality of display areas, said apparatus comprising an image data storage storing image data to be displayed and further comprising for each of the display areas:

a write line detecting unit reading out a selected line of data from the image data in said image data storage in accordance with a predetermined order, the selected line of data being selected from image data for the display area and including at least one display pixel to be written to the display area, said write line detecting unit comparing the selected line of data with one or more lines of data stored in said image data storage for the display area and detecting one or more of the compared lines of data as write display lines for the selected line of data when each of the one or more compared lines of data matches the selected line of data at each display pixel of the selected line of data; and a display unit simultaneously writing the one or more write display lines for the selected line of data to a corresponding one or more of the display lines of the display area.

36. The apparatus according to claim 35, further comprising:

a common line data detecting unit reading out a plurality of line data from the image data in said image data storing unit of every display area of said display unit, prior to writing the display by said write line detecting unit and said display unit, and detecting common line data included commonly in said plurality of lines and write lines of said common line data; and a common line data display unit simultaneously writing and displaying said corresponding common line data to the display lines of every said display area detected by said common line data detecting unit.

* * * * *